United States Patent
Rivette et al.

(10) Patent No.: US 6,389,434 B1
(45) Date of Patent: May 14, 2002

(54) SYSTEM, METHOD, AND COMPUTER PROGRAM PRODUCT FOR CREATING SUBNOTES LINKED TO PORTIONS OF DATA OBJECTS AFTER ENTERING AN ANNOTATION MODE

(75) Inventors: Kevin G. Rivette; Irving S. Rappaport, both of Palo Alto; Adam Jackson, Sunnyvale; Don Ahn, Menlo Park; Michael P. Florio, Atherton; Deborah Kurata, Pleasanton, all of CA (US)

(73) Assignee: Aurigin Systems, Inc., Cupertino, CA (US)

( * ) Notice: Subject to any disclaimer, the term of this patent is extended or adjusted under 35 U.S.C. 154(b) by 0 days.

(21) Appl. No.: 09/057,557

(22) Filed: Apr. 9, 1998

Related U.S. Application Data

(63) Continuation of application No. 08/632,801, filed on Apr. 17, 1996, now Pat. No. 5,806,079, which is a continuation-in-part of application No. 08/423,676, filed on Apr. 18, 1995, now Pat. No. 5,623,679, which is a continuation-in-part of application No. 08/341,129, filed on Nov. 18, 1994, now abandoned, which is a continuation-in-part of application No. 08/155,752, filed on Nov. 19, 1993, now Pat. No. 5,623,681.

(51) Int. Cl.[7] .............................................. G06F 17/21
(52) U.S. Cl. ...................................... 707/512; 707/512
(58) Field of Search .............................. 707/512, 501.1, 707/530, 531; 345/776, 854

(56) References Cited

U.S. PATENT DOCUMENTS

| 4,205,780 A | 6/1980 | Burns et al. |
| 4,270,182 A | 5/1981 | Asija |
| 4,486,857 A | 12/1984 | Heckel |
| 4,533,910 A | 8/1985 | Sukonick et al. |
| 4,555,775 A | 11/1985 | Pike |
| 4,622,545 A | 11/1986 | Atkinson |
| RE32,632 E | 3/1988 | Atkinson |
| 4,736,308 A | 4/1988 | Heckel |
| 4,748,618 A | 5/1988 | Brown et al. |
| 4,772,882 A | 9/1988 | Mical |

(List continued on next page.)

FOREIGN PATENT DOCUMENTS

EP 0239884 10/1987

OTHER PUBLICATIONS

"Agent Searching," Executive Technologies, Inc., Last Updated: Jan. 12, 1996.
Albert, M., CD–ROM: The Next PC Revolution, Fortune Magazine, Jun. 29, 1992.
Albert, M., Easy Access to Patents, Fortune Magazine, Jun. 29, 1992.
Alexander, Visualizing Cleared–Off Desktops, *Computerworld*, May 6, 1991, p. 20.
Banet, "Creating a CD–ROM: overview of the product field," The Seybold Report on Desktop Publishing, v. 7, n. 6, p. 3(29), Feb. 1993.
Becker, "Voyager kit: Ticket to books on–line," *MacWeek*, vol. 7, No. 8, Feb. 22, 1993, p. 57.

(List continued on next page.)

*Primary Examiner*—Stephen S. Hong
(74) *Attorney, Agent, or Firm*—Sterne, Kessler, Goldstein & Fox P.L.L.C.

(57) ABSTRACT

Systems, methods, and computer program products for annotating documents are described herein, wherein in some embodiments the documents are immutable. The method operates by enabling a user to place an application in an annotation mode. An annotation is created, and then linked to a portion of an immutable data object. Location information is displayed proximate to the annotation mode location information indicates a location of the linked portion in the data object.

53 Claims, 51 Drawing Sheets

U.S. PATENT DOCUMENTS

| | | | |
|---|---|---|---|
| 4,785,408 A | 11/1988 | Britton et al. | |
| 4,788,538 A | 11/1988 | Klein et al. | |
| 4,812,834 A | 3/1989 | Wells | |
| 4,847,604 A | 7/1989 | Doyle | |
| 4,873,623 A | 10/1989 | Lane et al. | |
| 4,884,223 A | 11/1989 | Ingle et al. | |
| 4,899,136 A | 2/1990 | Beard et al. | |
| 4,914,732 A | 4/1990 | Henderson et al. | |
| 4,931,783 A | 6/1990 | Atkinson | |
| 4,935,865 A | 6/1990 | Rowe et al. | |
| 4,939,507 A | 7/1990 | Beard et al. | |
| 4,959,769 A | 9/1990 | Cooper et al. | |
| 4,977,455 A | 12/1990 | Young | |
| 4,985,863 A | 1/1991 | Fujisawa et al. | |
| 4,991,087 A | 2/1991 | Burkowski et al. | |
| 5,008,853 A | 4/1991 | Bly et al. | |
| 5,062,060 A | 10/1991 | Kolnick | |
| 5,072,412 A | 12/1991 | Henderson, Jr. et al. | |
| 5,120,944 A | 6/1992 | Kern et al. | |
| 5,148,154 A | 9/1992 | MacKay et al. | |
| 5,155,806 A | 10/1992 | Hoeber et al. | |
| 5,157,768 A | 10/1992 | Hoeber et al. | |
| 5,163,104 A | 11/1992 | Ghosh et al. | |
| 5,222,160 A | 6/1993 | Sakai et al. | |
| 5,228,123 A | 7/1993 | Heckel | |
| 5,237,158 A | 8/1993 | Kern et al. | |
| 5,241,671 A | 8/1993 | Reed et al. | |
| 5,253,362 A | 10/1993 | Nolan et al. | |
| RE34,476 E | 12/1993 | Norwood | 382/186 |
| 5,276,616 A | 1/1994 | Kuga et al. | |
| 5,319,745 A | 6/1994 | Vinsonneau et al. | |
| 5,349,170 A | 9/1994 | Kern | |
| 5,392,428 A | 2/1995 | Robins | |
| 5,404,514 A | 4/1995 | Kageneck et al. | |
| 5,428,778 A | 6/1995 | Brookes | |
| 5,432,897 A | 7/1995 | Tatsumi et al. | |
| 5,440,481 A | 8/1995 | Kostoff et al. | |
| 5,442,778 A | 8/1995 | Pedersen et al. | |
| 5,444,615 A | 8/1995 | Bennett et al. | |
| 5,481,666 A | 1/1996 | Nguyen et al. | |
| 5,519,857 A | 5/1996 | Kato et al. | |
| 5,537,526 A | 7/1996 | Anderson et al. | |
| 5,544,302 A | 8/1996 | Nguyen | |
| 5,550,976 A | 8/1996 | Henderson et al. | |
| 5,551,055 A | 8/1996 | Matheny et al. | |
| 5,557,722 A | 9/1996 | DeRose et al. | |
| 5,559,942 A | 9/1996 | Gough et al. | |
| 5,568,639 A | 10/1996 | Wilcox et al. | |
| 5,581,686 A | 12/1996 | Koppolu et al. | |
| 5,583,982 A | 12/1996 | Matheny et al. | |
| 5,584,035 A | 12/1996 | Duggan et al. | |
| 5,592,607 A | 1/1997 | Weber et al. | |
| 5,592,608 A | 1/1997 | Weber et al. | |
| 5,596,700 A | 1/1997 | Darnell et al. | |
| 5,604,901 A | 2/1997 | Kelley et al. | |
| 5,623,679 A | 4/1997 | Rivette et al. | |
| 5,623,681 A | 4/1997 | Rivette et al. | |
| 5,625,833 A | 4/1997 | Levine et al. | 707/500 |
| 5,628,003 A | 5/1997 | Fujisawa et al. | |
| 5,696,963 A | 12/1997 | Ahn | |
| 5,757,983 A | 5/1998 | Kawaguchi et al. | 382/305 |
| 5,799,325 A | 8/1998 | Rivette et al. | 707/500 |
| 5,806,079 A | 9/1998 | Rivette et al. | 707/512 |
| 5,809,318 A | 9/1998 | Rivette et al. | 395/773 |
| 5,845,301 A | 12/1998 | Rivette et al. | 707/512 |
| 5,848,409 A | 12/1998 | Ahn | 707/3 |

OTHER PUBLICATIONS

Berk et al. eds., Hypertext/Hypermedia Handbook, pp. 209–224, 285–297, 329–355, 529–533, Jan. 1991.

Bermant, "Finding It Fast: New Software Features That Search Your System," *Personal Computing*, vol. 11, No. 11, Nov. 1987, pp. 125–131.

Bish, "An Essential ingredient: Post recognition processing," *Imaging World*, vol. 5, Issue 3, Mar. 1996.

Blatt, J., A Primer on User Interface Software Patents, *The Computer Lawyer*, vol. 9, No. 4, Apr. 1992.

Boedeker et al., "Choosing Imaging Software," *Law Office Computing*, vol. 5, Issue 3, Jun./Jul., 1995, pp. 50–55.

"Boolean Searching," Executive Technologies, Inc., Last Updated: Jan. 12, 1996.

Bradbury, "Expanded Book Toolkit," *MacUser*, vol. 9, No. 3, Mar., 1993, p. 85.

Briggs, "CD–ROM publishing boom is Dataware's delight," *MIS Week*, vol. 10, No. 38, Sep. 25, 1989, pp. 40–41.

Briggs, "Dataware Comes to U.S. With CD–ROM Publishing," *MIS Week*, vol. 10, No. 5, Jan. 30, 1989, p. 21.

Brockschmidt, Inside OLE 2, Microsoft Press, Redmond, WA, Copyright 1994.

Brockschmidt, "What OLE Is Really About," *OLE Development*, Microsoft Corporation, Copyright 1997, pp. 1–59.

"BRS/Search: An Industrial Strength Document Warehouse Solution—Profile," Dataware Technologies, Copyright May 1996, pp. 1–12.

"BRS/Search," Dataware Technologies, Inc., date unclear.

Catchings et al., "Price Delineates Text–Retrieval Software," *PC Week*, vol. 8, No. 20, May 20, 1991, pp. 120–123.

Catchings et al., "Retrieval Technologies Inc.: re:Search 2.0," PC Week, v. 8, n. 20, p.121(2), May/1991.

Catlin et al., InterNote: Extending A Hypermedia Framework to Support Annotative Collaboration, Hypertext '89 Proceedings, pp. 365 to 378, Nov., 1989.

"CD Author/CD Answer," Dataware Technologies, date unclear.

Patrick P. Chan, Learning Considerations In User Interface Design: The Room Model, Software Portability Laboratory, University of Waterloo, Waterloo, Ontario, Canada, Jul. 1984.

"Chapter 1: Component Object Model Introduction," *OLE Development*, Microsoft Corporation, Copyright 1997, pp. 1–37.

Christodoulakis, S., et al., Browsing Within Time–Driven Multimedia Documents, Institute for Computer Research, University of Waterloo, Waterloo, Ontario, Canada, pp. 219–227, Jul. 1988.

Classified Search and Image Retrieval Student Manual, U.S. Patent and Trademark Office, May 1991.

Cohen, "Browsers get BookWorm for Mac," *MacWeek*, vol. 7, No. 39, Oct. 4, 1993, p. 4.

*Commands and Settings*, OmniPage Professional Windows Version 5, Caere Corporation, Chapter 1, pp. 1–1 to 1–70, 1988–1993.

The Complete Document Profiling and Retrieval System for Windows, World Software Corporation, WORLDOX, Copyright World Software Corp., 1992.

Conklin, "Hypertext: An Introduction and Survey," Computer, pp. 17–41, Sep./1987.

Cooper et al., "Oh! Pascal!," pp. 389–399, Jan. 1982.

Cote et al., "Searching for Common Threads," *Byte*, vol. 17, No. 6, Jun., 1992, pp. 290–305.

Creation/Modification of the Audio Signal Processor Setup for a PC Audio Editor, IBM Technical Disclosure Bulletin, vol. 30, No. 10, Mar. 1988.

Curran, "Growing company changes data entry," *Imaging-World*, vol. 4, Issue 3, Mar. 1995.
"Dataware Technologies: Products and Services," Dataware Technologies, Copyright 1996.
Dintzer, J.P. and J. Van Thielen, "Image Handling at the European Patent Office: BACON and First Page," *World Patent Information*, vol. 13, No. 3, pp. 152–154, 1991.
Doherty, "New Op–Disk Peripherals Displayed at Conference," *Electronic Engineering Times*, No. 339, Jul. 22, 1985, p. 15.
Duncan, "ZyIMAGE's Use of Windows Interface Falls Short of Mark," *LAN Times*, vol. 10, Issue 10 May 24, 1993, pp. 70 and 79.
"Eastern Electricity: BRS/Search Customer Profile," Dataware Technologies, Copyright 1995.
Editing Recognized Documents, OmniPage Profession Windows Version 5, Caere Corporation, Chapter 3, pp. 3–1 to 3–20, 1988–1993.
"EZ–C + DE2 Images: The New Standard in Data Capture," Textware Corporation, Copyright 1994, pp. 1–8.
The Fastest, Most Powerful Full Text Retrieval System, ZyINDEX 5.2 for Windows, Zylab, 1994.
Fersko–Weiss, "3–D Reading with the Hypertext Edge," *PC Magazine*, vol. 10, No. 10, May 28, 1991, pp. 241–282.
Fish et al., Quilt: a collaborative tool for cooperative writing, Conf. on Information Systems '88, pp. 30 to 37, Jan., 1988.
"Forms Processing Products & Services," TextWare Corporation, Copyright 1996.
"FormWare for Windows 95/NT," TextWare Corporation, Copyright 1996.
"Fuzzy Searching," Executive Technologies, Inc., Last Updated: Jan. 12, 1996.
Gerber, "Lotus rolls out gateway for Notes, cc: Mail," InfoWorld, v. 14, n. 46, p. 1(2), Nov. 1992.
Halasz et al., "Issues in the Design of Hypermedia Systems," CHI '90 Tutorial, Jan./1990.
Harney, "TextWare's FormWare—Complex Data Capture that Puts Simplicity First," *Imaging Magazine*, Apr. 1996.
Haskin, "Textware 4.0: Text Retrieval for Electronic Documents," *Computer Shopper*, vol. 13, No. 8, Aug. 1993, p. 334–335.
Haskin, "ZyImage Finds Images And Text," *PC–Computing*, vol. 6, No. 5, May 1993, p. 60.
Help Yourself! With PCT Patent Search On CD–ROM, MicroPatent, New Haven, CT, appears to be before Jul. 1, 1993.
"Hip Products," ZyLab Europe BV, Copyright 1996.
Holtz, "Mastering Ventura; Second Edition," pp. 360–375, Jan. 1989.
How to Install and Use the USAPat Demonstration Disc, USPTO Office of Information Products Development, 1994(?).
*HyperCard Basics*, Apple Computer, Inc., 1990.
"IDI brings Basis plus down to workgroups," The Seybold Report on Publishing Systems, v. 22, n. 14, p. 16(2), 04/1993.
"InnerView for Windows 3.0, For Evaluation Only, Version 2.2 Pre–Release #6," TMS, Inc. Copyright 1991–1992.
Ishii, H., et al., Clearface: Translucent Multiuser Interface for Team Work Station, *ECSCW*, Sep., 1991, pp. 6–10.
Ishii, H., et al., Toward an Open Shared Workspace, *Communications of the ACM*, Dec., 1991, vol. 34, No. 12, pp. 37–50.

Jonckheere, C., "EPOQUE (EPO Query service) the Inhouse Host Computer of the European Patent Office," *World Patent Information*, vol. 12, No. 3, pp. 155–157, 1990.
Karraker, "Voyager Toolkit stretches Expanded Book concept to let users pen their own," *MacWeek*, vol. 6, No. 11, Mar. 16, 1992, p. 9.
Knibbe, "ZyImage 2 boosts OCR, batch duties," *InfoWorld*, vol. 15, Issue 51, Dec. 20, 1993, p. 20.
Knibbe, "ZyImage 3.0 will facilitate distribution on CD–ROMs; Boasts integration with WordScan OCR software," *InfoWorld*, vol. 16, No. 38, Sep. 19, 1994, p. 22.
Lexis–Nexis Printout of a Business Wire Article Entitled: TMS Announces Contract With Major Insurance Information Provider, Business Wire Inc., Feb. 11, 1991.
Lexis–Nexis Printout of a Business Wire Article Entitled: TMS Announces Easy View Available for CD–ROM Publishers, Business Wire Inc., Mar. 9, 1992.
Lexis–Nexis Printout of a Business Wire Article Entitled: TMS Announces Release of Inner View 2.1 Software, Business Wire Inc., Mar. 18, 1991.
Lougher et al., Supporting long–term collaboration in software maintenance, Conf. on Organizational Computing Systems, pp. 228–238, 1993.
Lucas, Jay, "The Progress of Automation at the U.S. Patent and Trademark Office," *World Patent Information*, vol. 14, No. 3, pp. 167–172, 1992.
McEvoy, Ed., Object Linking and Embedding: Programmer's Reference, Version 1, Microsoft Press, Redmond, WA, Copyright 1992.
Mallory, "New for Mac: text/graphics retrieval software from TMS," Newsbytes, Jul./1992.
Marshall, "Text retrieval alternatives: 10 more ways to pinpoint important information," *Infoworld*, vol. 14, No. 12, Mar. 23, 1992, pp. 88–89.
Marshall, "ZyImage adds scanning access to ZyIndex," *InfoWorld*, vol. 16, No. 15, Apr. 11, 1994, pp. 73, 76, and 77.
Marshall, "ZyImage is ZyIndex plus a scan interface integrated," *InfoWorld*, vol. 15, Issue 10, Mar. 8, 1993, p. 100.
Marshall et al., "ZyIndex for Windows, Version 5.0," InfoWorld, v. 15, n. 21, May 1993, pp. 127, 129, 133 and 137.
"MasterView for Microsoft Windows," TMS Inc., Copyright 1993.
Matazzoni, "Expanded Book Toolkit 1.0.1," *Macworld*, vol. 10, No. 6, Jun., 1993, p. 158.
Mendelson, "HyperWriter for Windows," *PC Magazine*, vol. 14, No. 3, Feb. 7, 1995, pp. 140, 142, and 143.
Moore, "Dataware lands $6.6M GPO pact," *Federal Computer Week*, vol. 9, No. 27, Sep. 11, 1995, pp. 84 and 86.
Moore, "The Forms Processing Paradigm Shift," *Imaging Magazine*, Mar. 1995.
"NetAnswer Hosting Service," Dataware Technologies, Inc., Copyright 1995.
"NetAnswer: Information Super Server for the World Wide Web," Dataware Technologies, Inc., Copyright 1995.
"NetAnswers: Organizations Worldwide Take Content Onto the Web with NetAnswer," Dataware Technologies, Spring 1996.
OmniPage Professional Tutorials, Windows Version 5, Caere Corp, Jan. 1993.
Ores, "Hypertext Publishing: Edit Trail," *PC Magazine*, vol. 14, No. 3, Feb. 7, 1995, pp. 132, 134, 136, and 138.

Patents on CD–ROM, Track Technology, Focus R&D, Watch Competitors, Speed Products to Market, Cut Online/ Copy Costs, A World of Opportunities from MicroPatent, MicroPatent USA, New Haven, CT, appears to be before Sep. 1, 1992.

PatentImages, User Profile European Patents, Search & Tech Tips, Conference Calendar, *MicroPatent World* Newsletter, Spring 1991, New Haven, CT.

A. Pelham, A Wave of the Wand for Litigators. Tools of the Trade Go High–Tech, Focus on Technology, Legal Times, Jan. 24, 1994.

Perenson, "Retrieving Text on the Net," *PC Magazine*, vol. 14, No. 20, Nov. 21, 1995, p. 61.

Previewing the Letter, WordPerfect Workbook for IBM Personal Computers, WordPerfect Corporation, Version 5.0, Lesson 4, p. 24 and Lesson 13, pp. 108–109, 1988.

Print out of On–Line Help Manual, Innerview for Windows 3.0, Version 2.2, Pre–Release #6, TMS, Inc. 1991–1992.

Quattro Pro User's Guide, Borland Int'l, Inc., p. 245, Jan./1989.

"re:Search V. 2.6," Software Product Specification, Computer Select, Nov./1993.

Rooney, "Text–retrieval veterans prepare Windows attack," PC Week, v. 9, n. 24, p. 46, Jun./1992.

Rooney, "ZyLab partners with Calera: firms roll out document–image system," *PC Week*, vol. 10, No. 3, Jan. 25, 1993, p. 22.

Schroeder, "Low Price Point Is Key for Buyers Of Text Databases," *PC Week*, vol. 8, No. 20, May 20, 1991, pp. 120 and 122.

Schroeder, "Multimedia offerings target expanded platform support," *PC Week*, vol. 10, No. 13, Apr. 5, 1993, pp. 59 and 73.

Schwartz, "Dataware Plants CD–ROM Seeds," *Computer Systems News*, No. 403, Feb. 6, 1989, p. 33.

Search Results from Dialog Search for MicroPatent for News Releases and Corporate Announcements Relating to APS, FullText, PatentImages, Espace, Dialog Files: 148, 479 and 648, 1989–1991.

Simon, "ZyImage: A Winning Combination of OCR And Text Indexing," *PC Magazine*, vol. 12, No. 6, Mar. 30, 1993, p. 56.

Simpson, Mastering WordPerfect 5.1 & 5.2 for Windows, p. 58, Jan. 1993.

Somers, "Personal Text–Retrieval Software Works with Calera's WordScan," *PC Magazine*, vol. 14, No. 2, Jan. 24, 1995, p. 68.

Spencer, "Tijuana data entry shop logs 500K forms/day," *ImagingWorld*, vol. 4, Issue 4, Apr. 1995.

Spitzer, "Needles in Document Haystacks" *DBMS*, vol. 9, No. 1, Jan., 1996, pp. 84–87.

Sullivan, "Dataware's CD Author System To Boast Hypertext Capability," *PCT Week*, vol. 8, No. 31, Aug. 5, 1991, pp. 31–32.

"Text Retrieval Products & Services," TextWare Corporation, Copyright 1996.

"TextWare: Instant Information Access," TextWare Corporation, Copyright 1995.

"TextWare Pricing," TextWare Corporation, Effective Mar. 26, 1996.

Thompson et al., *Full Write Professional—A User's Guide*, pp. 99–122, 1988.

Torgan, "ZyImage: Document Imaging and Retrieval System," *PC Magazine*, vol. 12, No. 3, Feb. 9, 1993, p. 62.

"Toshiba America Information Systems: CD–ROM Customer Profile," Dataware Technologies, Copyright 1995.

"Total Recall," Dataware Technologies, Copyright 1995.

Tredennick, Jr., J. C., Full–Text Search and Retrieval Winning Big With Computers, Law Practice Management, vol. 19, No. 8, Nov./Dec., 1993.

Tribute, "Searching CeBit for publishing products; Power Mac draws the crowds at Hannover show," *Seybold Report on Publishing Systems*, vol. 23, No. 15, Apr. 22, 1994, pp. 5–8.

Ueda, H., et al., "An Interactive Natural–Motion–Picture Dedicated Multi–Media Authoring System," Mar., 1991, pp. 343–350.

Understanding OCR, OmniPage Professional Windows Version 5, Caere Corporation, Chapter 6, pp. 6–1 to 6–8 and Glossary pp. 1–8, 1988–1993.

"Voyager cd–roms," Voyager, Spring, 1996.

"Voyager: cd–rom catalog," Voyager, 1996–1997.

R. W. Wiggins, Networked Hypermedia: The World–Wide Web and NCSA Mosaic, The Internet for Everyone—A Guide for Users and Providers, Chapter 13, pp. 245–290, McGraw–Hill, Inc., 1995.

"WorldView V. 1.1 and WorldView Press V. 1.0.2," Software Product Specification, Computer Select, Nov./1993.

Young, "UK Police Put Criminals On–Line With New National Computer," *Imaging Magazine*, Aug. 1995.

"ZyImage," ZyLab International, Inc., Copyright 1996.

"ZyImage: Common Questions Asked About ZyImage," ZyLab Europe BV, Copyright 1996.

"ZyImage Web Server," ZyLab Europe BV, Copyright 1996.

ZyIndex Developer's Toolkit Version 5.0 for Windows, Programmers Guide, Information Dimensions, 1992.

"ZyIndex Developer's Toolkit for Windows, Version 5.0, Programmer's Guide," ZyLab, Copyright 1992, pp. 1–35.

"ZyIndex for Windows User's Guide," ZyLab Division, Copyright 1992, pp. 1–262.

"ZyLab: The Full Text Retrieval & Publishing Experts," ZyLab Europe BV, Copyright 1996.

"ZyLab retrieval engine optimized for CD–ROM; ZyLab, Progressive Technologies merge," *Seybold Report on Desktop Publishing*, vol. 8, No. 10, Jun. 6, 1994, p. 40.

Ishii, H. "TeamWorkStation: Towards a seamless shared workspace", Proceedings of CSCW '90, 10/90, pp. 13–26.

Canzii, G. et al., "SDDS: Scientific Document Delivery System", *TEX for Scientific Documentation*, ed. By D. Lucarella, pp. 15–25, (1985).

Cefriel, S. P. et al., "ALIVE: A distributed live–link documentation", *Electronic Publishing*, vol. 5(3), pp. 131–142, (Sep. 1992).

Chamberlain, D.D. et al., "JANUS: An interactive document formatter based on declarative tags", *IBM Systems Journal*, vol. 21, No. 3, pp. 250–271, (1982).

Croft, W. Bruce et al., "A Loosely–Coupled Integration of a Text Retrieval System and an Object–Oriented Database System", *15th International SIGIR '92*, pp. 223–232.

Dengel, Andreas et al., "From Paper to Office Document Representation", *Computer*, Jul. 1992, pp. 63–67.

Ferguson, Michael J., "TEX is Multilingual", *1988 Conference Proceedings of the TEX Users Group*, pp. 179–187.

*Using FrameMaker: FrameMaker 4 X/Motif Version*, pp. 27–1 thru 27–30, Copyright 1986–1993 Frame Technology Corporation.

Furuta, Richard, "Important papers in the history of document preparation systems: basic sources", *Electronic Publishing*, vol. 5(1), pp. 19–44, (Mar. 1992).

Haan, Bernard J. et al., "IRIS: Hypermedia Services", *Communications of the ACM*, vol. 35, No. 1, pp. 36 and 38–51, (Jan. 1992).

Kahn, Paul, "Linking Together Books: Experiments in Adapting Published Material into Intermedia Documents", *Hypermedia*, vol. 1, No. 2, pp. 111–145, (1989).

Knuth, Donald E., *The TEXbook*, Addison–Wesley Publishing Company, 1986.

Knuth, Donald E. and Michael F. Plass, "Breaking Paragraphs into Lines", *Software–Practice and Experience*, vol. 11, pp. 1119–1184, (1981).

Koons, W. Randall et al., "The Computer Sciences Electronic Magazine: Translating From Paper To Multimedia", *CHI '92 Conference Proceedings*, pp. 11–18, (May 3–7, 1992).

Lesk, Michael, "The Core Electronic Chemistry Library", *SIGIR '91 Proceedings of the Fourteenth Annual International ACM/SIGR Conference on Research and Development in Information Retrieval*, 93–112, (Oct. 13–16, 1991).

Meyrowitz, Norman, "Intermedia: The Architecture and Construction of an Object–Oriented Hypermedia System and Applications Framework", *OOPSLA '86 Proceedings*, pp. 186–201, (Sep. 1986).

Miyazawa, M. et al., "An Electronic Book: APTBook" *Proceedings of the IFIP TC 13 Third International Conference on Human–Computer Interaction*, pp. 513–519, (1990).

Myers, Brad A., "Text Formatting By Demostration", Human factors in Computing Systems: Reaching Through Technology, *CHI '91 Conference Proceedings*, pp. 251–256, (1991).

Nelson, Theodor H., "Replacing the Printed Word: A Complete Literary System", *Information Processing 80: Proceedings of IFIP Congress 80*, pp. 1013–1021, (1980).

Raymond, Darrell R. and Frank Wm. Tompa, "Hypertext and the Oxford English Dictionary", *Communications of the ACM*, vol. 31, No. 7, pp. 871–879, (Jul. 1988).

Rubinstein, Richard, *Digital Typography: An Introduction to Type and Composition for Computer System Design*, pp. 195–233, (Addison–Wesley Publishing Company 1988).

Savoy, Jacques, "The electronic book Ebook3", *International Journal of Man–machine Studies*, vol. 30, pp. 505–523, (1989).

Story, Guy A., "The RightPages Image–Based Electronic Library for Alerting and Browsing", *Computer*, pp. 17–25, (Sep. 1992).

Text Search and Retrieval Reference Manual for the Automated Patent System, by the U.S. Department of Commerce and the U.S. Patent and Trademark Office, Section 4, pp. 1–6, (Oct. 1992).

Yankelovich, N. et al., "Reading and Writing the Electronic Book", *Computer*, pp. 15–29, (Oct. 1985).

Yankelovich, N. et al., "Intermedia: The Concept and the Construction of a Seamless Information Environment", *Computer*, pp. 81–96, (Jan. 1988).

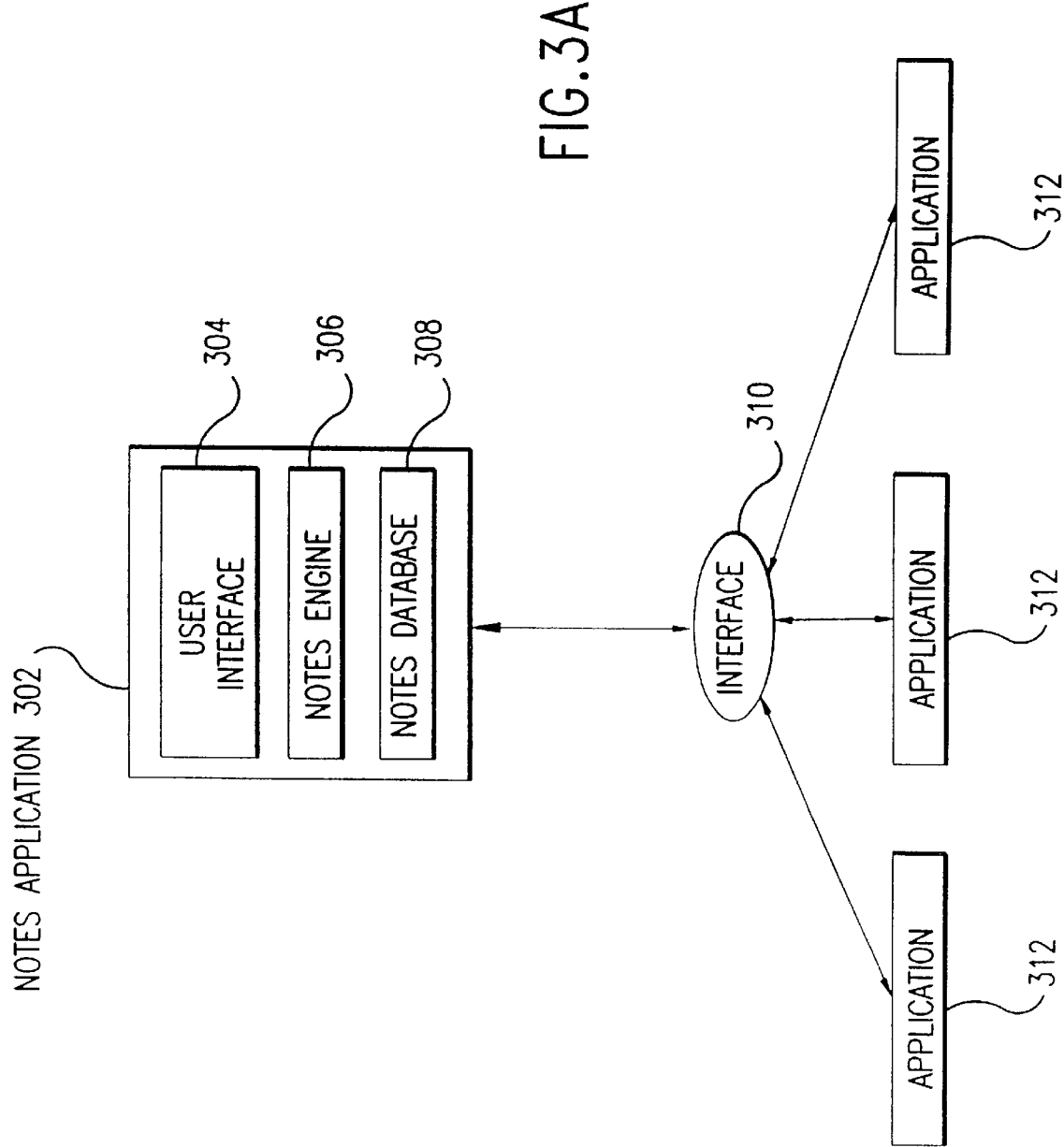

SYSTEM, METHOD, AND COMPUTER PROGRAM PRODUCT FOR CREATING SUBNOTES LINKED TO PORTIONS OF DATA OBJECTS AFTER ENTERING AN ANNOTATION MODE

CROSS REFERENCE TO RELATED APPLICATIONS

The present application is a continuation of Ser. No. 08/632,801 filed Apr. 17, 1996, is now U.S. Pat. No. 5,806,079 allowed, which is a continuation-in-part of Ser. No. 08/423,676, filed Apr. 18, 1995, now U.S. Pat. No. 5,623,679 issued on Apr. 22, 1997, which is a continuation-in-part of Ser. No. 08/341,129, filed Nov. 18, 1994, abandoned, which is a continuation-in-part of Ser. No. 08/155,752, filed Nov. 19, 1993, now U.S. Pat. No. 5,623,681 issued on Apr. 22, 1997. U.S. Pat. Nos. 5,623,679 and 5,623,681 and Ser. No. 08/341,129 and 08/632,801 are herein incorporated by reference in their entireties.

BACKGROUND OF THE INVENTION

1. Field of the Invention

The present invention relates generally to organizing, linking, and maintaining disparate data objects. More particularly, the invention relates to organizing, linking, and maintaining disparate data objects using an intelligent and powerful note engine.

2. Related Art

Data Organization

In today's Computer Age, there exists a vast amount of information that can be processed by computers. Such information is generally referred to herein as data objects.

There are many computer applications and computer-related devices for generating and processing data objects, such as word processing applications, spreadsheet applications, presentation managers, database managers, financial applications, networking applications, communication applications, sound recorders and processors, video recorders and processors, on-line service applications, scanners, computer aided drafting (CAD) applications, etc. As will be appreciated, the data objects generated and processed by these applications and devices vary widely in subject matter. Also, these data objects come in many forms, such as text files, image files, video files, audio files, etc. Accordingly, these data objects are disparate in both form and content.

It is often desirable to organize information such that data objects that somehow relate to a particular topic are associated with other data objects that are related to the same topic. Hyperlinks represent a conventional mechanism for associating data objects with other data objects. FIG. 1 illustrates a scenario involving Documents A, B, C, D, and E. Document A is linked to Document B via Hyperlink B. In a similar manner, Document B is linked to Documents C and D, and Document D is linked to Document E. A user follows Hyperlinks B, C, D, and E to traverse through Documents A, B, C, D, and E using a conventional "point-and-click" methodology.

As apparent from FIG. 1, Hyperlinks B, C, D, and E form a trail through Documents A, B, C, D, and E. This trail represents the organization of Documents A, B, C, D, and E. However, Hyperlinks B, C, D, and E do not document or explain this trail. Accordingly, it can be said that Hyperlinks B, C, D, and E form an undocumented trail through Documents A, B, C, D, and E.

Consider, for example, Hyperlink B. Hyperlink B merely serves to link Document A to Document B. Hyperlink B does not describe why Document A is linked to Document B. Instead, the explanation or rationale for the linkage of Document A with Document B must be inferred by the user from the contents of Documents A and B.

However, it is often difficult to discern the rationale for the linkage between data objects. This is especially true for data objects which are not directly linked (Documents A and B represent two data objects that are directly linked), but which are indirectly linked (Documents A and E represent two data objects that are indirectly linked). For example, it may be very difficult for a user to determine the rationale for the indirect linkage of Document E to Document A. To discern the rationale for this linkage, it may be necessary for the user to review the contents of Documents A, B, D, and E. This could be a difficult and time-consuming task. Even then, the user may not be able to determine the rationale for the linkage. The user is unable to discern this rationale by reference to Hyperlinks B, D, and/or E since, as discussed above, these hyperlinks do not convey any information to the user.

In addition, a user will not know of the existence of Document E when following traditional links from Document A until he/she gets to Document E. This link (from Document A to Document E) may be the only link of interest to the user. The traditional linking mechanism is wasteful, as it requires the user to traverse through Documents B and D in order to arrive at Document E. Also, the user may end the search at Document B or Document D, thereby never getting to Document E. Further, traditional linking mechanisms do not provide a means by which to create links, with contextual information within and between different data objects. This type of linkage would provide the user with critical information as to how and why data objects are internally and externally related. Also, traditional links fail to provide the user with the ability to link the same portion of a data object with multiple links and notes to other data objects as well as to other portions of the same data object with varying contextual information on the rational for the links and user ideas or comments on the portion of the linked data object.

Accordingly, there is a need for a mechanism that not only organizes, associates, and links data objects internally and externally, but also conveys contextual information explaining the rationale for such organization, association, and linkage, as well as the users' thoughts regarding the data objects.

Adding Notes to Data Objects

It is often desirable to add notes to data objects. Such notes may include a description of the contents of the data objects, instructions or comments to people working with the data objects, project notes, etc.

Some computer applications allow users to attach notes to data objects. For example, some word processors (such as MICROSOFT WORD and WORD PERFECT) allow users to attach notes to their documents. Typically, the user positions the cursor at the point in the document where he wishes to insert the note. The user then keys in the text for the note. The note is linked to the point in the document where the cursor was positioned.

Some spreadsheet applications (such as MICROSOFT EXCEL) allow users to attach notes to their spreadsheets. FIG. 2 illustrates an example spreadsheet window 204. The user has attached a note 212 to cell 206 of the spreadsheet 204 via a link 210. A small icon 208 located in cell 206 indicates that a note (in this case, note 212) is linked to cell 206. The user accesses the note 212 from the spreadsheet 204 by clicking on the icon 208.

The note functionality of conventional computer applications (including those described above) is limited in many respects. First, these applications restrict the manner in which users are allowed to associate notes with data objects. For example, these applications permit a note to be associated with only a single element in a data object. See FIG. 2, where note 212 is associated with only cell 206. It is not possible to associate note 212 with multiple cells or to establish intra or inter data object links. Also, notes cannot be associated with partial overlapping portions of data objects. For example, the spreadsheet 204 in FIG. 2 does not allow a first note to be associated with cells 206 and 214, and a second note to be associated with cells 214 and 216.

Second, these applications do not allow users to group related notes together. Accordingly, these applications do not permit users to organize their notes.

Third, these applications do not provide a mechanism for documenting the rationale for linking notes to data objects. For example, in FIG. 2, the link 210 conveys no information that explains the rationale for linking note 212 with cell 206. Instead, the user must attempt to discern this rationale from the contents of note 212 and cell 206.

Fourth, these applications do not provide a mechanism for establishing intra or inter data object linking, such as between different spreadsheets in EXCEL or linking with a word processor data object or another computer application data object.

The restrictions described above severely diminish the usefulness of notes. Notes are intended to convey information. The ability of notes to convey information is diminished if notes cannot be associated with any portions of data objects, and if notes cannot be organized and structured, and if the rationale for linking notes to data objects is not explicitly conveyed to users.

Accordingly, there is a need for a more flexible and intelligent mechanism for attaching notes to data objects.

Potential Loss of Information

Given these limitations of conventional data organization and note tools, users are not motivated or encouraged to utilize computer related tools to organize work product and data objects that are collected and generated during the performance of a task or project. Instead, such work product and data objects are often maintained in an unorganized state, often scattered about a person's office or haphazardly stored in a makeshift filing system. Also, a person's thinking is not typically documented or recorded. Instead, such thinking remains in the person's head.

Thus, a person's thinking, work product, and data objects that are collected and generated during the performance of a task or project are easily lost (either temporarily or permanently) if the person becomes unavailable, is unable to completely remember his thinking, or loses his work product. The person and the person's employer then suffer from this loss of information.

Accordingly, what is required is a system and method for enabling the organization and recordation of a person or group's thinking, work product, and data objects collected or generated during a project or task. Such organization and recordation serves to institutionalize the person or group's thinking, work product, and data objects, thereby protecting against the unavailability of persons, memory loss, or loss of work product.

SUMMARY OF THE INVENTION

Generally speaking, the present invention is directed to a system and method of linking notes to data objects. The invention enables a user to select a portion of a data object associated with an application. The invention creates a sub-note in a note, and links the sub-note to the selected portion. The invention receives a request from a user viewing the note to display the selected portion linked to the sub-note. In response to this request, the invention invokes the application, if the application is not already invoked, and causes the application to load the data object and present the selected portion.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE FIGURES

The present invention will be described with reference to the accompanying drawings, wherein:

FIG. 3A is a block diagram of a notes application according to a preferred embodiment of the present invention;

DETAILED DESCRIPTION OF THE PREFERRED EMBODIMENTS

Table of Contents

Figure 1:
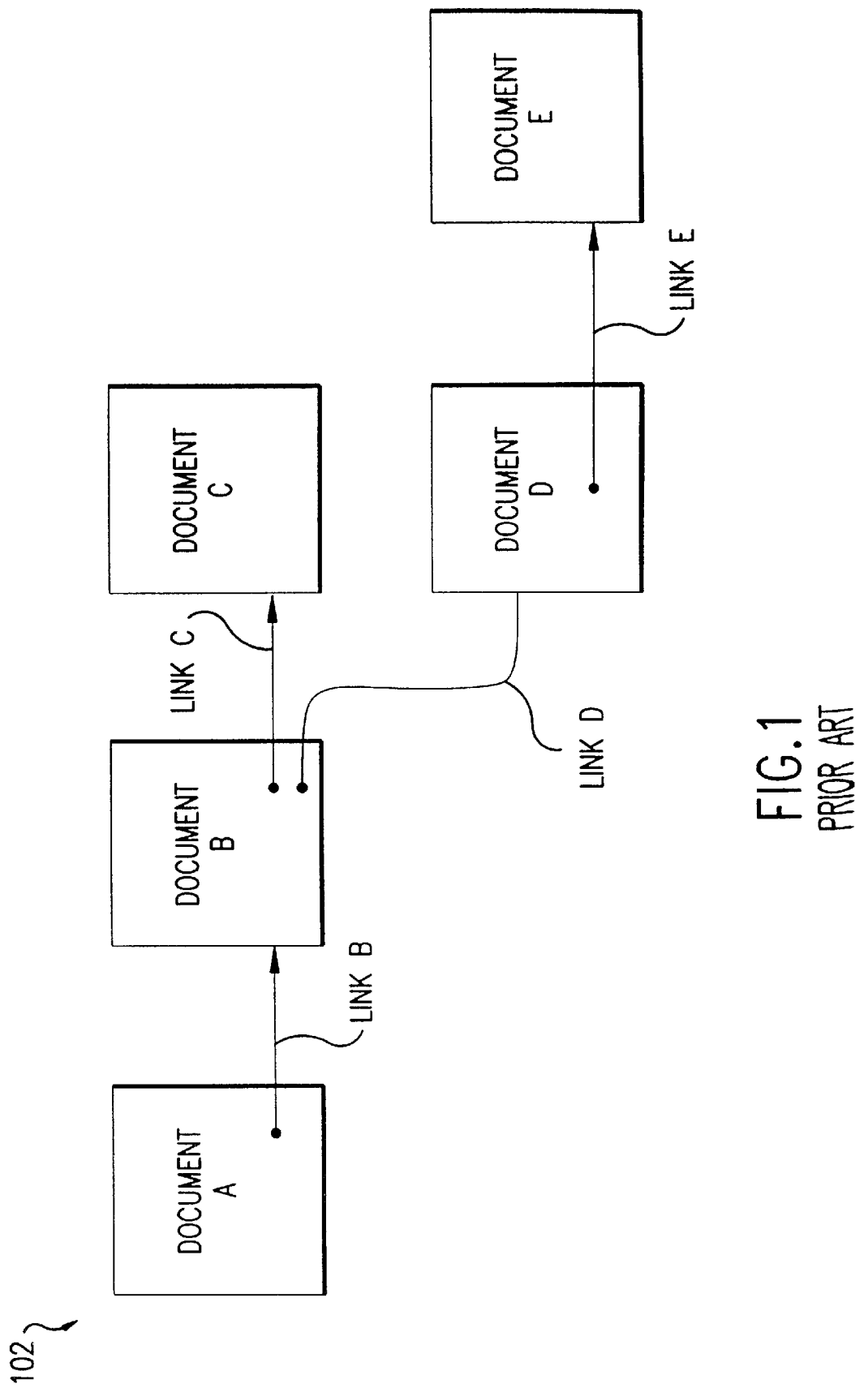
FIG. 1 illustrates a conventional scenario comprising linked documents.
Figure 2:
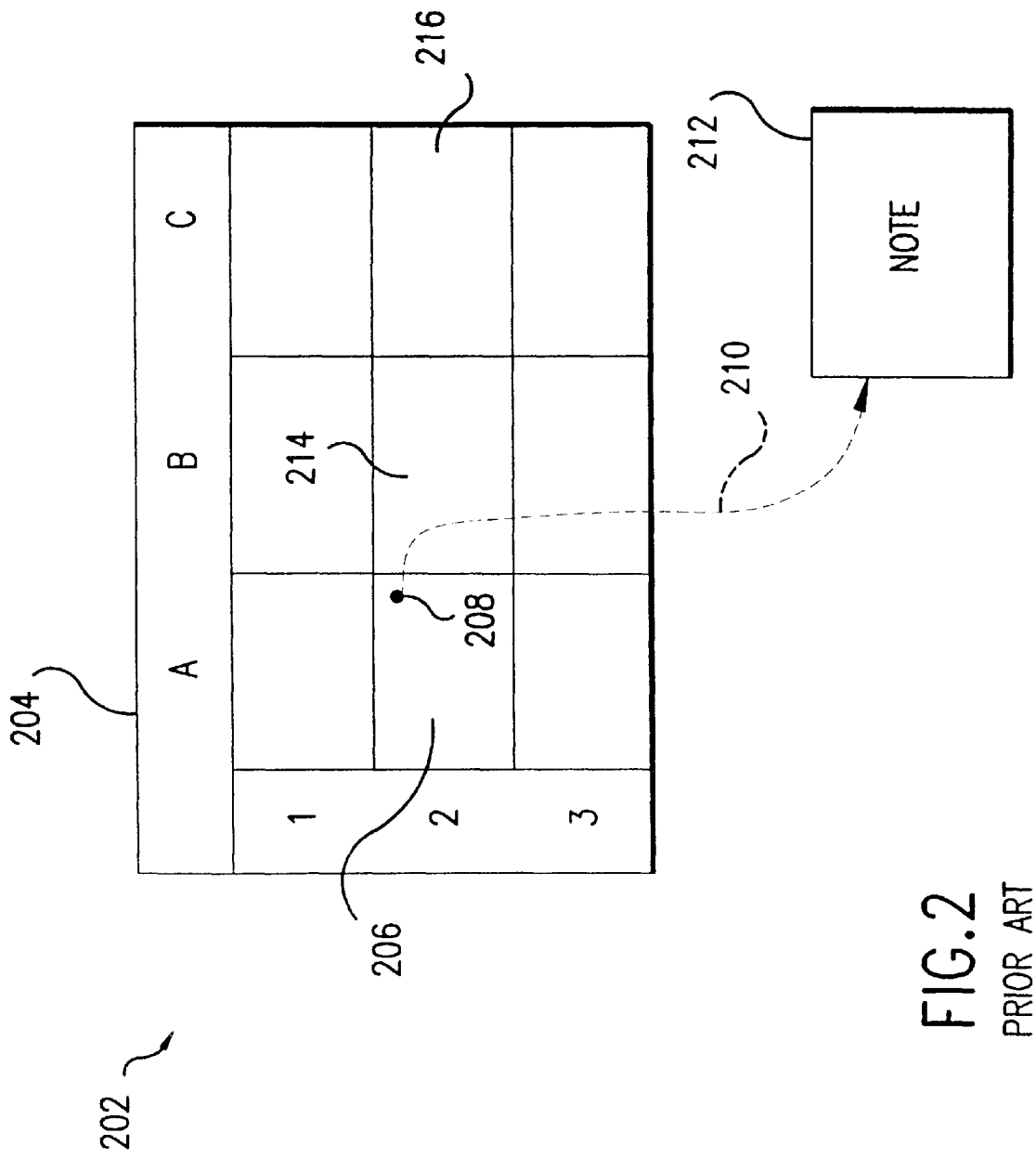
FIG. 2 illustrates a conventional spreadsheet application having limited note capabilities.

| | | Page |
|---|---|---|
| 1. | Overview of the Invention | 11 |
| | 1.1 Medical Example | 12 |
| 2. | Structure of the Present Invention | 17 |
| 3. | Features and Capabilities of the Present Invention | 20 |
| | 3.1 Note/Sub-Note Organization | 20 |
| | 3.2 Linking Sub-Notes To Data Objects | 21 |
| | 3.3 Examples of Note/Sub-Note Organization and Linking Sub-Notes To Data Objects | 25 |
| | 3.4 Viewing Notes, Sub-Notes, and Data Objects | 32 |
| |     3.4.1 Note View | 33 |
| |     3.4.2 Object View | 35 |
| |     3.4.3 Link View | 36 |
| |     3.4.4 User-Defined View | 37 |
| | 3.5 Editing Note/Sub-Note Organization | 38 |
| |     3.5.1 Modification | 38 |
| |     3.5.2 Replication | 39 |
| | 3.6 User Interface | 40 |
| | 3.7 Security | 42 |
| |     3.7.1 Security on Individual Note Groupings, Notes, Sub-notes, Links, and Data Objects | 43 |
| |     3.7.2 Security on the Note Database as a Whole | 44 |
| | 3.8 Search Capabilities | 46 |
| 4. | Notes Database | 47 |
| 5. | Operation of the Invention | 52 |
| | 5.1 Launch an Application | 54 |
| | 5.2 Create a Note/Sub-note (From the Note Menu) | 54 |
| | 5.3 Create a Note/Sub-note (Using a Pen) | 59 |
| | 5.4 View Note (By Selecting a Linking Button in a Data Object) | 61 |
| | 5.5 View Note (From the Note Menu) | 62 |
| | 5.6 Select View | 66 |
| | 5.7 Modify Privacy/Security Settings | 69 |
| | 5.8 Find Note/Sub-note | 69 |
| | 5.9 Edit One or More Notes | 70 |
| 6. | Applications of the Invention | 71 |
| | 6.1 Movie Production | 71 |
| | 6.2 Bar Review Program | 73 |
| 7. | Conclusion | 75 |

1. Overview of the Invention

The present invention is directed to a system and method for attaching notes to data objects, and for linking data objects via the use of notes. The note capabilities of the present invention can be used to organize, associate, annotate, and link data objects in an intra and/or inter data object environment with single notes and multiple subnotes and/or multiple notes and subnotes to the same data object portions or different data object portions as required by the needs of the user to institutionalize his/her knowledge. Additionally, the note capabilities of the present invention can be used to convey information explaining the rationale for such organization, association, and linkage. Accordingly, the present invention represents a system and method for using intelligent notes to organize, associate, annotate, and link data objects. The invention can also be used to manipulate these data objects.

As used herein, the term "object" refers to any information in any form that can be accessed and/or processed by a computer. Such information includes data generated and/or processed by computer applications and computer-related devices such as word processing applications, spreadsheet applications, presentation managers, database managers, financial applications, networking applications, communication applications, sound recorders and processors, video recorders and processors, on-line service applications, scanners, computer aided drafting (CAD) applications, virtual reality applications and environments, etc. The data objects generated and processed by these applications and devices vary widely in subject matter. Also, these data objects come in many forms, such as text files, image files, video files, audio files, computer programs, etc. Accordingly, these data objects are disparate in both form and content.

The invention is adapted to memorialize and/or institutionalize a person's or group's thinking and work product regarding a subject. If a person's or group's thinking and work product are not memorialized or institutionalized, then such thinking and work product may be lost or not accessible when needed if the person or group becomes unavailable, or is unable to remember its thinking, or loses its work product.

1.1 Medical Example

Figure 41:
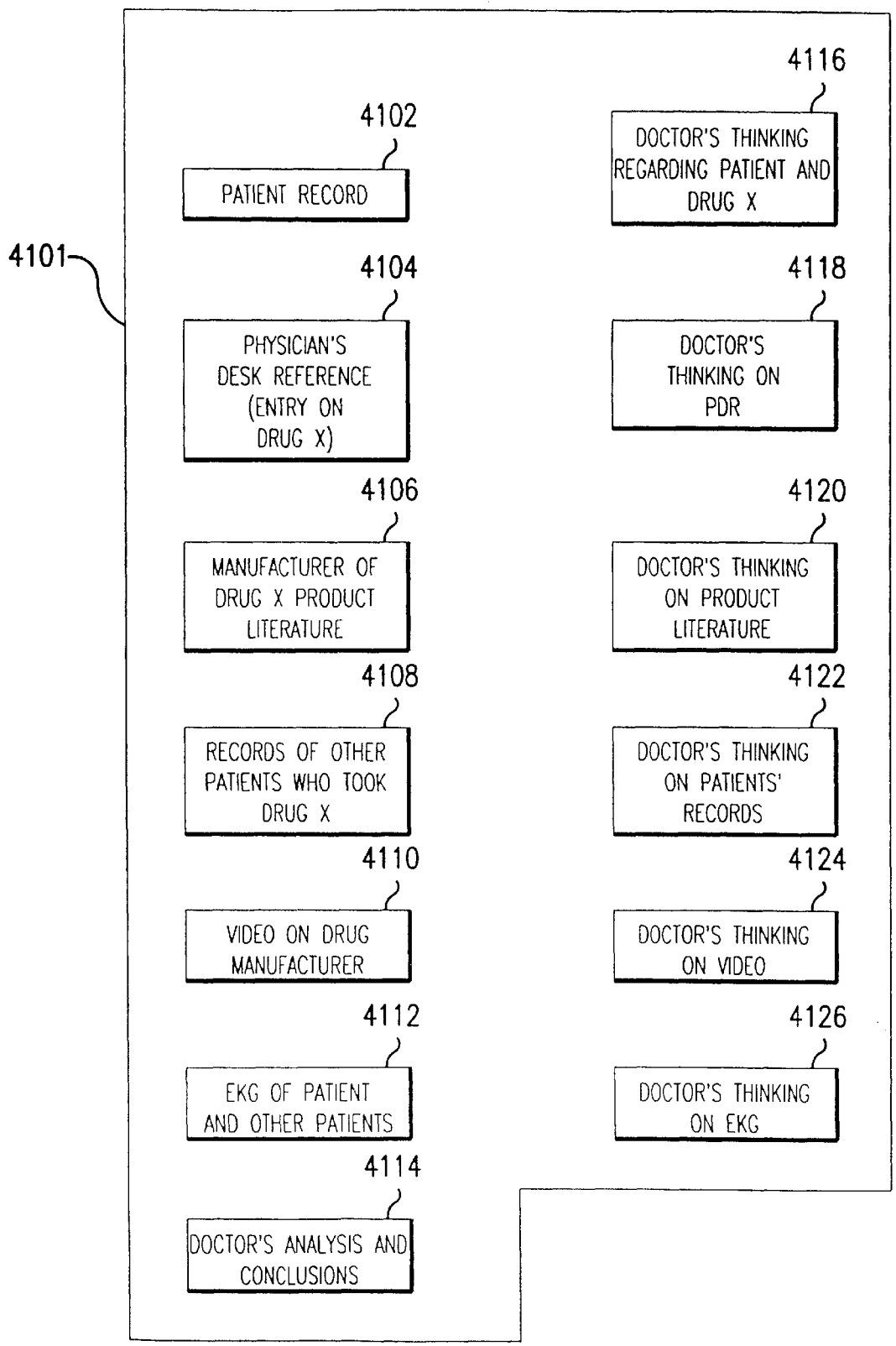
FIGS. 41 and 42 illustrate a medical related example.

The invention shall initially be described by way of an example. Consider a scenario where a doctor is attempting to determine the reasons for a patient's recent health problems involving numbness in the legs. Referring to FIG. 41, the doctor first reviews the patient's record 4102. The doctor notices that the patient has high blood pressure. The doctor also notices that the patient has been taking Drug X for approximately one year (for a reason other than high blood pressure). The doctor speculates that Drug X, high blood pressure, and numbness in the legs are related to one another. The doctor's review of the patient record 4102 and his speculation regarding Drug X, high blood pressure, and numbness in the legs represent the doctor's thinking 4116. The doctor may or may not record this thinking 4116.

The doctor then consults the Physician's Desk Reference (PDR) 4104 to see if it has an entry on Drug X. The PDR 4104 has a short entry on Drug X. This entry indicates that Drug X is a new drug (which is the reason for the short entry in the PDR), and lists the manufacturer of Drug X. The doctor decides that he needs to contact this drug manufacturer. This decision of the doctor constitutes the doctor's thinking 4118 regarding the PDR 4104. The doctor may or may not record such thinking 4118.

The doctor contacts the drug manufacturer. The drug manufacturer sends Drug X product literature 4106 to the doctor. The doctor reviews the product literature 4106. The product literature 4106 indicates that there have been some studies linking Drug X with heart problems. The doctor begins to suspect that Drug X combined with high blood pressure results in some type of heart problems. The doctor's suspicions represent his thinking 4120 regarding the product literature 4106. The doctor may or may not record such thinking 4120.

The doctor then watches a video tape 4110 of a news story on the drug manufacturer. The news story indicates that, in the past, drugs made by the drug manufacturer have had adverse and unexpected side effects. This news story supports the doctor's suspicion that Drug X made by the drug manufacturer may have adverse effects when taken by patients with high blood pressure. The doctor's thinking on the video tape 4110 is represented by thinking 4124, which may or may not be recorded.

The doctor then pulls the records of people who have previously taken Drug X. Such records are indicated as 4108 in FIG. 41. The records 4108 indicate that some people taking Drug X subsequently developed heart problems. Only some of these people, however, previously had high blood pressure. The doctor decides to order the EKG records 4112 of his patient and also of the people who had high blood pressure, took Drug X, and subsequently developed heart problems. The doctor's thinking in this regard is represented by thinking 4122, which may or may not be recorded.

The doctor reviews the EKG records 4112 of the people who had high blood pressure, took Drug X, and subsequently developed heart problems. The doctor notices a slight heart murmur in these people. This heart murmur developed approximately one year after the people started taking Drug X. These people suffered severe heart attacks approximately six months after the development of the heart murmurs. The doctor theorizes that Drug X, when taken by people with high blood pressure, eventually causes severe heart problems. Such heart problems begin with slight heart murmurs approximately one year after taking Drug X, and conclude with a severe heart attack approximately six months thereafter. The doctor speculates that the heart murmurs could cause numbness in a person's legs, which is the symptom that his patient is experiencing. The doctor's thinking in this regard is represented by thinking 4126 and conclusions 4114, which may or may not be recorded.

The doctor recalls that his patient has been taking Drug X for approximately one year. The doctor reviews his patient's EKG, and notices that slight heart murmurs have begun. The doctor immediately instructs his patient to stop taking Drug X.

The scenario described above and shown in FIG. 41 represents a conventional investigation, analysis, and decision process. This conventional process may or may not be documented. In particular, the doctor's thinking during each step of the process may or may not be documented. Such thinking is represented by blocks 4116, 4118, 4120, 4122, 4124, 4126, and 4114. The doctor may document such thinking (by writing or dictating notes, for example). However, the doctor is just as likely to maintain his thinking only in his head. In this latter case, the doctor's thinking will be lost or not accessible when needed if the doctor becomes unavailable, or is unable to remember his thinking.

The investigation, analysis, and decision process represented by FIG. 41 will not be fully documented, even if the doctor documents his thinking in blocks 4116, 4118, 4120, 4122, 4124, 4126, and 4114. In other words, the total work product and thinking resulting from the investigation, analysis, and decision process of FIG. 41 will not be fully documented simply by the documentation of thinking blocks 4116, 4118, 4120, 4122, 4124, 4126, and 4114. This is the case for at least two reasons. First, such documentation will be very disorganized. The documentation will not indicate how one note is related to another note. Second, such documentation will include only the doctor's thinking (represented by blocks 4116, 4118, 4120, 4122, 4124, 4126, and 4114). The documentation will not include the source materials upon which such thinking was based or a reference to the exact portion (text excerpt, video section, audio segment, etc.) that is relevant to the doctor's thinking and analysis. In instances with voluminous source material, the lack of this type of reference or the like prevents the doctor from clearly communicating and recording the basis for the analysis. That is, the documentation will not include the patient record 4102, the entry of the PDR 4104 dealing with Drug X, the product literature 4106, the records 4108 of people who took Drug X, the video 4110 on the drug manufacturer, or the EKG records 4112. The documentation may contain cites to some of these data objects, but it would be necessary for a person to manually retrieve these data objects in order to evaluate them. Such manual retrieval is inefficient, as it requires another person to perform the same tasks as the doctor. Also, such manual retrieval may not be possible, since source materials often become unavailable over time. Further, as noted above, such cites will not be to the exact portion (text excerpt, video section, audio segment, etc.) that is relevant to the doctor's thinking and analysis.

The invention addresses and solves the problems illustrated by the conventional investigation, analysis, and decision process of FIG. 41. The invention is adapted to memorialize and/or institutionalize the doctor's total work product and thinking related to the investigation, analysis, and decision process. By doing so, the invention ensures that the doctor's total work product and thinking will survive and be accessible when needed, even if the doctor becomes unavailable, or is unable to remember his thinking, or loses the hard copies of his work product.

Figure 42:
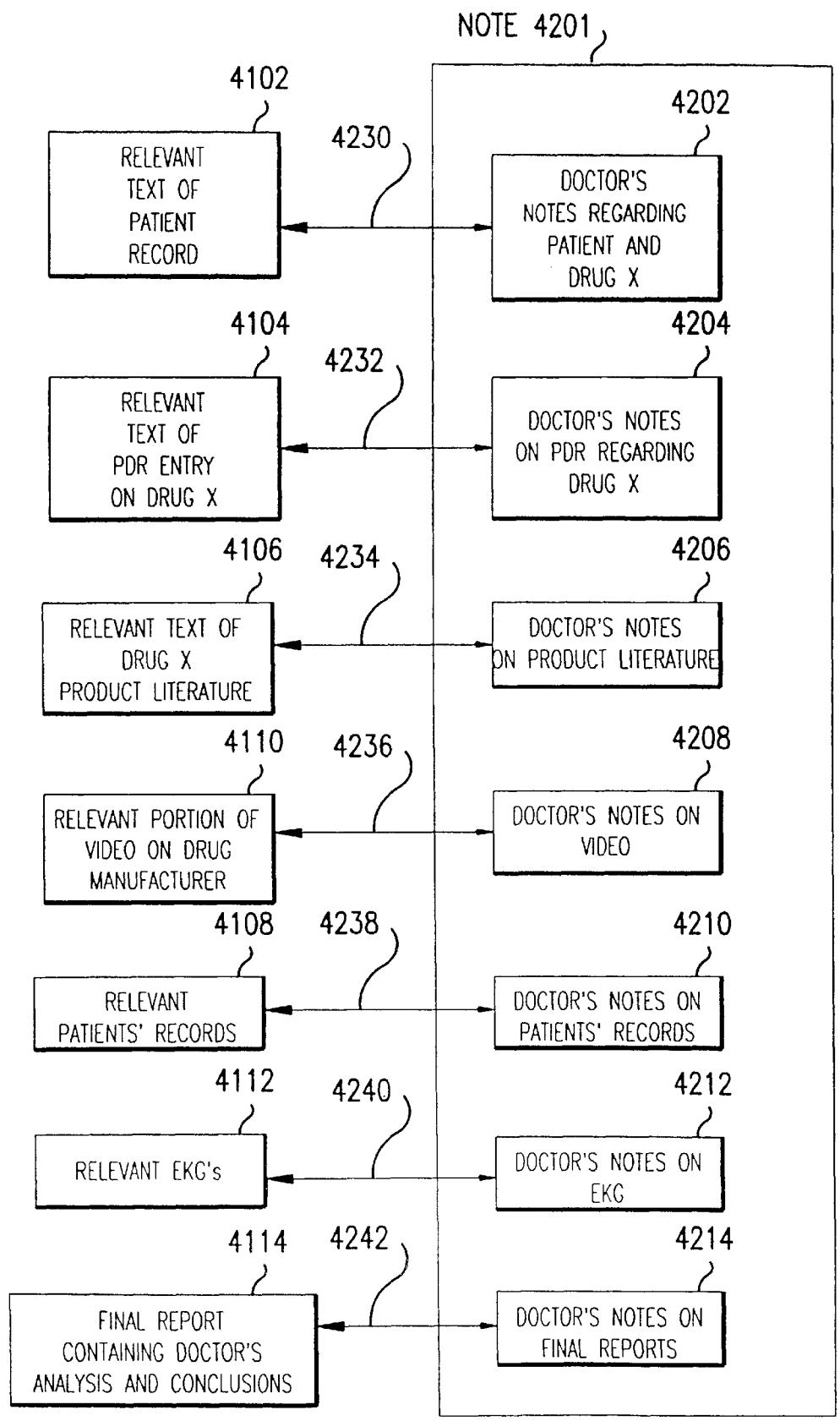

The operation of the invention is represented by FIG. 42. The invention allows the doctor to create a note 4201 comprising multiple sub-notes 4202, 4204, 4206, 4208, 4210, 4212, 4214. The doctor records his thinking in these sub-notes 4202, 4204, 4206, 4208, 4210, 4212, 4214. For example, according to the present invention, the doctor reviews the patient's record 4102 and notices that the patient has high blood pressure. The doctor also notices that the patient has been taking Drug X for approximately one year (for a reason other than high blood pressure). The doctor speculates that Drug X, high blood pressure, and numbness in the legs are related. The doctor records his thinking regarding the patient record 4102 and the potential relationship between Drug X, high blood pressure, and numbness in the legs in sub-note 4202.

The sub-notes 4202, 4204, 4206, 4208, 4210, 4212, 4214 are linked to the relevant portions of the source materials upon which the doctor's thinking is based. Such linkage is represented by links 4230, 4232, 4234, 4236, 4238, 4240, and 4242. For example, the doctor links sub-note 4202 to the relevant portion of the patient's record 4102. As another example, recall that the doctor consults the Physician's Desk Reference (PDR) 4104 to see if it has an entry on Drug X. The PDR 4104 has a short entry on Drug X. This entry indicates that Drug X is a new drug (which is the reason for the short entry in the PDR), and lists the manufacturer of Drug X. The doctor decides that he needs to contact this drug manufacturer. The doctor records his thinking regarding the Drug X entry in the PDR 4104 in sub-note 4204. The doctor links sub-note 4204 to that relevant portion of the PDR 4104 containing the entry on Drug X. By linking sub-note 4204 to only the relevant portion of the PDR 4104 pertinent to the doctor's thinking recorded in sub-note 4204, the doctor's creates a documented trail that is more useful and effective at communicating his work product and thinking.

The sub-notes 4202, 4204, 4206, 4208, 4210, 4212, 4214 and the links 4230, 4232, 4234, 4236, 4238, 4240, 4242 collectively represent the doctor's total work product and thing. The sub-notes 4202, 4204, 4206, 4208, 4210, 4212, 4214 and the links 4230, 4232, 4234, 4236, 4238, 4240, 4242 are stored in a computer database. Thus, the invention memorializes and/or institutionalizes the doctor's total work product and thinking.

The invention is preferably implemented using a notes application 302 (FIG. 3). The notes application 302 is described in the following section.

2. Structure of the Present Invention

FIG. 3A is a block diagram of a notes application 302 according to a preferred embodiment of the present invention. The notes application 302 includes a user interface 304, a notes engine 306, and a notes database 308. The notes database 308 includes notes and sub-notes (also called note sections) that are attached to data objects generated and/or processed by computer applications 312. The computer applications 312 include any computer applications that generate and/or process information, such as word processing applications, spreadsheet applications, presentation managers, database managers, financial applications, networking applications, communication applications, sound processors, video processors, on-line service applications, computer aided drafting (CAD) applications, etc.

The notes engine 306 manages the notes database 308. More particularly, the notes engine 306 enables users to create, modify, delete, link, view, and otherwise manipulate the notes and sub-notes in the notes database 308. Users gain access to the functions supported by the notes engine 306 via the user interface 304.

In performing its function, the notes application 302 drives, controls, manipulates, and otherwise interacts with the computer applications 312. For example, the notes application 302 controls the applications 312 so as to open data objects (i.e., open files containing data objects), display particular portions of data objects, highlight portions of data objects using particular fonts, patterns, and/or colors, display icons and/or buttons, etc.

Preferably, the present invention achieves this functionality by interacting with applications 312 that support an interface 310 defining the interaction between computer applications. Preferably, the interface 310 uses the Object Linking Embedded (OLE) standard. The OLE standard is well known and defines the manner in which one software application may drive, control, manipulate, and otherwise interact with another software application. The OLE standard is described in many publicly available documents, such as *Microsoft OLE Programmers Reference,* Volumes I and II, 1993, which are herein incorporated by reference in their entirety.

It should be understood that the invention is not limited to use with OLE components. The applications 312 can be any conventional or implementation specific applications, as long as they have the capability of being externally controlled (in this case, as long as they have the capability of being controlled by the notes application 302).

Standard windows operations are mentioned in this disclosure. Such operations include selecting text, opening files, moving between windows, resizing windows, editing documents, etc. Such operations are well known and are described in many publicly available documents, such as *Microsoft Word for Windows Users Guide,* 1994, incorporated herein by reference in its entirety.

Figure 28:
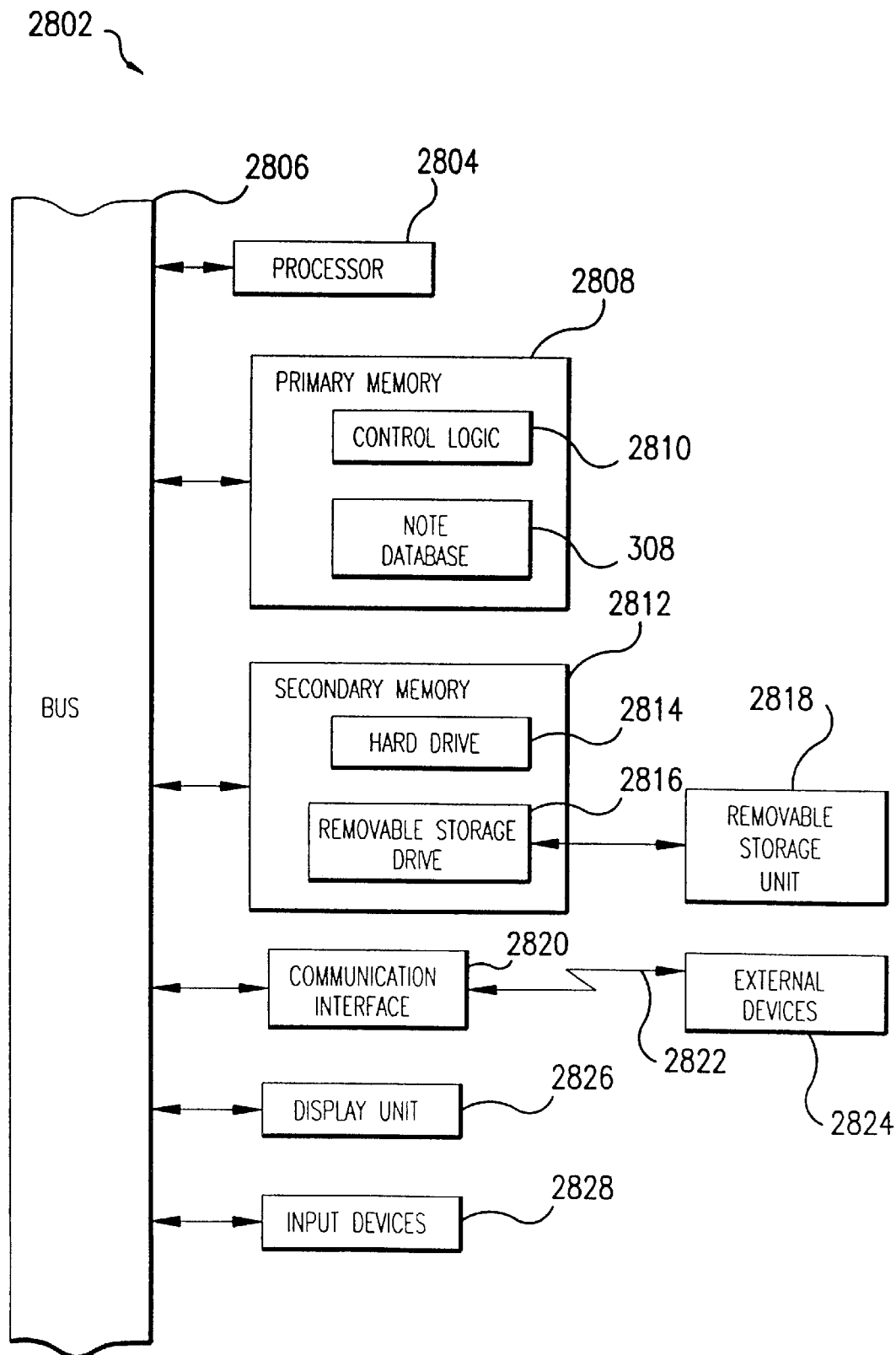
FIG. 28 is a block diagram of an exemplary computer system useful for implementing the present invention.

In an embodiment of the present invention, components of the present invention (such as the notes application 302) are each implemented using a computer system 2802 such as that shown in FIG. 28. The computer system 2802 includes one or more processors, such as a processor 2804. The processor 2804 is connected to a communication bus 2806. The computer system 2802 also includes a main or primary memory 2808, preferably random access memory (RAM). The primary memory 2808 has stored therein control logic 2810, such as software corresponding to the notes application 302, and the notes database 308.

It should be understood that the notes database 308 is not necessarily stored within a single computer. Instead, the notes database 308 may be distributed among multiple computers. Such distribution of the notes database 308 is described in further detail below.

The computer system 2802 also includes a secondary memory 2812. The secondary memory 2812 includes, for example, a hard disk drive 2814 and/or a removable storage drive 2816, representing a floppy disk drive, a magnetic tape drive, a compact disk drive, a program cartridge and cartridge interface (such as that found in video game devices), a removable memory chip (such as EPROM or PROM), etc., which is read by and written to by removable storage unit 2818. As will be appreciated, the removable storage unit 2818 includes a computer usable storage medium having stored therein computer software and/or data. The removable storage drive 2816 reads from and/or writes to a removable storage unit 2818 in a well known manner. Removable storage unit 2818, also called a program storage device or a computer program product, represents a floppy disk, magnetic tape, compact disk, etc.

Computer programs (also called computer control logic) are stored in main memory 2808 and/or the secondary memory 2812. Such computer programs, when executed, enable the computer system 2802 to perform the functions of the present invention as discussed herein. In particular, the computer programs, when executed, enable the processor 2804 to perform the functions of the present invention. Accordingly, such computer programs represent controllers of the computer system 102. The notes application 302 preferably represents a computer program executing in the computer system 2802.

The computer system 2802 also includes a communication interface 2820. The communications interface 2820 enables the computer system 2802 to communicate and interact with locally or remotely located external devices 2824 via a communications medium 2822. In particular, communications interface 2820 enables the computer system 2802 to send and receive software and data to/from the external devices 2824. Examples of the communications interface 2822 include a modem, a network interface (such as an Ethernet card), a communications port, etc.

The computer system 2802 also includes a display unit 2826, such as a computer monitor, and one or more input devices, such as a keyboard and a pointing device (such as a mouse, trackball, etc.).

In one embodiment, the invention is directed to a system 2802 as shown in FIG. 28, and having the functionality described herein. In another embodiment, the invention is directed to a computer program product having stored therein computer software (having the functionality described herein) for controlling computer systems, such as computer system 2802. In another embodiment, the invention is directed to a system and method for transmitting and/or receiving computer software (having the functionality described herein) to/from external devices 2824.

3. Features and Capabilities of the Present Invention

The present invention includes a multitude of features and capabilities which enable it to achieve the advantages discussed herein. Many of these features and capabilities are discussed in the following sections.

3.1 Note/Sub-Note Organization

Figure 29:
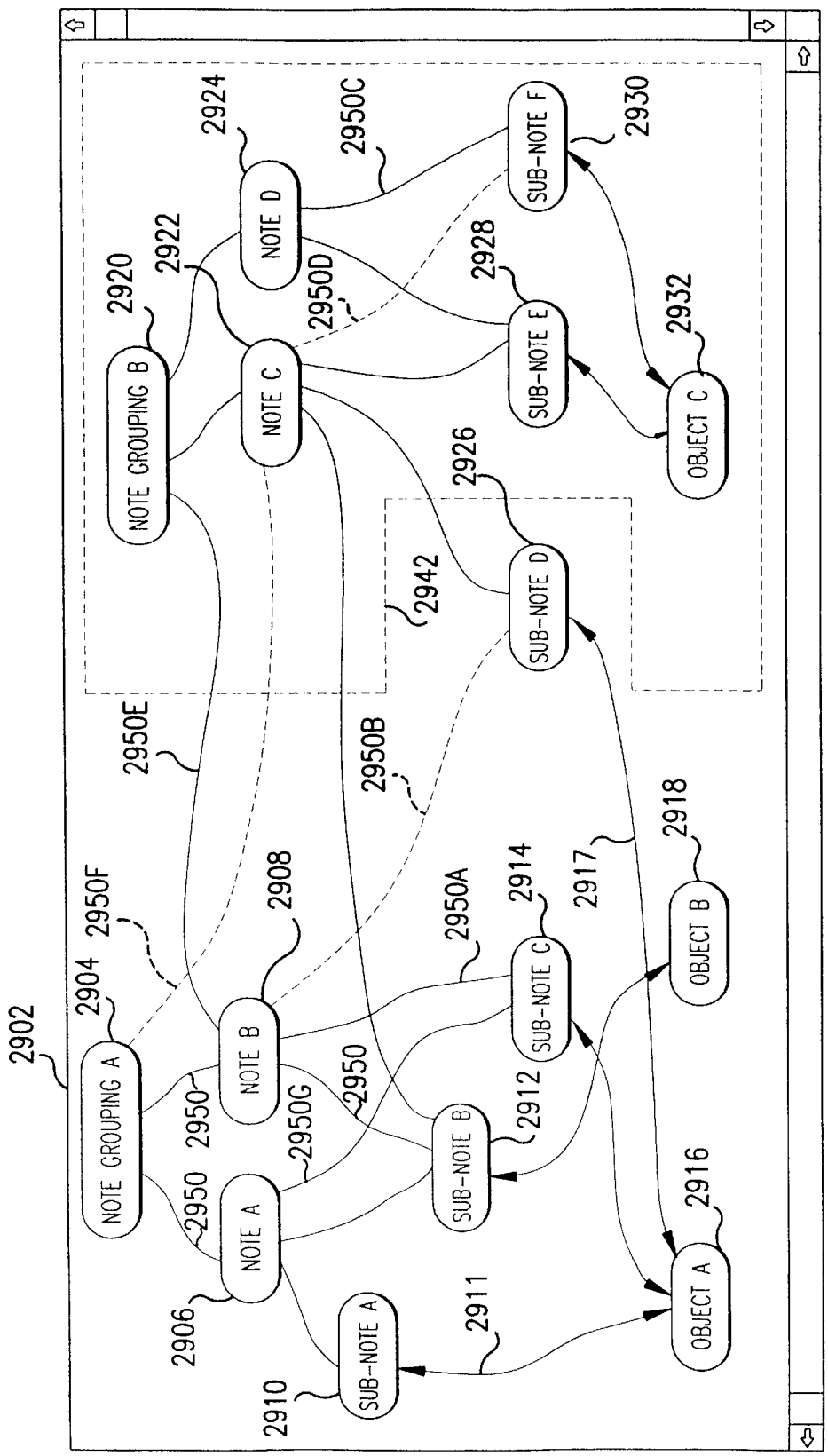
FIG. 29 illustrates an example link view.

The present invention supports a note/sub-note hierarchy, where a note may include zero or more sub-notes. This is shown in FIG. 29, for example, where Note A includes Sub-notes A, B, and C. Note B includes Sub-notes B and C (dashed line 2950B is discussed below), Note C includes Sub-notes B, D, and E, and Note D includes Sub-notes E and F.

The note/sub-note hierarchy is useful for organizing information. In particular, the note/sub-note hierarchy allows users to group together related sub-notes for organization purposes. Related sub-notes may be grouped together under one note.

The note/sub-note hierarchy is extendable to multiple levels. For example, related notes can be grouped together under a note grouping. In FIG. 29, for example, Notes A and B are grouped together under Note Grouping A. Notes B, C, and D are grouped together under Note Grouping B. It should be understood that the invention is not limited to the three level hierarchy shown in the example of FIG. 29. The invention is extendable to more than three levels.

The note/sub-note hierarchy of the invention is very flexible. Multiple note groupings may include the same note. For example, both Note Groupings A and B include Note B. Also, multiple notes may include the same sub-note. For example, Notes A, B, and C include Sub-note B.

The note/sub-note hierarchy is defined by users. That is, users define which notes are contained in note groupings, and which sub-notes are contained in notes. The invention includes tools for enabling users to define and modify the note/sub-note hierarchy (such tools are discussed below).

3.2 Linking Sub-Notes To Data Objects

The present invention allows users to link sub-notes to portions of data objects. In FIG. 29, for example, Sub-note A is linked to a portion of Data Object A via link 2911. As discussed above, a data object represents any information in any form that can be accessed and/or processed by a computer. The data objects generated and processed by these applications and devices vary widely in subject matter. Also, these data objects come in many forms, such as text files, image files, video files, audio files, computer programs, etc. Accordingly, these data objects are disparate in both form and content.

Users can navigate from sub-notes to data objects via the links. For example, a user can navigate from Sub-note A to Data Object A via link 2911.

The links between sub-notes and data objects are bidirectional. Thus, in addition to being able to navigate from sub-notes to data objects via the links, users can also navigate from data objects to sub-notes via the links. For example, a user can navigate from Data Object A to Sub-note A via link 2911.

A sub-note may be linked to all or any portion of a data object. Multiple sub-notes may be linked to portions of the same data object. This is true, whether the sub-notes are in the same or different notes. These data object portions may be completely overlapping, partially overlapping, or non-overlapping. Also, the sub-notes in a note may be linked to portions of a single data object, or to portions of one or more data objects.

A data object may be linked to one or more sub-notes (these sub-notes may be in the same note, or in multiple notes). In FIG. 29, for example, data object A is linked to Sub-notes A, C, and D.

Users can navigate from sub-notes in a first note to sub-notes in a second note via common data objects. In FIG. 29, for example, a user can navigate from Sub-note A in Note A to Sub-note D in Note C via Data Object A, which is linked to both Sub-note A (via link 2911) and Sub-note D (via link 2917).

The linking capabilities of the present invention shall be further described by reference to an example scenario presented in FIG. 3B. The notes application 302 in the example of FIG. 3B includes notes 314A and 314B (these notes are stored in the notes database 308, which is not explicitly shown in FIG. 3B). Each note 314 includes a plurality of sub-notes 316.

Each sub-note 316 is linked to a data object 320. Each data object 320 is associated with one or more applications 312. A data object 320 is associated with an application 312 if the application 312 is capable of accessing and/or processing the data object 320. More particularly, each sub-note 316 is linked to a portion 322 of a data object 320. A portion 322 may include all or part of a data object 320. Portions 322 in the same data object 320 that are linked to sub-notes 316 may be distinct (non-overlapping), may completely overlap, or may partially overlap.

For purposes of illustration, it is assumed herein that each data object is associated with a single computer program application. This association between data objects and applications may be established in any well known manner, such as by file extension. For example, all files having a "wpd" extension are as a default associated with the WORD PERFECT word processing application, all files having a "wks" extension are as a default associated with the LOTUS 1-2-3 spreadsheet application, all files having a "db" extension are as a default associated with the PARADOX database application, etc. These default associations between data objects and applications are preferably user definable. Preferably, users may override these default associations at the time that a sub-note is linked with a data object, or at any time thereafter.

A note 314 may contain sub-notes 316 that are linked to portions 322 of a single data object 320, or multiple data objects 320. These data objects 320 may be associated with a single application 312, or with multiple applications 312. For example, note 314A includes sub-notes 316A, 316B, 316C that are linked to portions 322A, 322C, 322B, respectively, of data objects 320A, 320B that are associated with application 312A. Note 314A also includes a sub-note 316D that is linked to portion 322D of object 320C associated with application 312B.

Multiple sub-notes 316 in the same or different notes 314 may be linked to the same portion 322 of a data object 320. For example, sub-notes 316D and 316F are linked to portion 322D of object 320C.

A note 314 represents a data object. Accordingly, a sub-note 316 may be linked to a portion of a note 314. For example, sub-note 316E is linked to portion 322F of note 314B. Portion 322F includes sub-note 316G.

Each sub-note 316 includes a content field 1512 (FIG. 15) that is used to convey information. The contents of the content field 1512 are user definable. Preferably, the content field 1512 includes at least information that explains the rationale for linking the sub-note 316 to the portion 322 of the data object 320. For example, the content field 1512 could include a description of how the portions 322 linked to the sub-notes 316 in the note 314 are related to one another. The content field 1512 can be any format or combination of formats, such as text, sound, video, image, executable program, tactile (such as braille), etc.

Figure 3B:
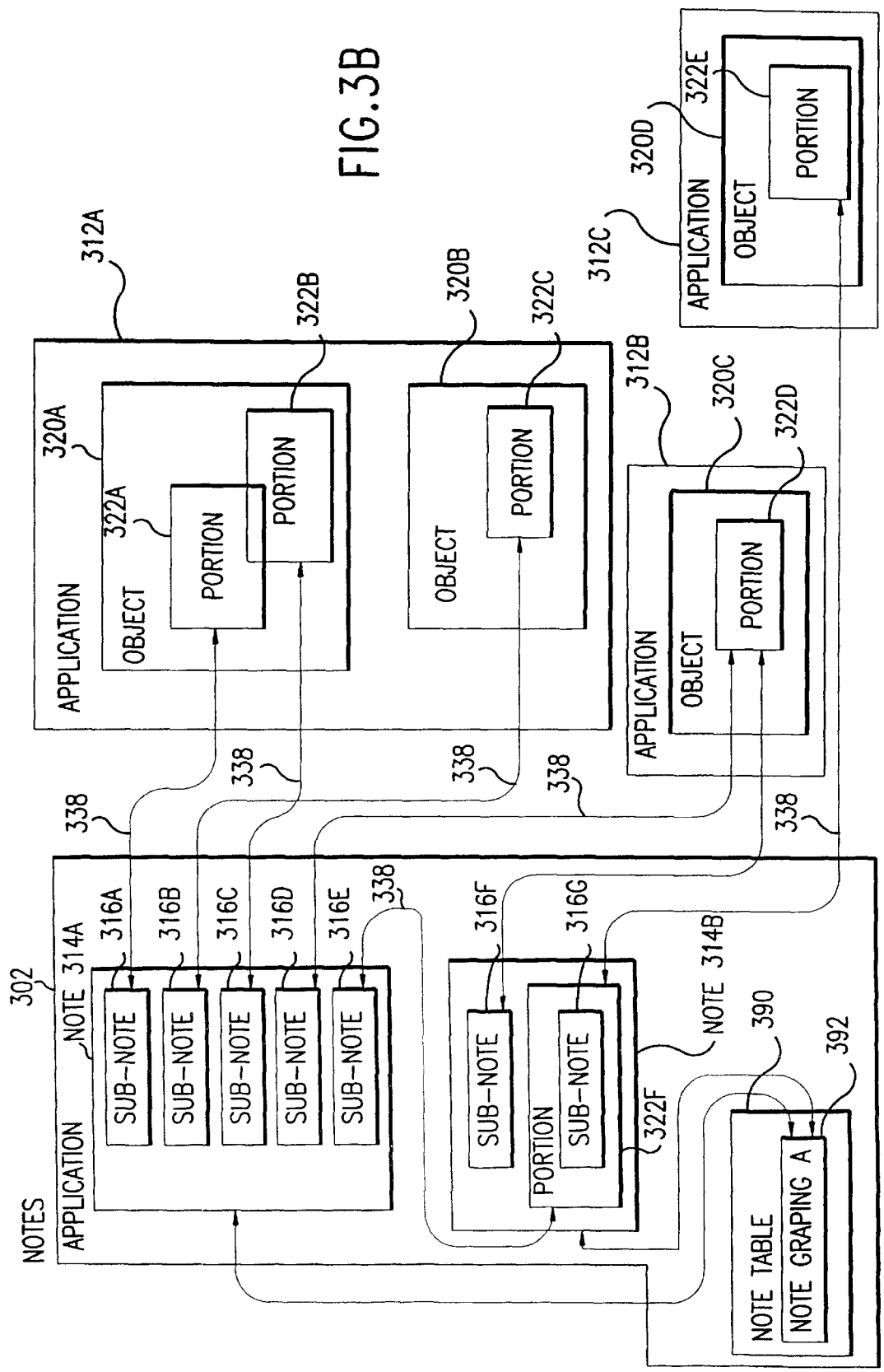
FIG. 3B is a block diagram used to explain the linking capabilities of the present invention.

The mechanism for linking portions 322 of data objects 320 with sub-notes 316 is generally represented in FIG. 3B as links 338. According to the present invention, this linking mechanism 338 is bi-directional. Thus, a user viewing portion 322B of data object 320A can issue a command to view sub-note 316C. Also, a user viewing sub-note 316D can issue a command to automatically launch application 312B, load data object 320C, and view portion 322D.

The linking mechanism 338 of the present invention enables users to easily traverse through related data objects 320, and through sub-notes 316. For example, a user could command the notes application 302 to display the note 314A. From note 314A, the user could move from sub-note 316A to portion 322A and back again, from sub-note 316B to portion 322B and back again, etc. Accordingly, the notes 314 and sub-notes 316 represent a trail through portions 322 in data objects 320.

The linking mechanism 338 of the present invention enables users to access portions 322 of data objects 320 in any order. This represents random access technology. For example, a user can access in any order the portions 322 of data objects 320 linked to the sub-notes 316 in the note 314A. In this respect, the invention is superior to conventional mechanisms for linking documents, such as that shown in FIG. 1, where documents must be accessed in a predefined order. Such conventional mechanisms represent sequential or linear access technology. Thus, the trail through documents provided by the linking mechanism 338 of the present invention is much more flexible and user-friendly than the trail provided by conventional linking mechanisms.

One or more notes can be grouped together under one note grouping. A note grouping table 390 or other database construct is used to keep track of which notes are in which note groupings. In the example of FIG. 3B, notes 314A and 314B are in Note Grouping A. Each note 314 preferably includes information that identifies which Note Grouping it is in, such that it is possible to traverse from a note to a note grouping, and vice versa. This is described further below. Further levels of organization are also supported by the invention, using the same or extensions of the organizational constructs (note groupings, notes, sub-notes, links, etc.) discussed herein.

The note/sub-note hierarchy feature and the linking feature of the invention as described above collectively provide at least two ways to organize information, and to memorialize/institutionalize a person or group's thinking and work product. First, the notes application 302 provides a note/sub-note hierarchy. The note/sub-note hierarchy allows users to group together related sub-notes for organization purposes. That is, related sub-notes may be grouped together under one note. The grouping together of related sub-notes conveys to a certain extent the rationale for the linking together of data objects 320.

Second, the notes application 302 provides a means for explicitly documenting the trail through data objects 320 as established by the linking mechanism 338. Such documentation is achieved by the sub-notes 316. As discussed above, each sub-note 316 includes a content field 1512 (FIG. 15) that is used to convey information. The content field 1512 preferably includes at least information that explains the rationale for linking the sub-note 316 to the portion 322 of the data object 320. Thus, the rationale for the trail established by the linking mechanism 338 is explicitly explained by the information contained in the sub-notes 316.

3.3 Examples of Note/Sub-Note Organization and Linking Sub-Notes To Data Objects The note/sub-note hierarchy feature and the linking feature of the invention shall now be further described in this section by the use of examples. These examples will also serve to illustrate the general operation of the note application 302.

Figure 5:
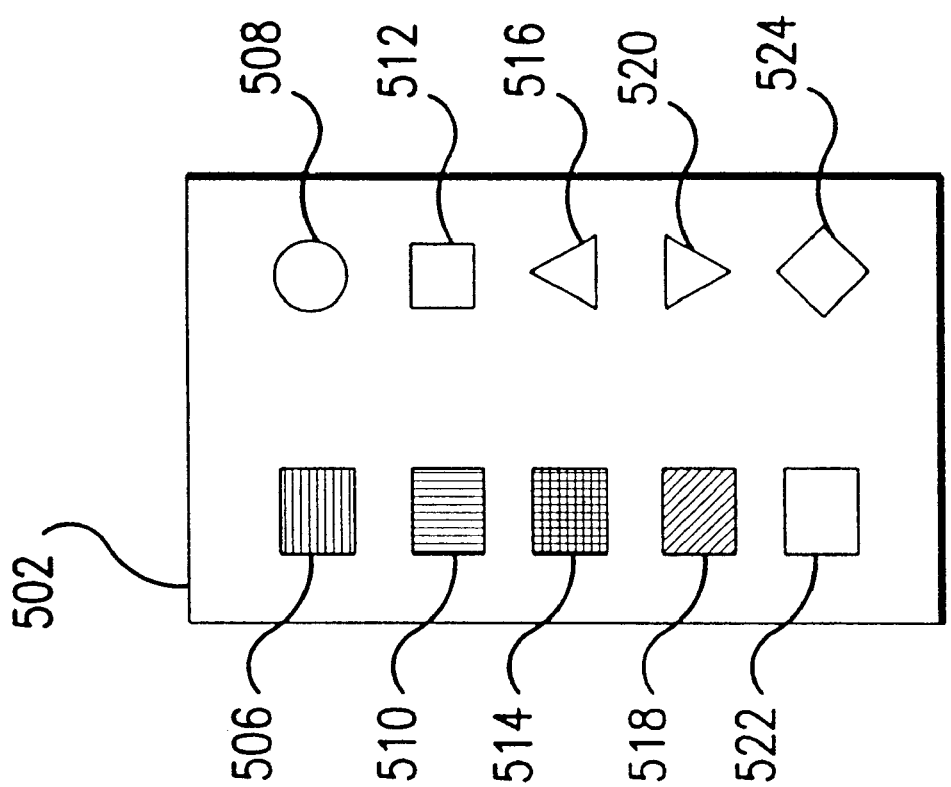
FIG. 5 is a legend of colors/fonts and symbols used by the present invention.

FIG. 5 is a legend 502 of colors 506, 510, 514, 518, 522 used by the present invention for color coding purposes. Colors 506, 510, 514, 518, 522 are preferably red, green, yellow, blue, and violet, although other colors could alternatively be used. Colors 506, 510, 514, 518, 522 could represent different patterns and/or fonts in addition to or instead of colors. This is especially useful when the notes application 302 is used with a computer having a black and white monitor. In one embodiment, the colors/patterns/fonts are user definable (this embodiment is discussed further below).

The legend 502 depicts different symbols 508, 512, 516, 520, 526 used by the present invention. For purposes of the present invention, symbols 508, 512, 516, 520, and 524 are associated with colors 506, 510, 514, 518, and 522, respectively. When displaying these symbols 508, 512, 516, 520, 526, the invention fills the symbols 508, 512, 516, 520, 526 with their associated colors 506, 510, 514, 518, 522, respectively.

Figure 4:
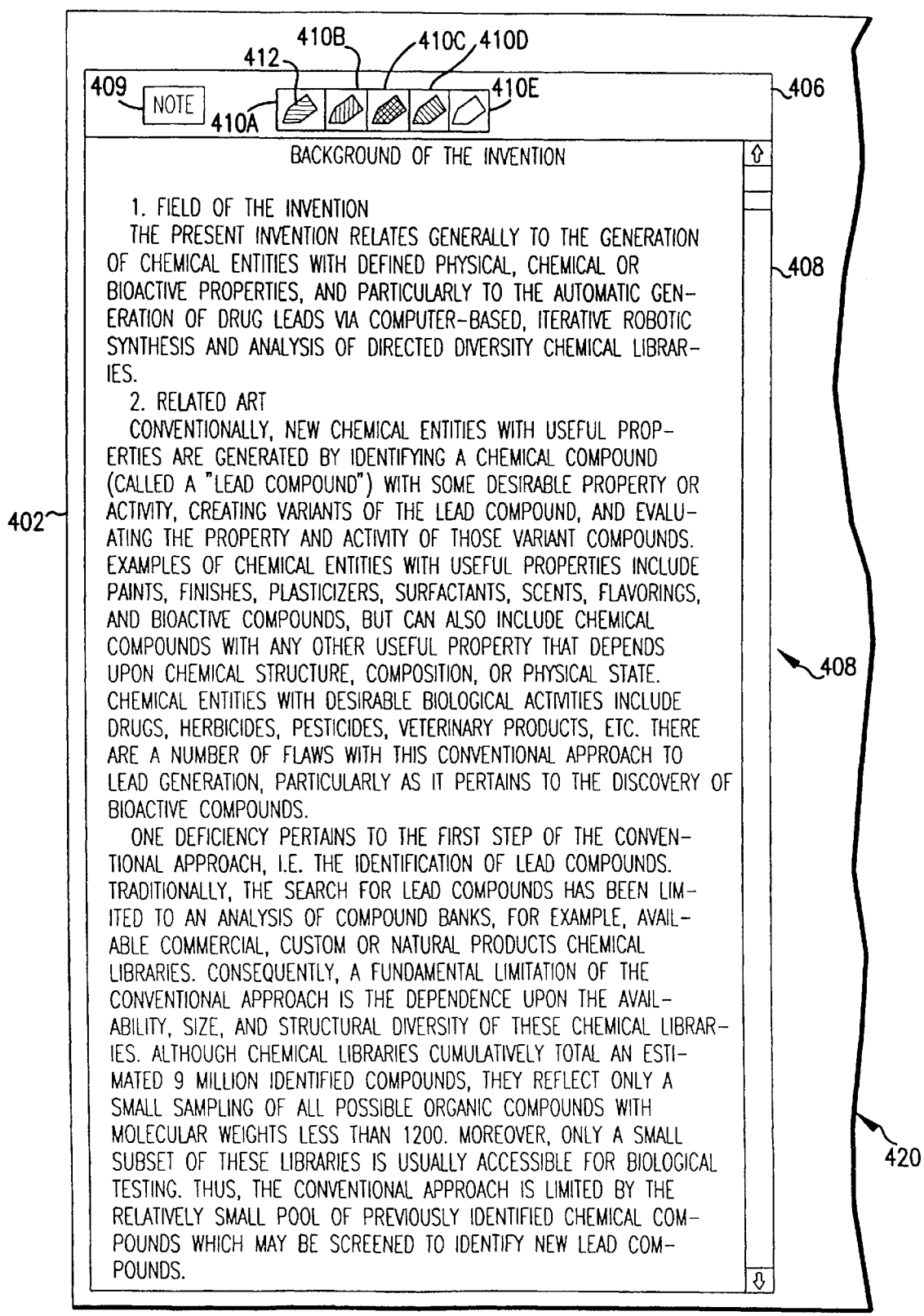
FIGS. 4, 6A, 6B, 7A, 7B, 8, 9, 10, 11, 12, and 13 illustrate example screen displays generated by the present invention.

FIG. 4 depicts an example computer display 402 of the display unit 2826 (FIG. 28). The computer display 402 is currently displaying a notes toolbox window 406 and an application window 408. Also shown. in FIG. 4 is a pointer 420 corresponding to the mouse or other pointing device, such as a trackball.

The application window 408 is generated by an application that can process text data objects, such as a word processor or the SMARTPATENT WORKBENCH available from SmartPatents, Inc., Menlo Park, Calif. The application window 408 is currently displaying a portion of a U.S. Patent.

The notes toolbox window 406 includes a note menu button 409 and a plurality of pen buttons 410. In the example of FIG. 4 the notes toolbox window 406 includes five pen buttons 410, but the notes toolbox window 406 could alternatively include other numbers of pen buttons 410.

Figure 16:
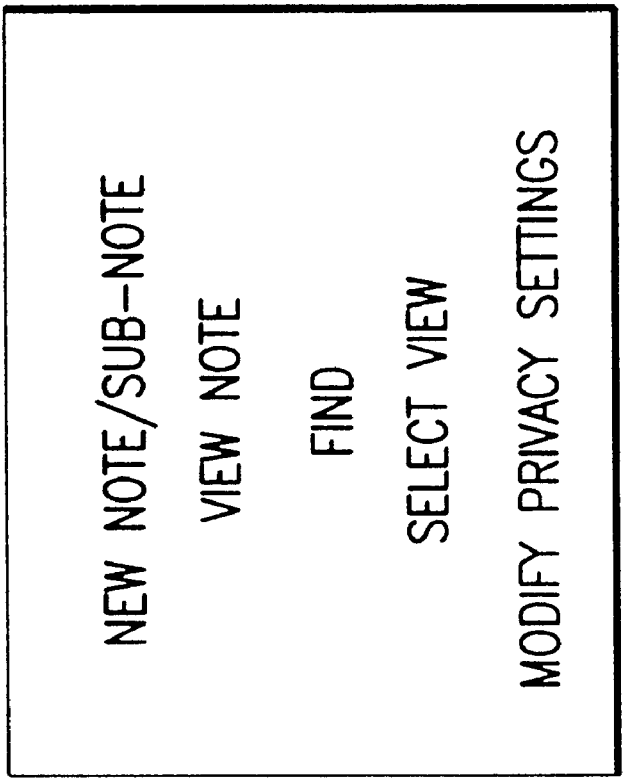
FIG. 16 illustrates a note menu of the present invention.

A user presses the note menu button 409 to access the note menu 1602 (FIG. 16). From the note menu 1602, the user can access functions provided by the notes application 302 for manipulating notes and sub-notes. These functions include creating a new note and/or sub-note, viewing an existing note and its sub-notes, finding a particular note or sub-note, selecting a view, and modifying privacy settings. The note menu 1602 is discussed in detail below.

Each pen button 410 includes an image of a pen, such as pen image 412 in pen button 410A. The pen images in the pen buttons 410 are color coded using the colors 506, 510, 514, 518, 522 shown in FIG. 5.

The pen buttons 410 are used to select portions of data objects that are to be linked with sub-notes of notes. The pen buttons 410 are used as follows. A user selects one of the pen buttons 410 using the mouse. The pointer 420 representing the mouse on the computer display then changes to the image of a pen. The color of the pen is the same as the color of the pen image in the pen button 410 that the user selected. The user then manipulates the pen using the mouse to select a portion of the currently displayed data object (in the case of FIG. 4, a portion of the patent displayed in the application window 408). The selected portion of the data object is color coded using the same color as the pen. The notes application 302 creates a new sub-note, and links the sub-note to the selected portion of the data object.

Figure 6A:
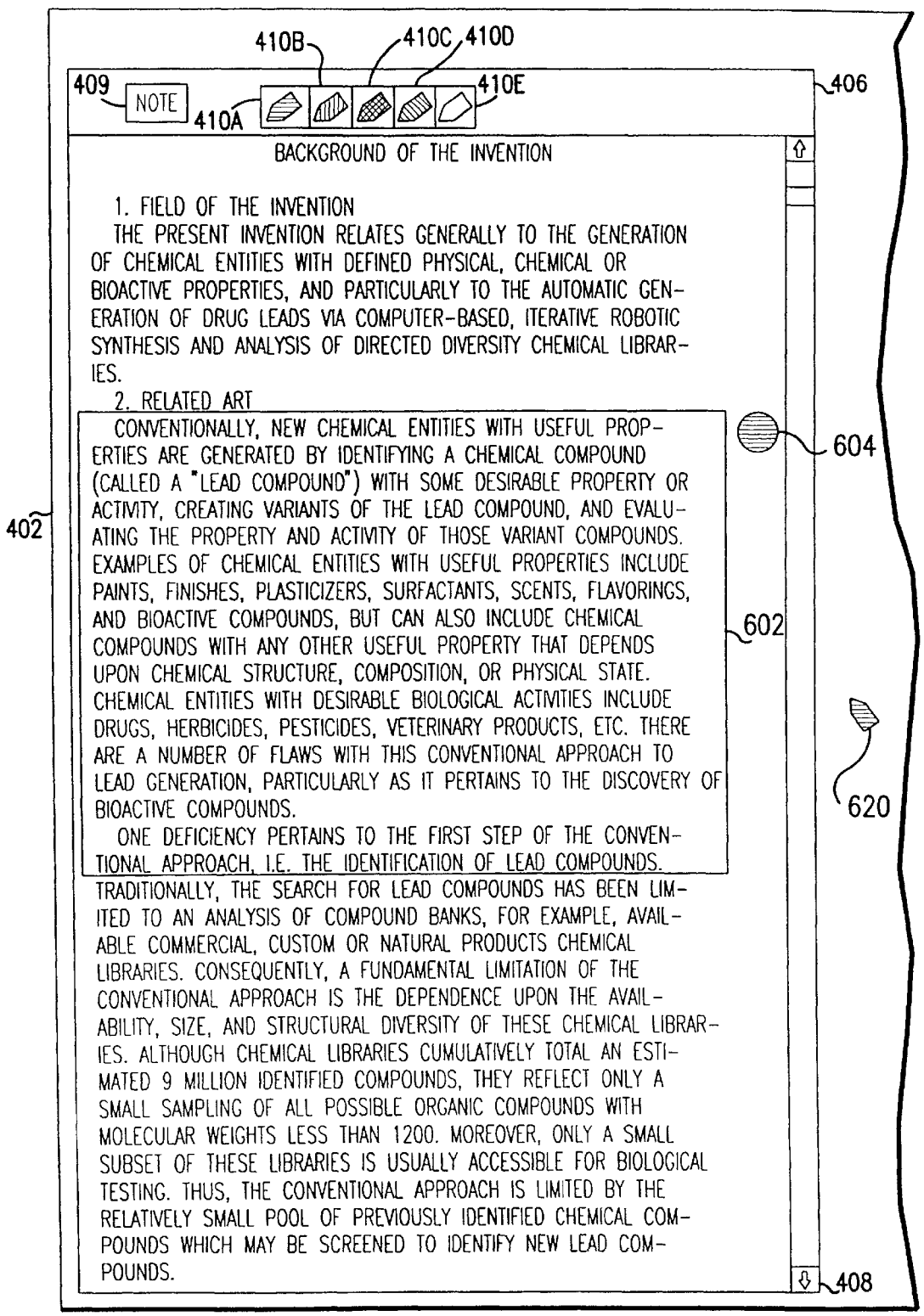
Figure 6B:
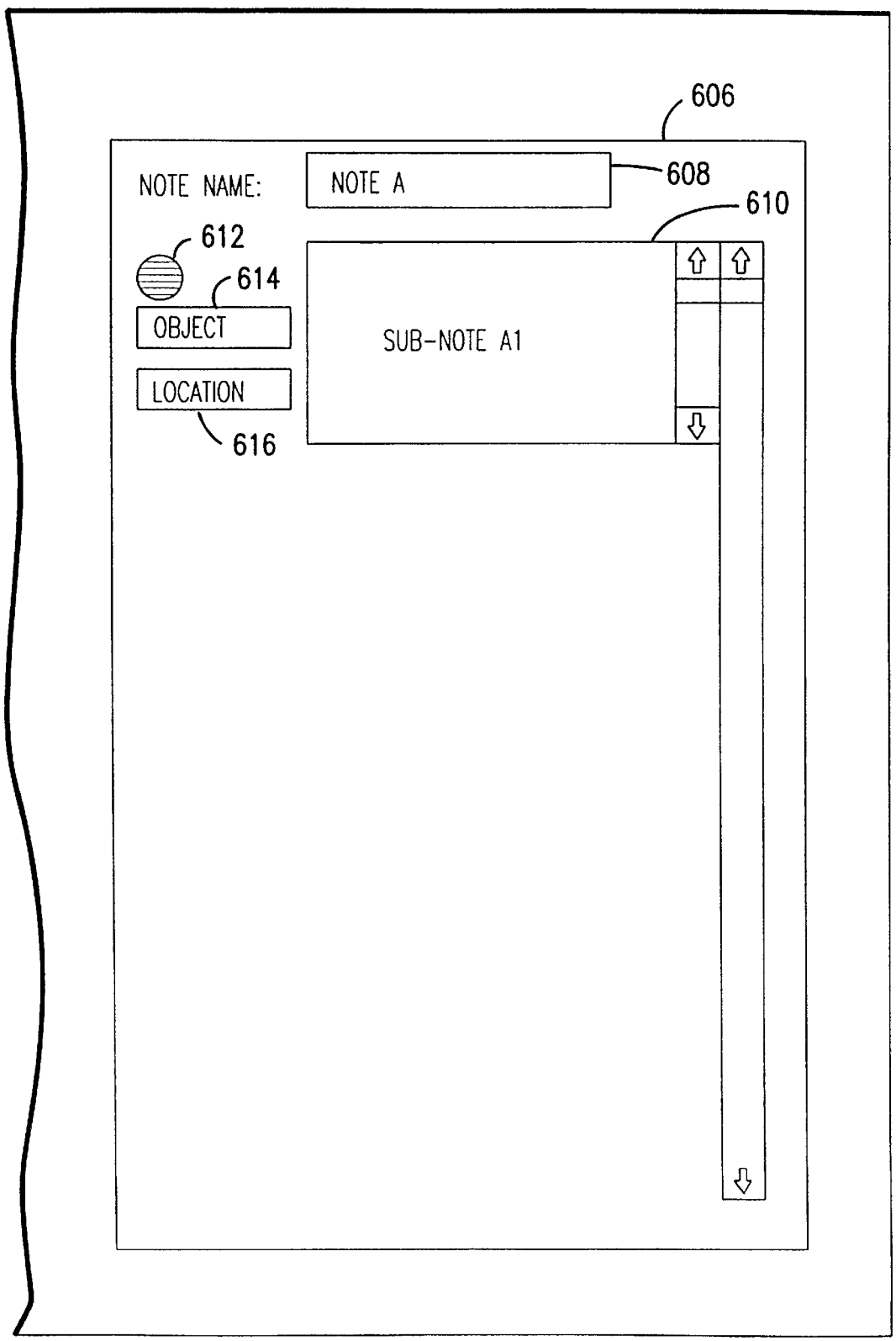

Such operation is shown in FIG. 6. The user selects pen button 410A, which causes the pointer 402 to change to a pen 620. The pen 620 is color coded using color 506, which is the same as the selected pen button 410A. The user selects text 602, which is a portion of patent data object displayed in the application window 408. The notes application 302 instructs the application associated with the application window 408 to color code the selected text 602 using the same color as the pen 620, i.e., color 506.

The notes application 302 creates a new note, called Note A, and displays Note A in a note window 606. The note window 606 has a name field 608 in which the name of the note (i.e., Note A) is displayed. The notes application 302 creates a new sub-note, called Sub-note A1, and displays Sub-note A1 in a sub-note window 610. The notes application 302 links Sub-note A1 to the selected text 602.

The notes application 302 inserted the new Sub-note A1 in a new Note A because the computer screen 402 was not displaying an existing note when the text 602 was selected. If, instead, an existing note was being displayed on the computer screen 402 when the text 602 was selected, then the notes application 302 would have inserted the new Sub-note A1 in that existing note.

The notes application 302 displays a linking button 612 adjacent to sub-note window 610. The linking button 612 is color coded with the same color as the pen 620, i.e., color

506. Also, the symbol of the linking button 612 is that which corresponds to this color, i.e., symbol 508.

Similarly, the notes application 302 displays a linking button 604 adjacent to the selected text 602. The linking button 604 is color coded with the same color as the pen 620, i.e., color 506. Also, the symbol of the linking button 604 is that which corresponds to this color, i.e., symbol 508.

Linking button 604 associated with the selected text is used to navigate to and display the sub-note (i.e., Sub-note A1) that is linked to the selected text. For example, assume that the user now closes window 606. If the user wishes to view the sub-note linked to the selected text 602, then the user need only click on the linking button 604. This causes the notes application 302 to display Note A and Sub-note A1 in the note window 606.

Similarly, linking button 612 associated with Sub-note A1 is used to navigate to and display the selected text 602 that is linked to Sub-note A1. For example, assume that the user now closes window 408. If the user wishes to view the text linked to Sub-note A1, then the user need only click on the linking button 612. This causes the notes application 302 to launch the application associated with selected text 602. The notes application 302 then commands the application to load the data object containing the selected text 602, and further commands the application to scroll within the data object so that the selected text 602 is displayed in the window 408.

Also displayed next to the sub-note window 610 is an object field 614 and a location field 616. The object field 614 includes information that describes the object containing the selected text that the corresponding sub-note is linked to. For example, the object field 614 may display: "U.S. Pat. No. 4,444,444." The location field 616 includes information that describes the location of the selected text in the object. For example, the location field 616 may display: "Column 3, line 25."

Figure 7A:
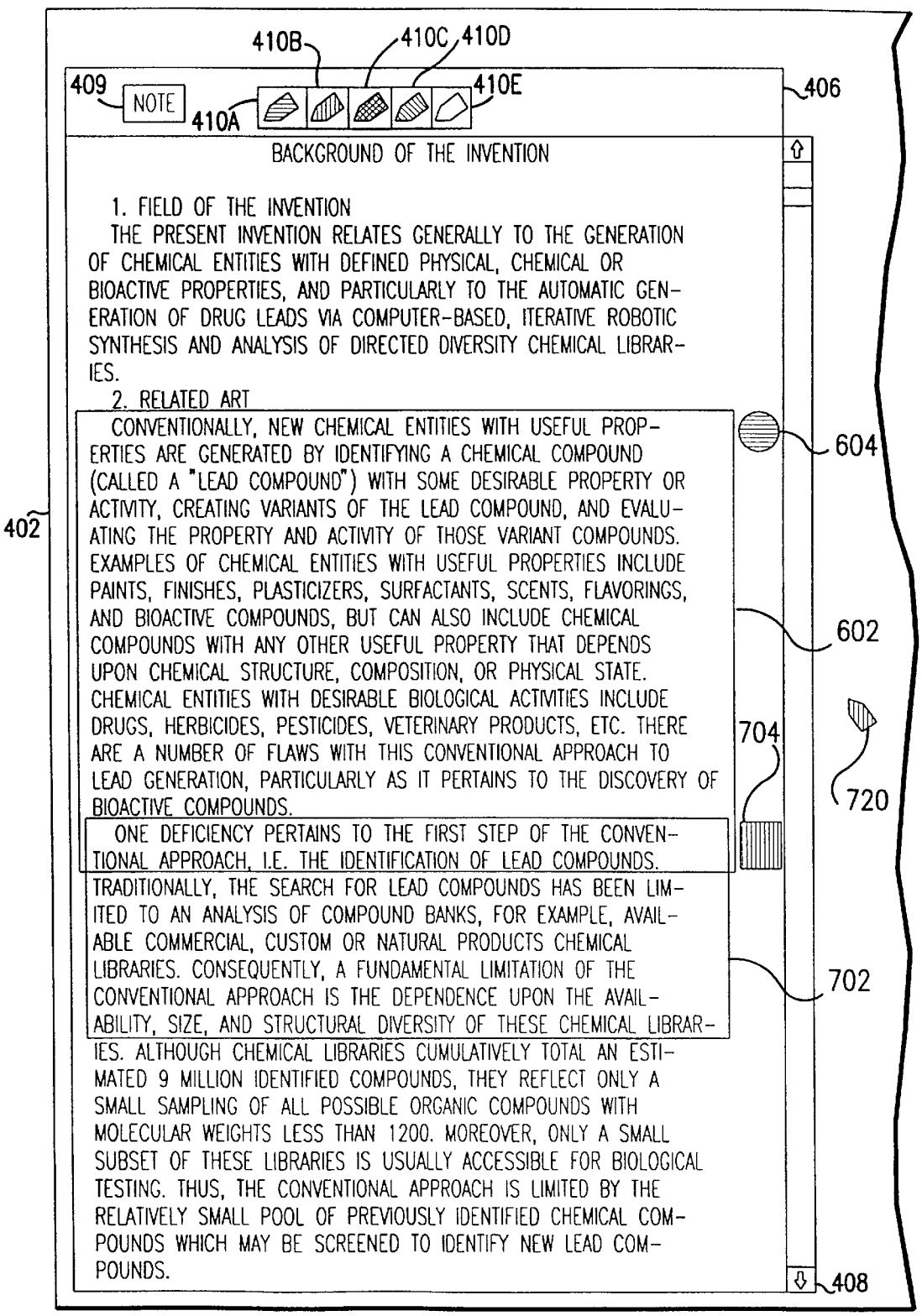
Figure 7B:
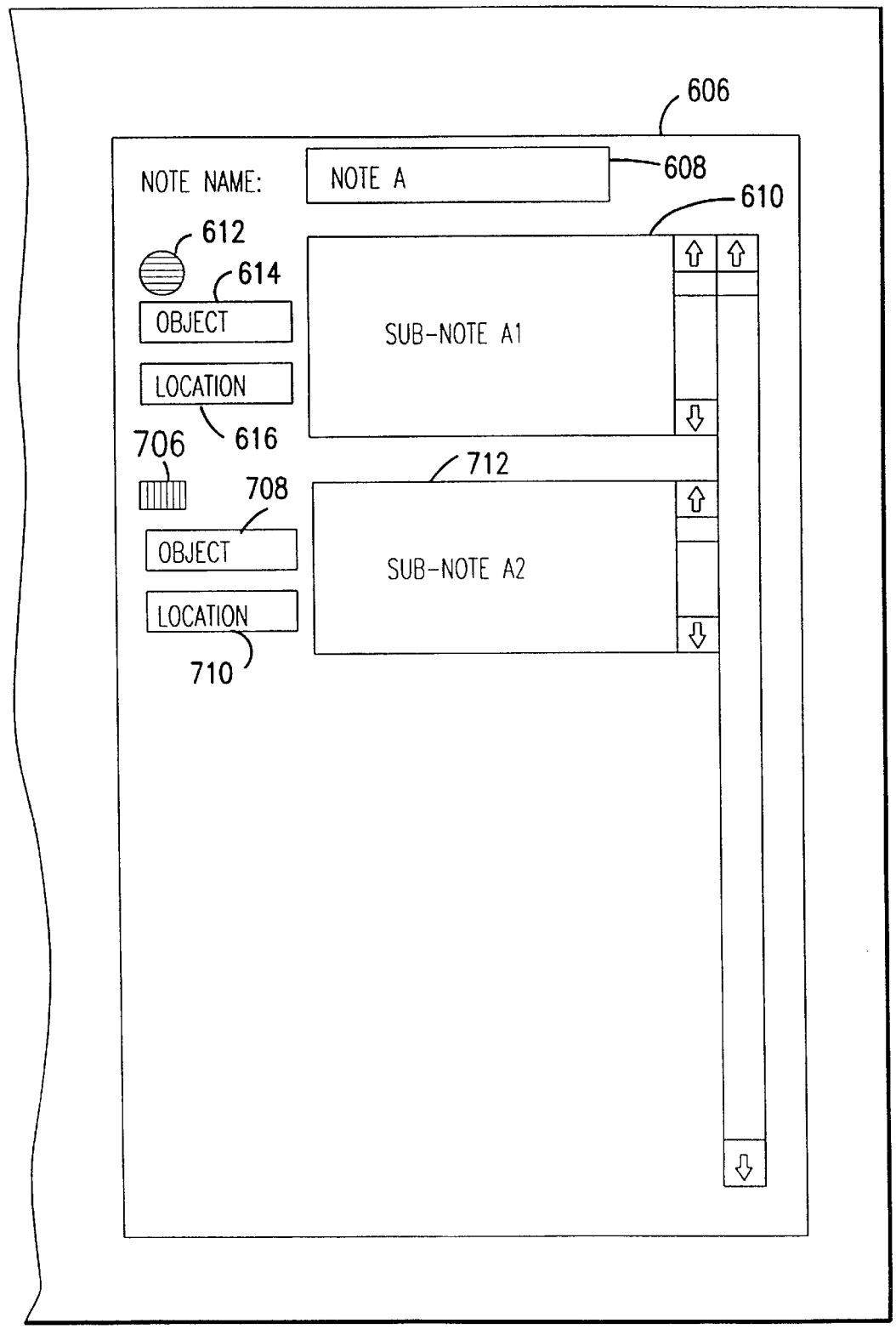

FIG. 7 continues the scenario of FIG. 6. In FIG. 7, the user selects pen button 410B, causing the pointer to change to pen 720. The user selects text 702 using pen 720. The notes application 302 creates a new sub-note, called Sub-note A2. Note that this Sub-note A2 is added to existing Note A, because Note A was being displayed when the user selected text 702. Also note that selected text 602 overlaps with selected text 702. The present invention allows portions in a data object that are to be linked with sub-notes to be distinct, to partially overlap, or to completely overlap. Such functionality of the invention enables users to precisely associate sub-notes with portions in data objects.

Figure 8:
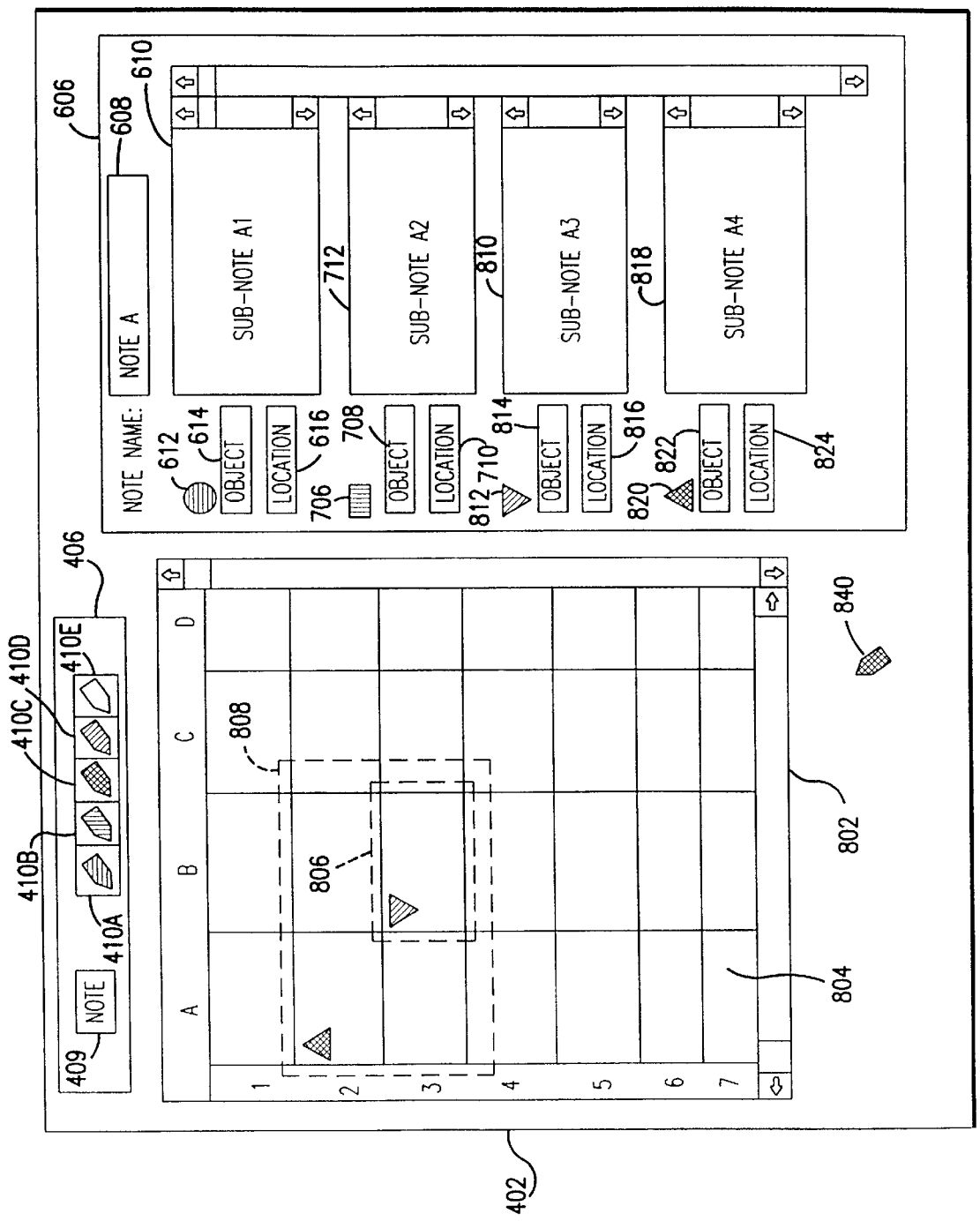

Sub-notes in a note can be linked to portions of data objects associated with different applications. This is the scenario shown in FIG. 8. Recall that Note A has Sub-notes A1 and A2 that are linked to portions 602, 702 in a patent data object. The patent data object is associated with a word processing application, for example. In FIG. 8, the user launched a spread sheet application. A spreadsheet 804 is displayed in a window 802. The user selected pen button 410D and then pen button 410C. The user used the resulting pens to select portion 806 (including one cell) and then portion 808 (including four cells) of the spreadsheet 804. In response to such action by the user, the notes application 302 created a new sub-note, Sub-note A3, and linked Sub-note A3 to selected portion 806. The notes application 302 then created a new sub-note, Sub-note A4, and linked Sub-note A4 to selected portion 808.

Figure 9:
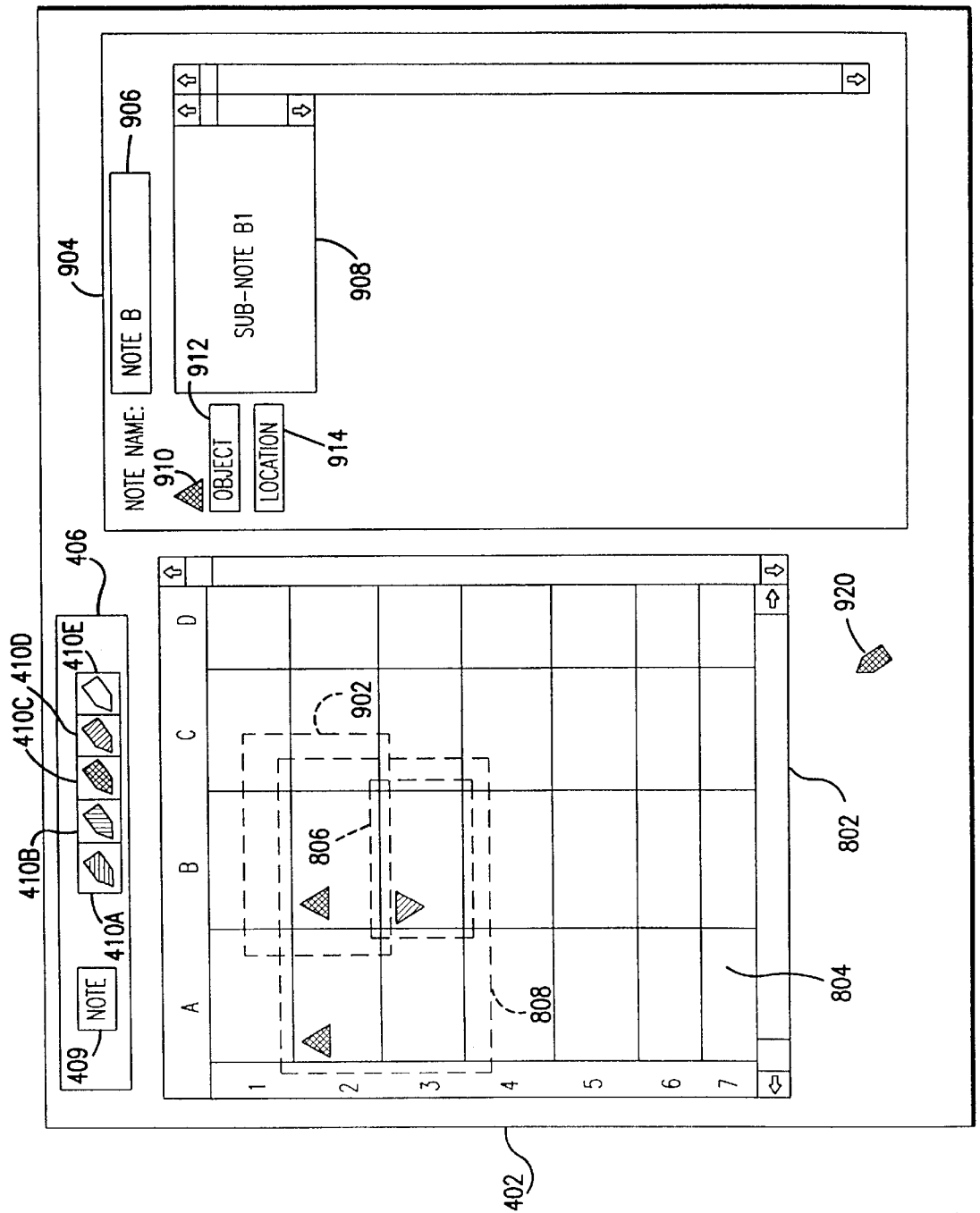

FIG. 9 continues the scenario of FIG. 8. The user closed window 606 (containing Note A). The user then selected pen button 410C, resulting in pen 920. The user selected portion 902 of the spreadsheet 804 using pen 920. The notes application 302 created a new sub-note, Sub-note B1, and linked Sub-note B1 to selected portion 902. Since no note was being displayed when the user selected portion 902, the notes application 302 created a new note, Note B, and inserted the Sub-note B1 into Note B.

Figure 10:
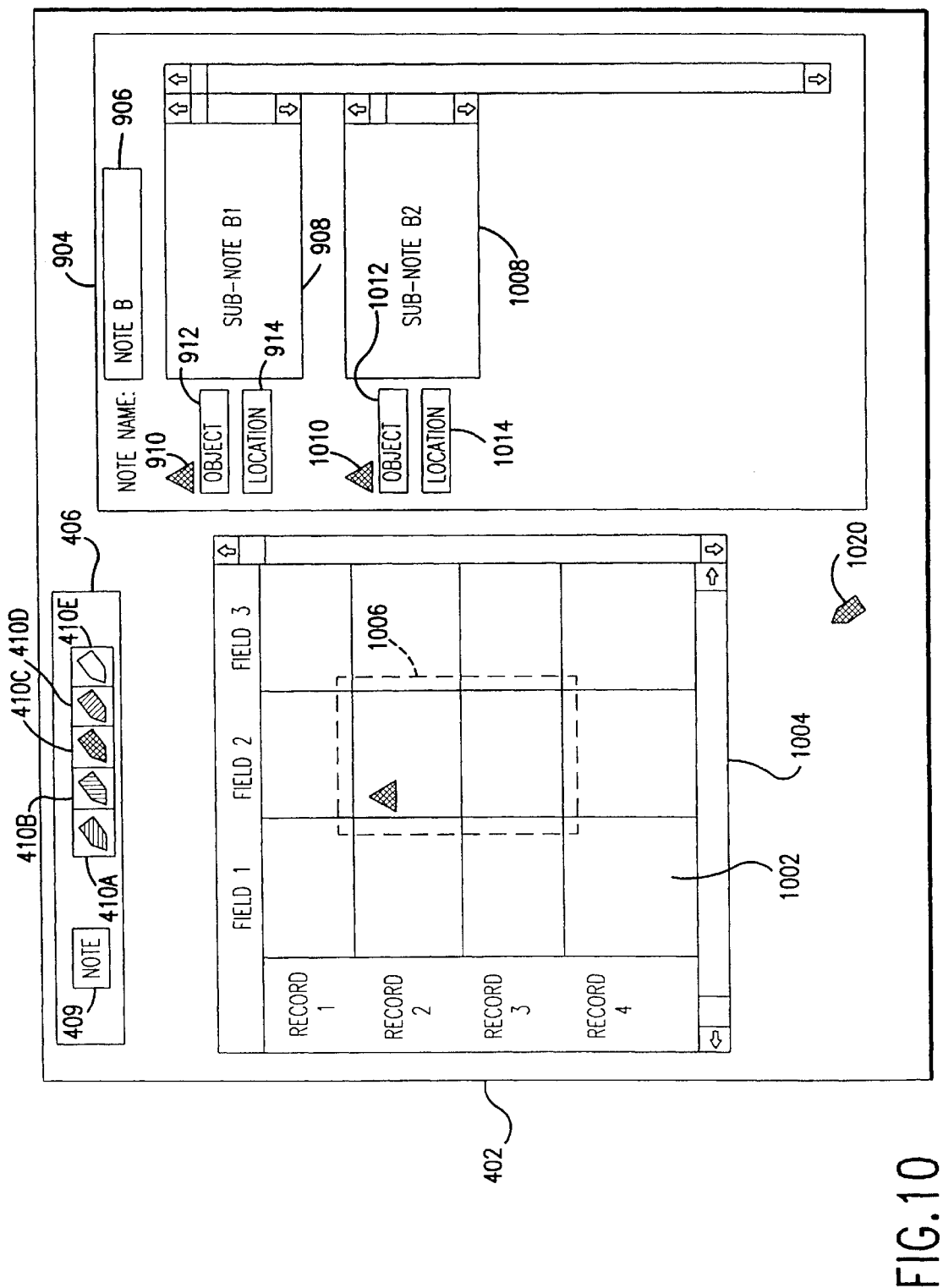

FIG. 10 illustrates a scenario where the notes application 302 is being used with a database application. In FIG. 10, the user has used pen 1020 to select portion 1006, representing a field in two records of a database 1002. The notes application 302 created Sub-note B2 in Note B, and linked Sub-note B2 to portion 1006.

Figure 11:
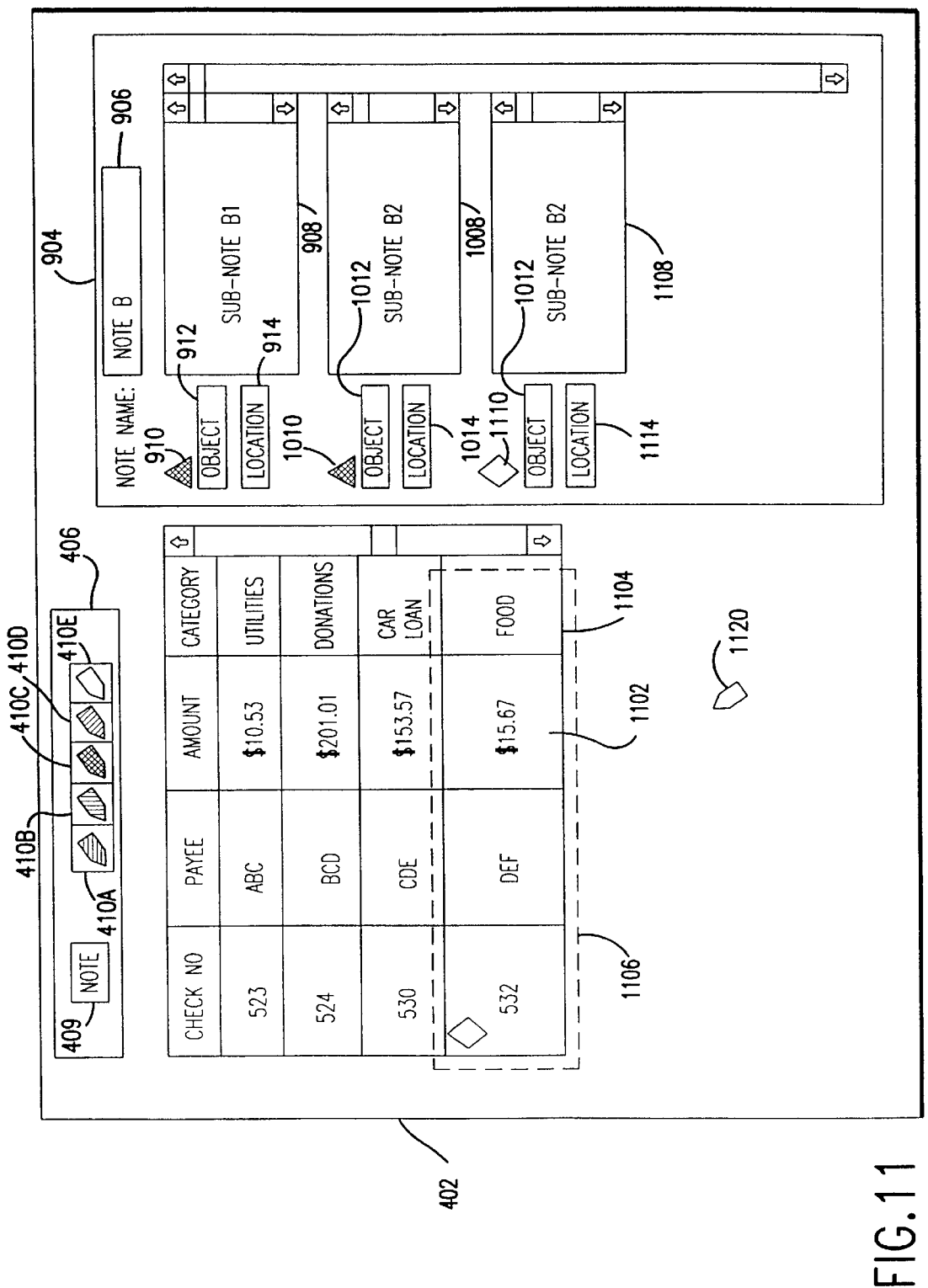

FIG. 11 illustrates a scenario where the notes application 302 is being used with a personal finance application. A check register 1102 is displayed in a window 1104. The user used a pen 1120 to select a portion 1106 of the check register 1102. This portion 1106 corresponds to check number 532. The notes application 302 created a new Sub-note B3, and linked Sub-note B3 to the selected portion 1106.

Figure 12:
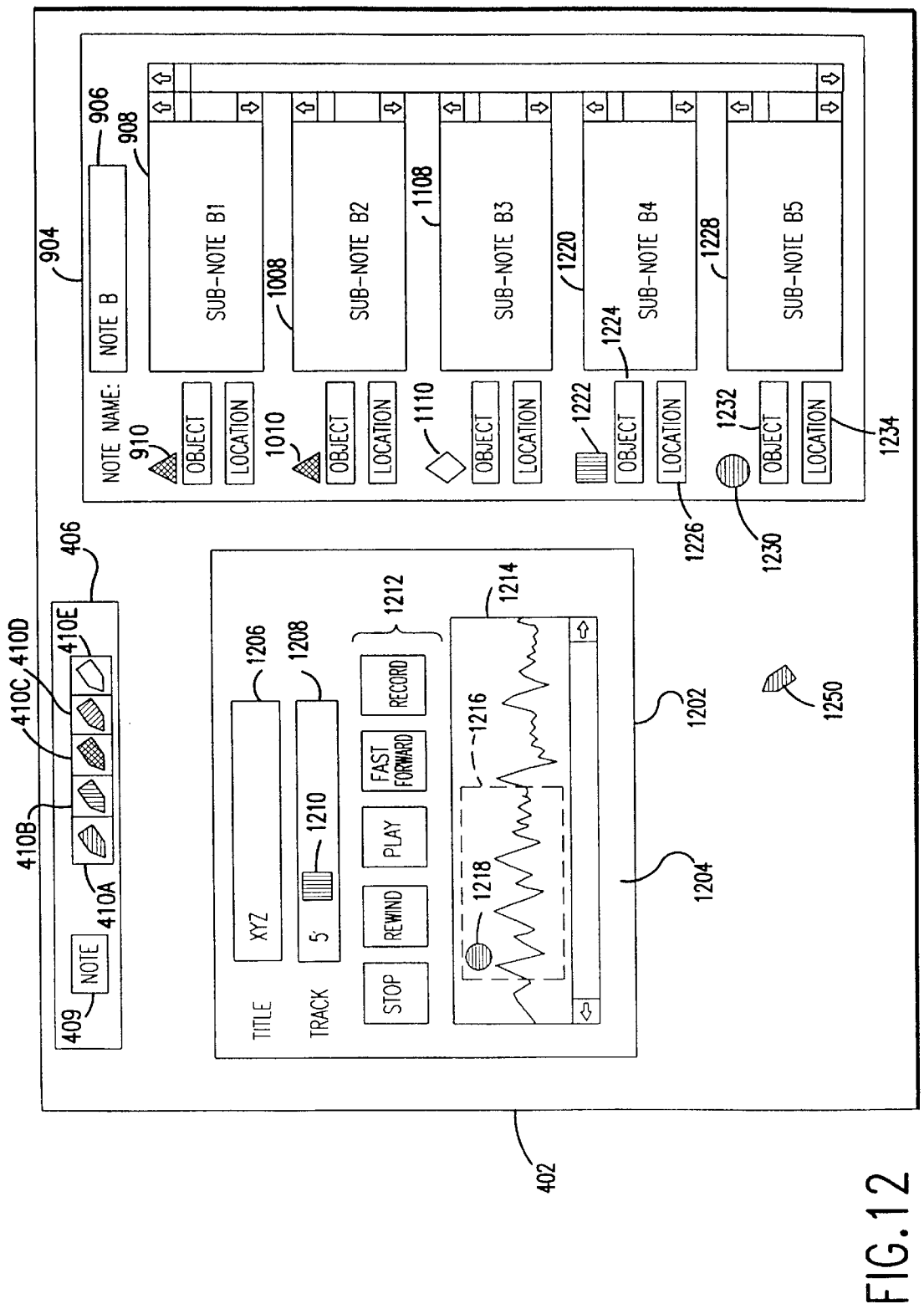

FIG. 12 illustrates a scenario where the notes application 302 is being used with an audio processor. The audio processor displays a window 1202 that includes a title field 1206 and a track field 1208 for displaying the title and track of the audio work that is being processed. The window 1202 includes controls 1212 for manipulating the audio work, and a window 1214 that graphically characterizes the audio work over time. In the scenario of FIG. 12, the user selected pen button 410B and used the resulting pen to select track 5 (by clicking on "5" displayed in the track field 1208, for example). The notes application 302 created new Sub-note B4, and linked Sub-note B4 to track 5. Then, the user selected pen button 410A and used the resulting pen 1250 to select a portion 1216 of the audio work. The notes application 302 created new sub-note B5, and linked Sub-note B5 to this portion 1216 of the audio work.

The example of FIG. 12 illustrates an important feature of the invention. The invention can be used to select portions of text based data objects, such as text documents, computer programs, spread sheets, database files, etc. The invention can also be used to select portions of non-text based data objects, such as audio data objects (as in FIG. 12), video data objects, graphics data objects, etc. Thus, the invention can be used to mark or "bookmark" text based and non-text based data objects for fast reference and retrieval.

Figure 13:
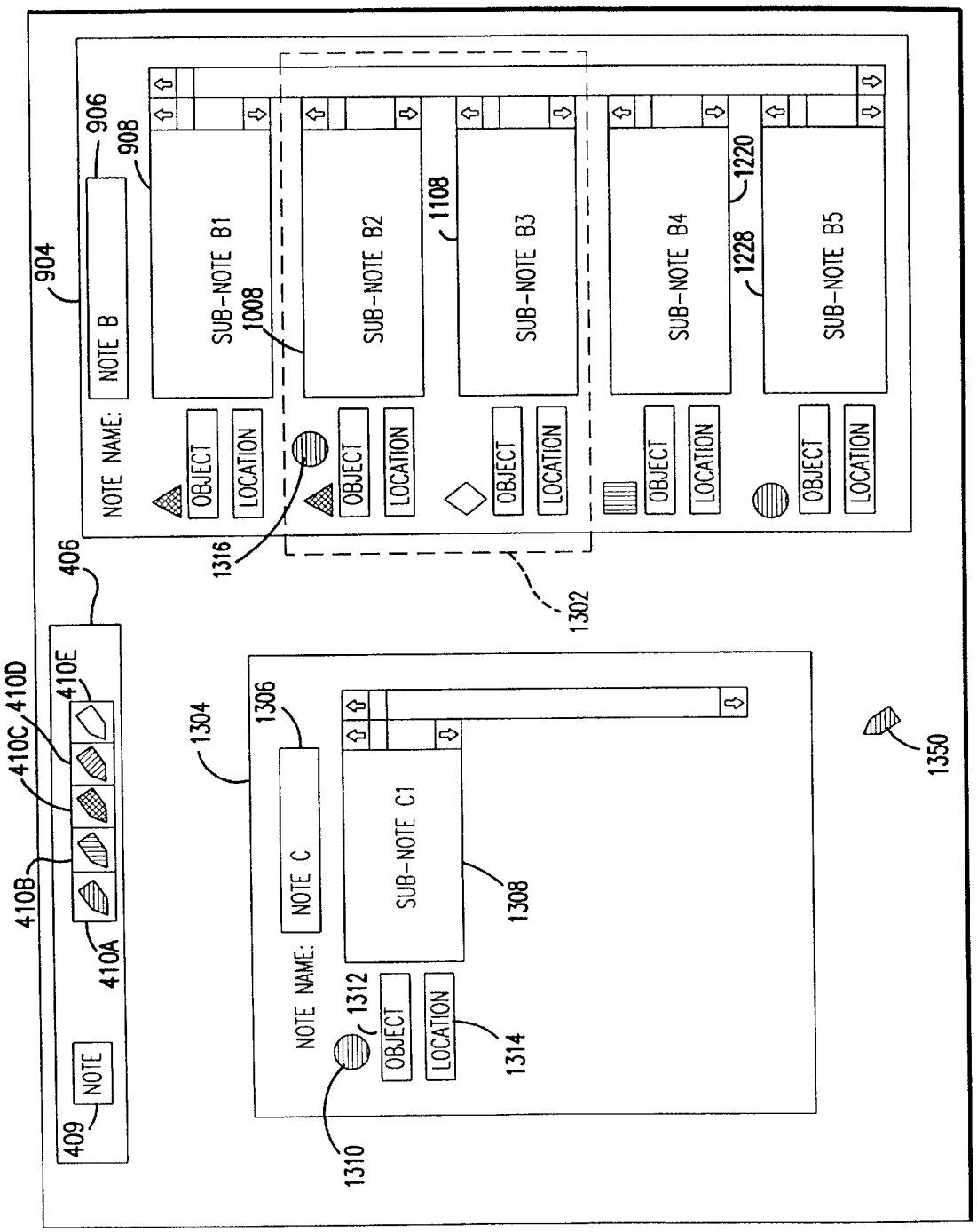

As noted above, a sub-note can be linked to a portion of a note. This scenario is depicted in FIG. 13. The user selected patent button 410A. The user then used the resulting pen 1350 to select a portion 1302 of Note B. This portion 1302 includes Sub-note B2 and Sub-note B3. The notes application 302 created a new Sub-note C1, and linked Sub-note C1 to portion 1302 of Note B. Linking button 1316 in Note B links portion 1302 to Sub-note C1. Similarly, linking button 1310 in Note C links Sub-note C1 to portion 1302 of Note B. The notes application 302 created a new Note C and inserted Sub-note C1 into Note C because no other note was displayed when the portion 1302 was selected (other than Note B; however, preferably, a note cannot contain a sub-note that is linked to a portion of itself; accordingly, the notes application 302 created Note C to contain Sub-note C1).

As will be apparent from the foregoing, the notes application 302 can operate with any application that supports the interface 310 (FIG. 3A). The interface 310 preferably uses the OLE standard. The number of applications which support the OLE standard is rapidly growing. Accordingly, the number of applications which are operable with the notes application 302 is increasing. It should be understood, however, that the notes application 302 is not limited to use with the OLE standard. The notes application 302 can be used with any standard that allows one software application to interact with another.)

3.4 Viewing Notes, Sub-Notes, and Data Objects

The present invention supports a number of modes for displaying the contents of the notes database 308. These modes are called views. The invention supports a note centric view (also called a note view), an object centric view (also called an object view), a link centric view (also called a link view), and a user-defined view. A user can elect to print the notes database 308 while in any of these views, such that the print out has the same appearance to that which is displayed on the computer display.

Figure 43:
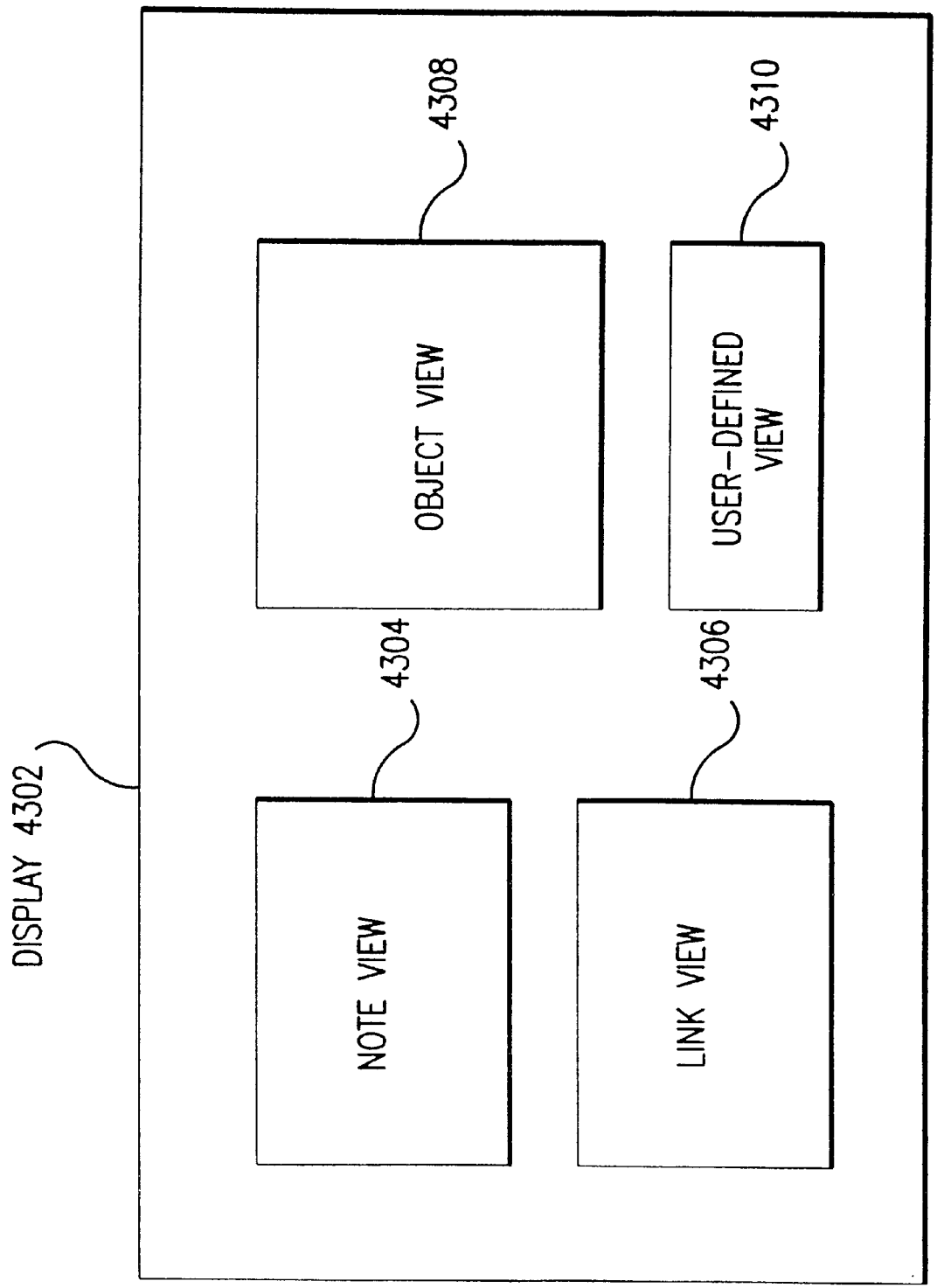
FIG. 43 illustrates an example display where multiple views are displayed.

Users can select any of these views to display the contents of the notes database 308. Users can also alternate between these views. Further, users can simultaneously display multiple views of the notes database 308. This is shown in FIG. 43, for example, where the user has elected to display the note view in a window 4304, the link view in the a window 4306, the object view in a window 4308, and the user-defined view 4310. By utilizing multiple windows, such as windows 4304, 4306, 4308, 4310, the user can simultaneously display different views of the same or different portions of the notes database 308.

The ability to display information using different views, to switch between views, and/or to simultaneously display different views of the same or different information is useful for enabling users to fully comprehend and best manipulate the information. In essence, the invention allows users to view and perceive information in the notes database 308 from different angles and perspectives. Depending on the nature of the information or task, some views may be more appropriate than others. The invention provides users with the ability to customize the display based on the needs of the moment. Such flexibility facilitates comprehension and manipulation of information.

The note view, object view, link view, and user-defined view are described in the following sections.

3.4.1 Note View

There are two note views: the standard note view and the modified note view.

The standard note view is shown in FIGS. 6–13. The standard note view includes at least one note window having a note and its sub-notes displayed therein. This is shown in FIG. 6, for example, where the note window 606 has displayed therein Note A and its Sub-note A1. The standard note view may or may not also include one or more application windows each displaying a portion of an object that is linked to one of the sub-notes displayed in the note window. In FIG. 6, for example, the application window 408 is displayed. The application window 408 has displayed therein a portion 602 of a patent document that is linked to Sub-note A1 in the note window 606. The link between data object portion 602 in the application window 408 and Sub-note A1 is indicated by the linking buttons 604, 612 that have the same shape and color.

Figure 30:
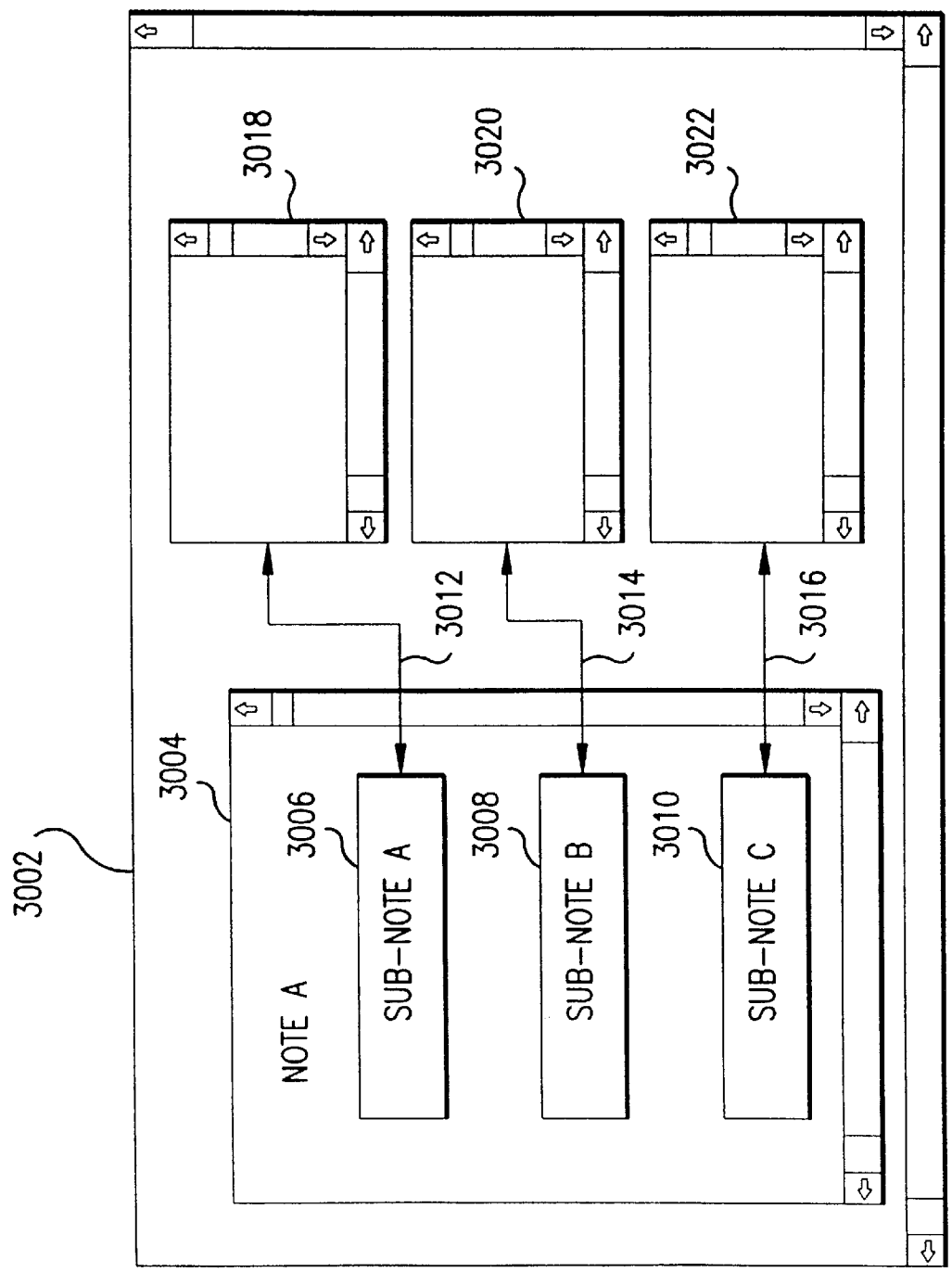
FIG. 30 illustrates an example note view.

The modified note view illustrates a note and its sub-notes, and all data objects linked to the sub-notes. An example modified note view is shown in FIG. 30. The modified note view displays, in a window 3002, a note window 3004 that is currently displaying Note A and its Sub-notes A, B, and C. The modified note view also displays the data object portions linked to the sub-notes (i.e., Sub-notes A, B, C) displayed in the note window 3004. These data object portions are displayed in application windows 3018, 3020, 3022.

Note A may include additional sub-notes that are not currently displayed in the note window 3004 (due to space limitations in the note window 3004). These additional sub-notes can be displayed by using well known window navigation tools, such as the window scroll bars. When such additional sub-notes are scrolled into view in the note window 3004, additional application windows having displayed therein the data object portions linked to the sub-notes are also scrolled into view in the window 3002.

The modified note view also displays bidirectional arrows 3012, 3014, 3016 that indicate the links between sub-notes and data object portions. These arrows 3012, 3014, 3016 are "live," in that users can select and manipulate these arrows in order to modify the note/sub-note hierarchy. For example, a user can delete a link between a sub-note and a data object portion by selecting and deleting the corresponding arrow in the modified note view. A user can also modify the linkage between sub-notes and data object portions by selecting and then dragging an arrow from one sub-note to another sub-note, and or from one data object portion to another data object portion.

Users can also select and manipulate the arrows 3012, 3014, 3016 in order to modify the attributes of the underlying links. Such attributes relate to privacy, security, and priority. The manipulation of the arrows 3012, 3014, 3016 is described further in a section below.

For readability purposes, details of the note window 3004 and the application windows 3018, 3020, 3022 are not shown in FIG. 30. Preferably, however, the note window 3004 and the application windows 3018, 3020, 3022 include the same features as those shown in FIGS. 6–13. For example, the application windows display linking buttons (if any) that are not related to the sub-notes in Note A. If a user presses one of these linking buttons, then the note corresponding to this linking button is retrieved and displayed using the standard note view, which is the default view (users may select a different default view).

3.4.2 Object View

Figure 31A:
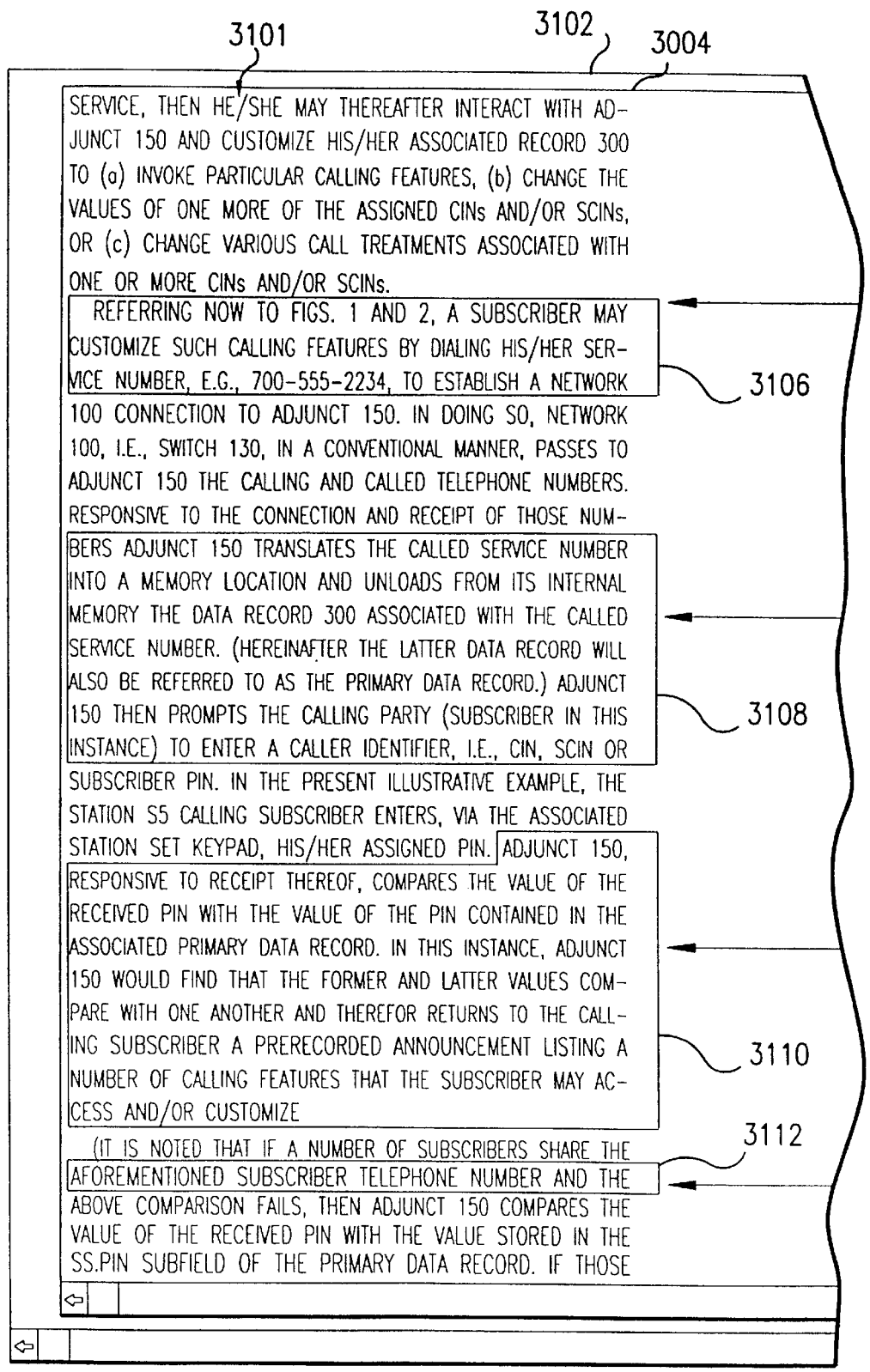
FIG. 31 illustrates an example object view.
Figure 31B:
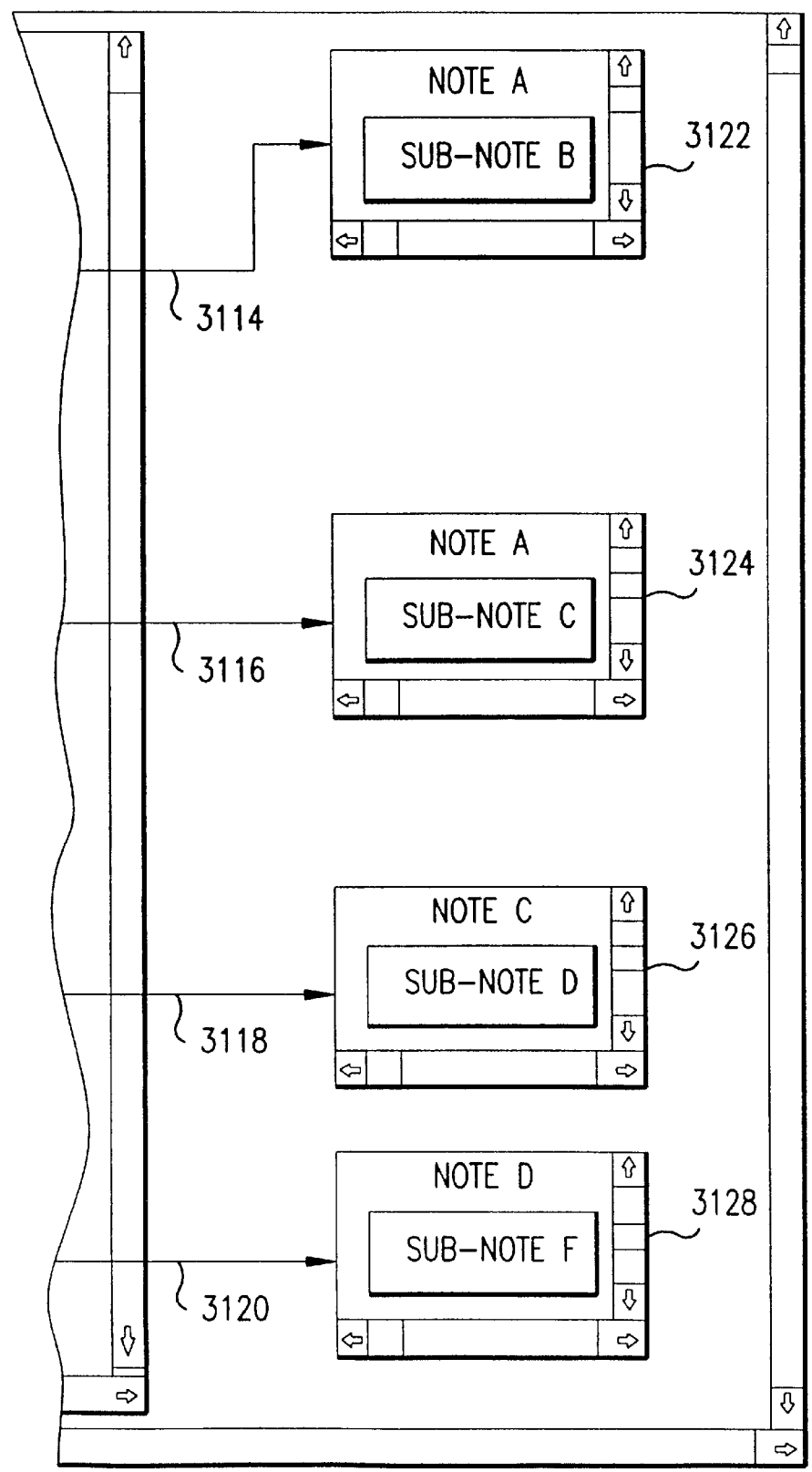

The object view displays a data object and all sub-notes linked to the data object. An example object view is shown in FIG. 31. A data object 3101 is being displayed in an application window 3104. Only a part of the data object 3101 is being displayed due to the size limitations of the application window 3104.

Sub-notes linked to the data object 3101 are also being displayed. These sub-notes are displayed in note windows 3122, 3124, 3126, 3128. Only those sub-notes linked to data object portions currently being displayed in the application window 3104 are displayed.

Other parts of the data object 3101 may be displayed in the application window 3104 by using well known window navigation tools, such as the window scroll bar. As other parts of the data object 3101 are scrolled into view in the application window 3104, any sub-notes linked to these newly displayed parts of the data object 3101 are also scrolled into view in the window 3102.

The object view also displays bidirectional arrows 3114, 3116, 3118, 3120 that indicate the links between sub-notes and data object portions. As discussed above (and further discussed below), these arrows 3114, 3116, 3118, 3120 are "live," in that users can select and manipulate these arrows in order to modify the note/sub-note hierarchy, and to modify the attributes associated with the underlying links.

For readability purposes, details of the note windows 3122, 3124, 3126, 3128 and the application window 3104 are not shown in FIG. 31. Preferably, however, the note windows 3122, 3124, 3126, 3128 and the application window 3104 include the same features as those shown in FIGS. 6–13. For example, the note windows 3122, 3124, 3126, 3128 may include sub-notes and linking buttons that are not related to the data object 3101 in application window 3104. If a user presses one of these linking buttons, then the data object portion corresponding to this linking button is retrieved and displayed using the standard note view, which is the default view.

3.4.3 Link View

The link view displays the connections between note groupings, notes, and sub-notes, and the links between sub-notes and data object portions. The link view is useful for obtaining a high level display of the note grouping/note/sub-note hierarchy, and sub-note/data object portion linkage. The link view is also useful for editing and replicating the note grouping/note/sub-note hierarchy (this is described further in a section below).

An example link view is shown in FIG. 29. The link view displays the title (or identifier) of note groupings, notes, sub-notes, and objects. For example, Sub-note A is represented by its name, "Sub-note A," displayed in an oval. Data object A is represented by its name, "Data Object A," displayed in an oval (this oval may also include information that identifies the portion of Data Object A that is linked to the corresponding sub-note(s)). The contents of these note groupings, notes, sub-notes, and objects are not shown in the link view.

A user may view the contents of a note grouping, a note, a sub-note, and/or an object by selecting the corresponding icon in the link view. For example, a user can display the contents of Note A by clicking on icon 2906. This results in displaying Note A using the default standard note view.

The link view also displays the connections between note groupings, notes, and sub-notes by using connector lines 2950. The link view further displays the links between sub-notes and data object portions by using bidirectional arrows 2911, 2917. As discussed above (and further discussed below), these connector lines 2950 and arrows 2911, 2917 are "live," in that users can select and manipulate these connector lines/arrows in order to modify the note grouping/note/sub-note hierarchy, and to modify the attributes associated with the underlying connections/links.

Other portions of the note grouping/note/sub-note hierarchy can be viewed by using well known window navigation tools, such as the window scroll bars.

3.4.4 User-Defined View

The user-defined view displays note groupings, notes, sub-notes, and/or data objects that satisfy search criteria entered by the user.

Figure 32:
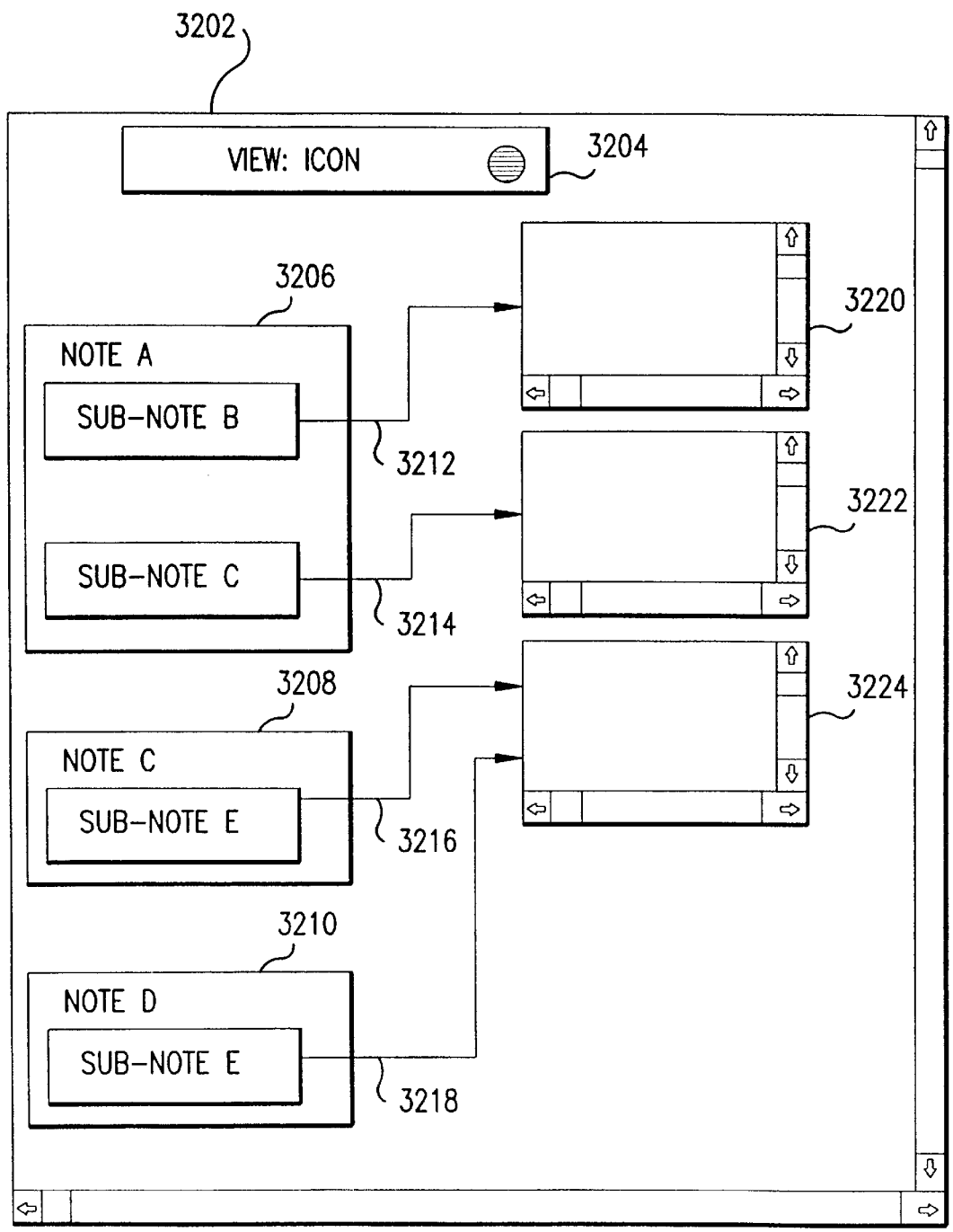
FIG. 32 illustrates an example icon view.

An example user-defined view is shown in FIG. 32. This view is called the icon view. In this example, the user has elected to view all sub-notes and linked data objects that are tagged with a particular icon (this icon is shown in window 3204). (A sub-note or data object portion is tagged with a particular icon by using the appropriate pen when selecting the data object portion and creating the sub-note. The invention also allows users to modify these tags.) In this example, Sub-notes B and C of Note A, Sub-note E of Note C, and Sub-note E of Note D were tagged with the user selected icon. Thus, these notes and sub-notes are displayed in window 3202. The data object portions that are linked to these sub-notes also are tagged with the user selected icon. Thus, these data object portions are also displayed. The links between the sub-notes and the data object portions are indicated by the bidirectional arrows 3212, 3214, 3218, which are also displayed. As discussed above (and further discussed below), these arrows 3212, 3214, 3216, 3218 are "live," in that users can select and manipulate these arrows in order to modify the note/sub-note hierarchy, and to modify the attributes associated with the underlying links.

For readibility purposes, details of the note windows 3206, 3208, 3210 and the application windows 3220, 3222, 3224 are not shown in FIG. 32. Preferably, however, the note windows 3206, 3208, 3210 and the application windows 3220, 3222, 3224 include the same features as those shown in FIGS. 6–13. For example, the note windows 3206, 3208, 3210 may include sub-notes and linking buttons that are not related to the data objects displayed in the application windows 3220, 3222, 3224. If a user presses one of these linking buttons, then the data object portion corresponding to this linking button is retrieved and displayed using the standard note view, which is the default view.

3.5 Editing Note/Sub-Note Organization

The invention includes many flexible features and functions for modifying and replicating the note grouping/note/sub-note hierarchy. These are described below.

3.5.1 Modification

The invention enables users to modify the note grouping/note/sub-note hierarchy. In other words, the invention enables users to switch or copy notes from one note grouping to another, or switch or copy sub-notes from one note to another.

The invention provides a number of ways for the user to modify this hierarchy. One way involves modifying the connector lines that appear in a link view. Consider the example of FIG. 29. A user can delete Sub-note C from Note B, and add Sub-note D to Note B, by selecting and dragging connector line 2950A so that it points to Sub-note D, instead of Sub-note C. This is shown as connector line 2950B. A user can move Sub-note F from Note D to Note C by selecting and dragging connector line 2950C so that it points at Note C, instead of Note D. This is shown as connector line 2950D.

Users can remove notes from note groupings, or sub-notes from notes, by selecting and deleting the corresponding connector lines. For example, a user can remove Note B from Note Grouping B by selecting and deleting connector line 2950E.

Users can add a note to a note grouping, or add a sub-note to a note, by creating a new connector line. For example, a user can add Note C to Note Grouping A by creating and appropriately positioning connector line 2950F.

The creation, deletion, or modification of a connector line does not affect any other connector lines. Consider the above example where Sub-note C is removed from Note B, and Sub-note D is added to Note B. This was done by moving connector line 2950A so that its appears as connector line 2950B. This modification does not affect connector line 2950G. Thus, Sub-note C remains in Note A.

The invention also enables users to modify the links between sub-notes and data object portions. The invention provides a number of ways for the user to perform such modifications. One way involves modifying the bidirectional arrows (such as arrows 2911 and 2917 in FIG. 29) that appear in a link view. Such manipulation of the bidirectional arrows is similar to the manipulation of connector lines, described above.

The invention provides other interfaces for performing the modifications discussed above. Essentially, users can perform such modifications while in any view. Consider the user-defined icon view shown in FIG. 32. A user can move sub-notes from one note to another by using well known copy/cut and paste operations. Also, a user can change the linkage between sub-notes and data object portions by clicking and dragging the bidirectional arrows 3212, 3214, 3216, and 3218.

3.5.2 Replication

A great deal of time and effort may go into the creation of a note grouping/note/sub-note hierarchical database. Typically, a database is specific to a particular task or project. However, it is often the case that parts of a database are applicable to another task or project. For efficiency purposes, users would like to reuse a database generated for one project to the extent possible in another project. The invention provides powerful tools for enabling a user to identify and replicate portions of an existing database that may be relevant to another project. These replicated portions constitute the foundation of a new hierarchical database.

In some cases, a user may already know which parts of a database are pertinent to another project. In such cases, the user may select those parts and replicate (copy) them to a new database. Consider the link view shown in FIG. 29. In this example, the user knows that a portion of Note Group B is relevant to a new project. Accordingly, the user has selected this portion of Note Group B. This selection is indicated by dashed lines 2942. The user then commands the note application 302 to replicate this portion of Note Group B, and to form a new database using this replicated portion.

Figure 33:
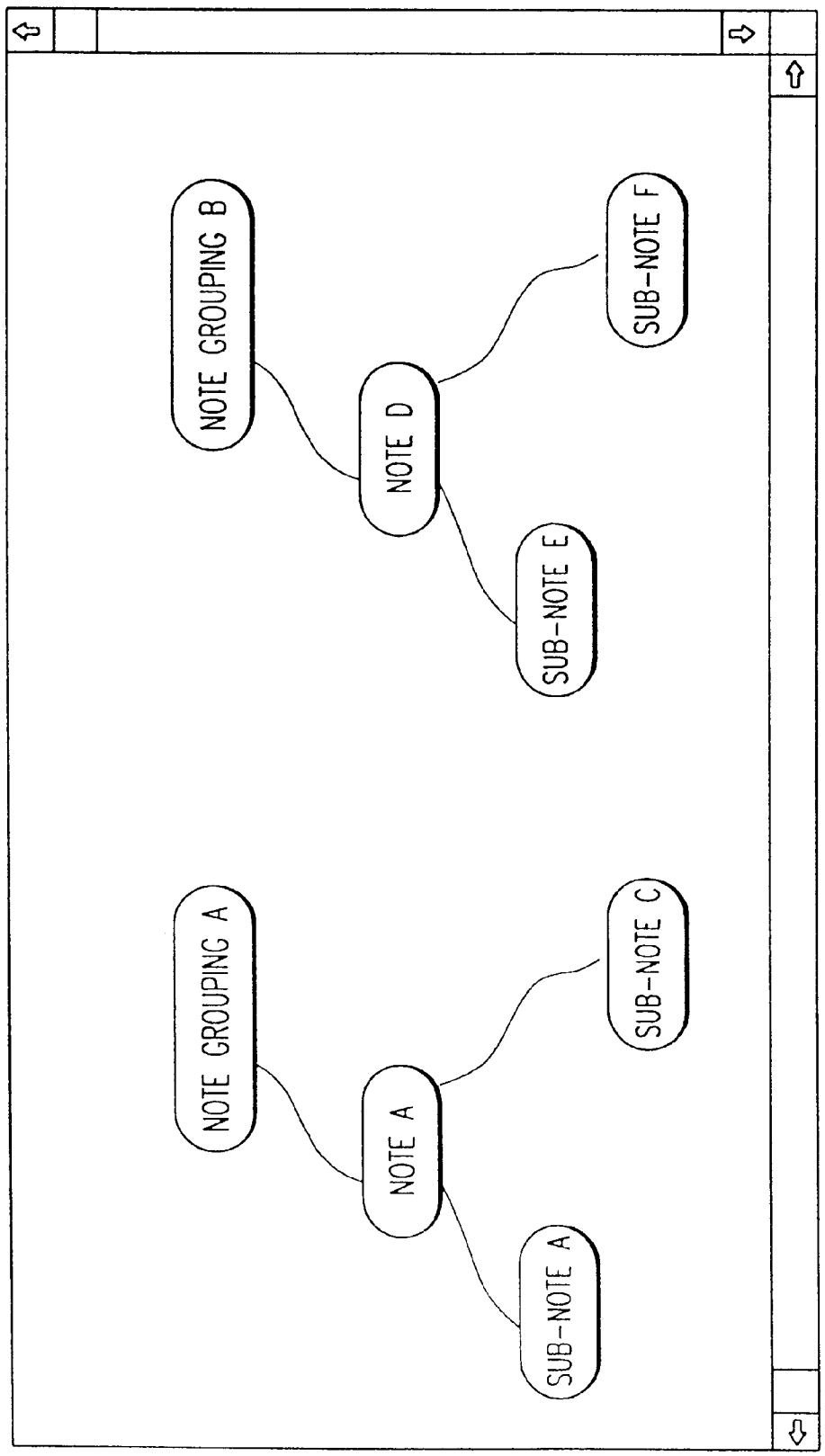
FIG. 33 illustrates the results of a replication operation.

In other cases, the user does not know which parts of a database are pertinent to another project. In these cases, the user can use the invention's searching capabilities to identify note groupings, notes, sub-notes, and/or data object portions that are relevant to this other project. The user can then replicate these identified note groupings, notes, sub-notes, and data object portions to a new database. FIG. 33 illustrates a new database that was created based on a search conducted on the example database of FIG. 29. The invention supports searching based on key words, date/time of creation/modification, creator, icon tags, etc. The searching capabilities of the invention are discussed below.

3.6 User Interface

Figure 34:
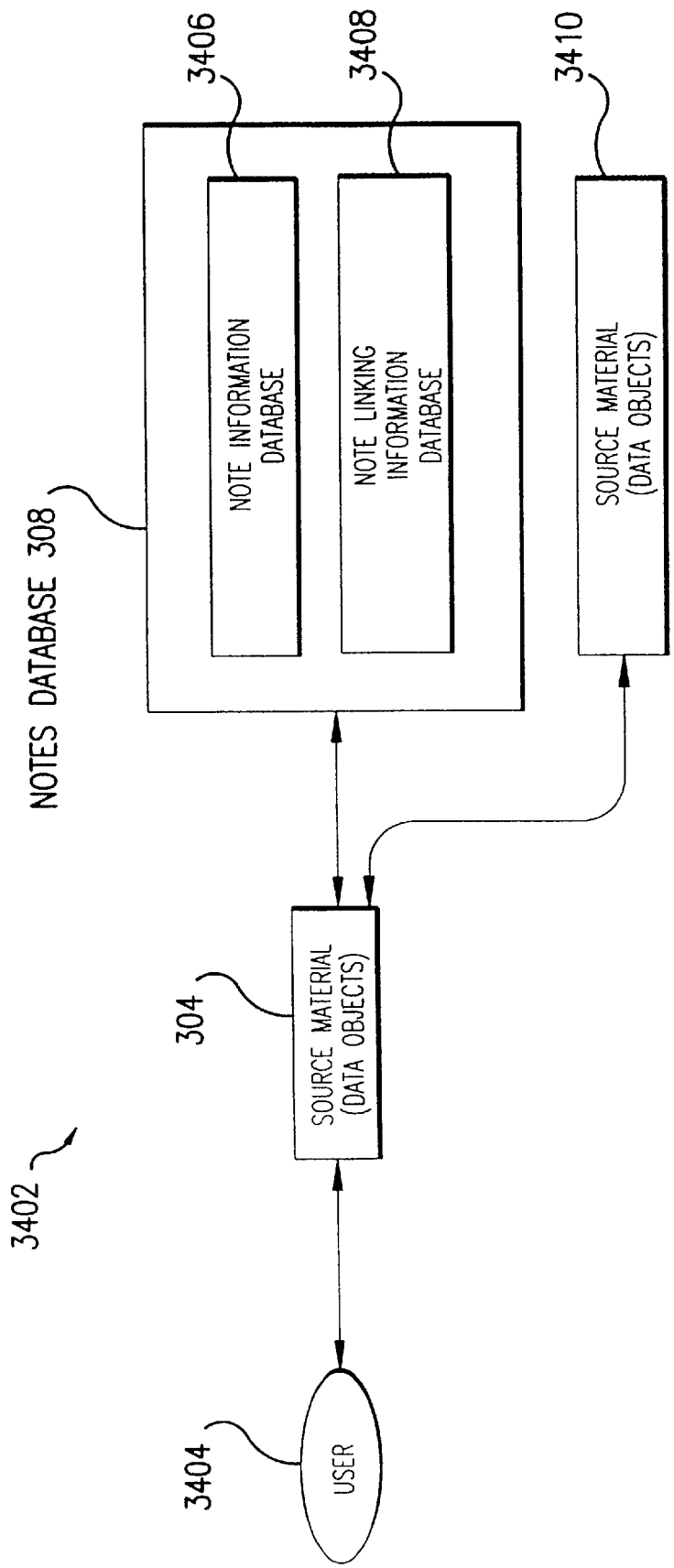
FIG. 34 is a block diagram illustrating the effects of a user interface of the present invention.

As discussed above, the notes application 302 includes a user interface 304. Referring to FIG. 34, the user interface 304 enables a user 3404 to interact with the notes database 308 and source material 3410, representing data objects. The user 3404 interacts with the user interface 304 so as to create note groupings, notes, and sub-notes, establish and modify the note grouping/note/sub-note hierarchy, establish and modify the links between sub-notes and data object portions, and in all other ways interact with the notes database 308 and the source material 3410.

It is very important that the user interface 304 provide the user 3404 with an easy to use (i.e., user friendly) interface to the notes database 308, the source material 3410, and to the features and functions provided by the notes application 302. If the user interface 304 is user friendly, then the user 3404 is more likely to utilize the notes application 302 to document his thinking and work product.

The user interface 304 may be implemented using any user interface tools, approaches, techniques, technology and/or applications that currently exist, or that will be developed in the future. In one embodiment, the user interface 304 is implemented as a computer based graphical user interface (GUI). Example screen shots from this GUI are shown in FIGS. 4, 6–13, 29–33, and 43.

In another embodiment, the user interface 304 is implemented in whole or in part using virtual reality (VR) technology. Significant VR technology has been developed, and more is currently being developed. Virtual reality is discussed in many publicly available documents, such as *Virtual Reality Applications and Explorations,* edited by Alan Wexelblat, Academic Press, Cambridge, Mass., 1993, and *On the Cutting Edge of Technology,* Sams Publishing, Carmel, Ind., 1993 which are incorporated herein by reference in their entireties.

It should be understood, however, that the invention is adapted and intended to operate with other user interface technology that currently exists, or that will be developed in the future.

Figure 35:
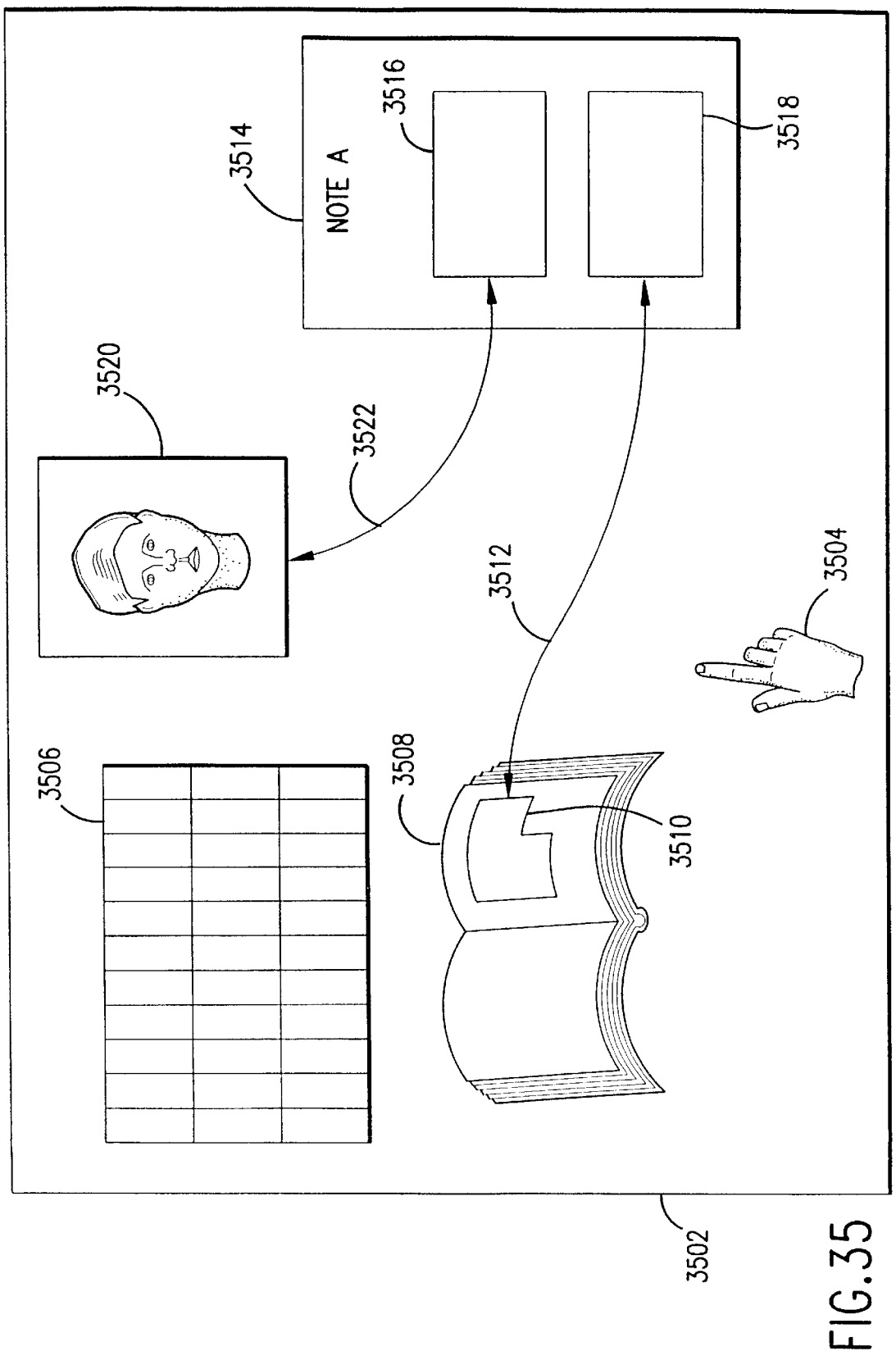
FIG. 35 illustrates an example virtual reality environment.
Figure 36:
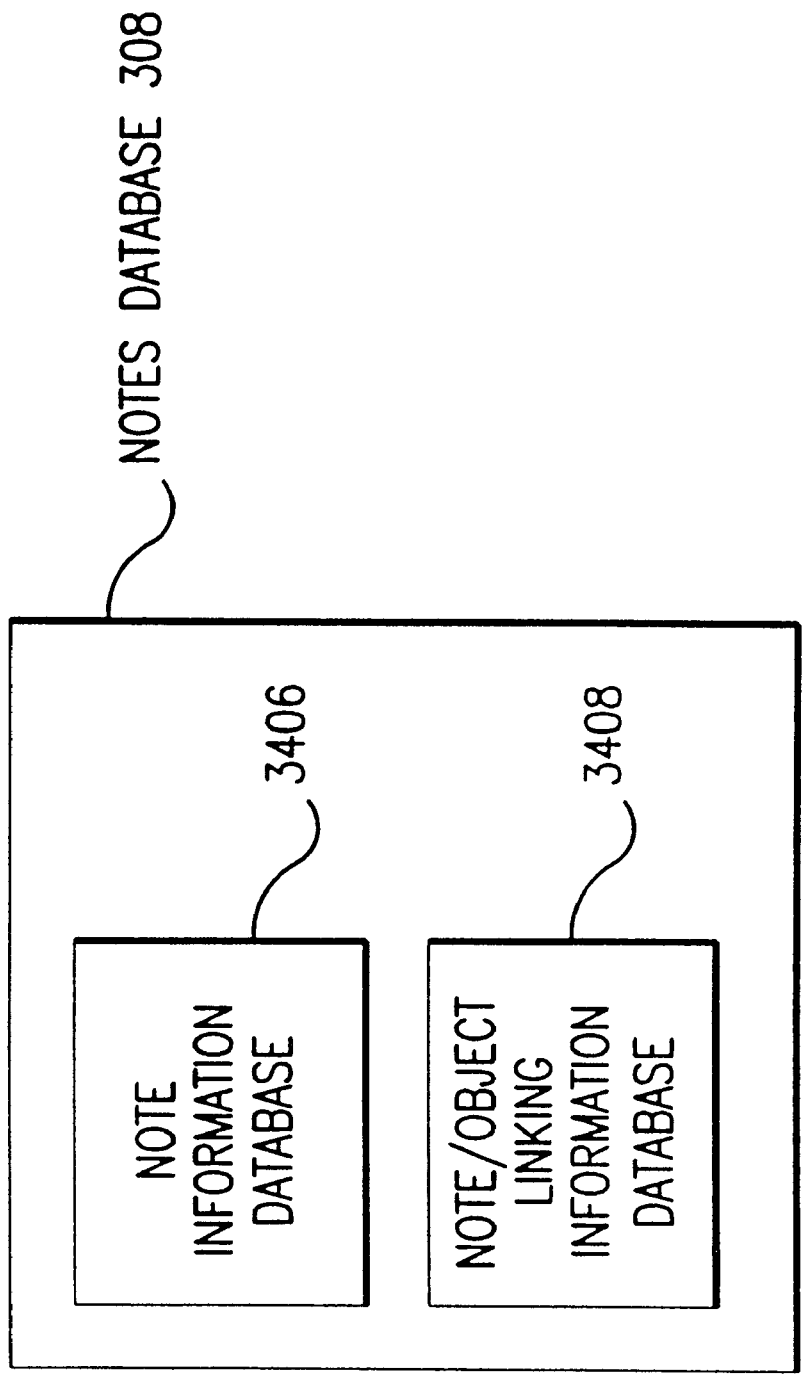
FIG. 36 is an additional block diagram of the notes database.

FIG. 35 represents an example VR scenario 3502 according to a preferred embodiment of the invention. The user is represented in VR scenario 3502 by a hand 3504. As will be appreciated by persons skilled in the VR arts, the user selects and manipulates objects in the VR world of FIG. 35 by using the virtual hand 3504, just like the user selects and manipulates objects in the real world using his own hand. Other techniques for manipulating objects in the VR world will be apparent to persons skilled in the VR arts. For example, manipulation may be accomplished by voice command, or by thought (tied to brain waves or brain impulses), or by body gestures, etc.

In the example of FIG. 35, the user selects a book 3508 from a library 3506. The user opens the book 3508 until a passage 3510 of interest is found. The user selects this passage 3510 and then links this passage 3510 to a sub-note 3518 in Note A. Such linkage may automatically occur upon the selection of the passage 3510 (since such selection results in the creation of sub-note 3518, and in the creation of the link between sub-note 3518 and the passage 3510, as described above). Alternatively, the user can link passage 3510 with sub-note 3518 by moving the hand 3504 from the passage 3510 to the sub-note 3518.

The user can enter comments into the sub-note 3518 using any input mechanism or procedure, such as typing on a real or virtual keyboard, audibly dictating the comments, etc.

Any of the displays and screen shots discussed herein, such as those shown in FIGS. 4, 6–13, 29–33, and 43, can be displayed and manipulated in the VR world. The user can manipulate the items and objects in those displays via the VR hand 3504 or any other virtual construct, instead of or in addition to a computer (physical or virtual) keyboard and mouse. The combination of the notes application 302 with virtual reality creates a very powerful, user friendly application.

In the discussion herein, the user is often said to issue a command, press a button, select an option from a menu, review a computer display, input/key in information or commands, or perform some other type of action that requires interaction with the computer. It should be understood that, according to the present invention, such interaction can be achieved using any type of user interface, including a conventional computer interface (using a keyboard and mouse, for example), or a virtual reality interface, as just described above.

3.7 Security

The invention includes many functions, features, and capabilities to maintain the security of the information contained in the note database 308. These security features can generally be categorized as follows: (1) security on individual note groupings, notes, sub-notes, links, and objects; and (2) security of the note database 308 as a whole. These two security features are discussed below.

3.7.1 Security on Individual Note Groupings, Notes, Sub-notes, Links, and Data Objects A person, group, or organization may wish to limit access to note groupings, notes, sub-notes, links, and/or data objects. Only people or groups who satisfy some specified criteria would have access to such note groupings, notes, sub-notes, links, and/or data objects. The present invention supports features for securing individual note groupings, notes, sub-notes, links, and data objects.

A note grouping, note, sub-note, link, or data object may be secured based on a number of criteria, including creator, owner, password, security level, or any other well known security criteria. For example, if a sub-note is secured based on the creator criteria, then only the creator may access the sub-note. If a sub-note is secured based on password, then only persons who have the correct password may access the sub-note. If a sub-note is secured based on security level, then only persons having the appropriate security level will have access to the sub-note.

In one embodiment, a person or group who satisfies the current security criteria for a note grouping, note, sub-note, link, or data object may modify the security criteria for the note grouping, note, sub-note, link, or data object. In other embodiments, only persons or groups who have satisfy a specified, alternate security criteria (such as administrators) may change existing security criteria.

If a note grouping is secured, then only persons who satisfy the specified criteria may gain access to the note grouping, and the notes, sub-notes, and connectors/links contained in the note grouping.

If a note is secured, then only persons who satisfy the specified criteria may gain access to the note, and the sub-notes and connectors/links contained in the note.

If a sub-note is secured, then only persons who satisfy the specified criteria may gain access to the sub-note, and the link contained in the note.

If a link (that links a sub-note to a data object portion) or a connector (that establishes the note grouping/note/sub-note hierarchy) is secured, then only persons who satisfy the specified criteria may gain access to and traverse the link/connector.

Figure 44:
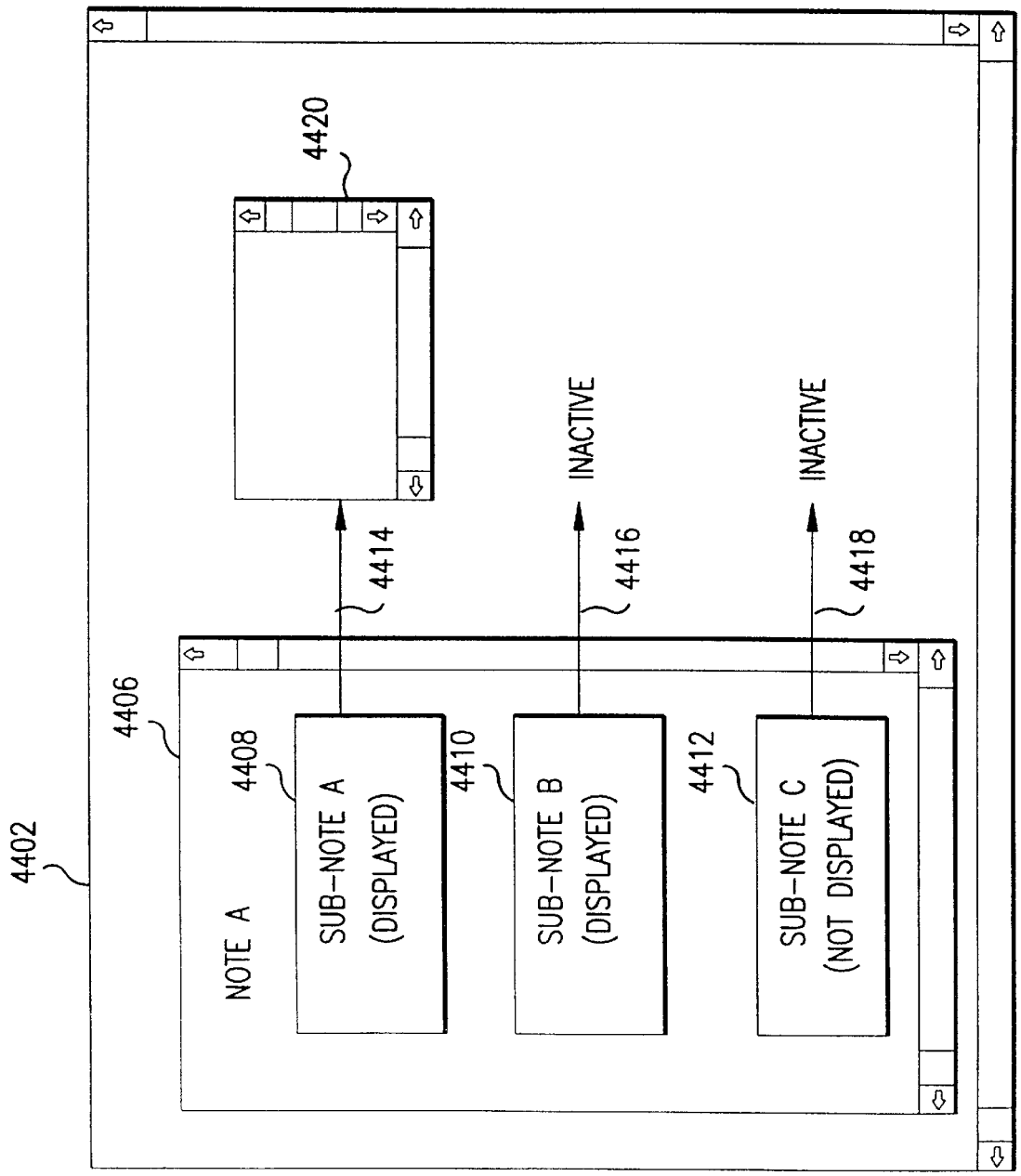
FIG. 44 illustrates the effect of security/privacy features of the invention.

This effect of security is illustrated in the example of FIG. 44. Note A is displayed in a note window 4406. It is assumed that Note A is not secured, or that the current user satisfies the security criteria associated with Note A. Note A includes Sub-notes A, B, and C. It is assumed that Sub-notes A and B are not secured, or that the current user satisfies the security criteria respectively associated with Sub-notes A and B. Accordingly, Sub-notes A and B are displayed. Sub-note C is secured. However, the current user does not satisfy the security criteria of Sub-note C. Thus, Sub-note C is not displayed.

It is assumed that the current user satisfies the security criteria respectively associated with link 4414. Thus, the link 4414 is active. The current user may manipulate and traverse link 4414. Thus, the data object associated with link 4414 is displayed in application window 4420. The current user does not satisfy the security criteria of link 4416. Thus, link 4416 is inactive. The current user may not manipulate and traverse link 4416. Thus, the data object associated with link 4416 is not displayed. It is irrelevant whether the current user does or does not satisfy the security criteria of link 4418. In either case, link 4418 is inactive since its Sub-note C is inactive (in other embodiments, the security state of a link is separate and distinct from the security state of its sub-note).

3.7.2 Security on the Note Database as a Whole

According to some embodiments of the present invention, the notes database 308 is stored in a single computer. In other embodiments of the present invention, the notes database 308 is distributed among multiple databases. Procedures and technology for distributing the notes database 308, and for working with the distributed notes database 308, will be apparent to persons skilled in the relevant art(s).

In some circumstances, the distribution of the notes database 308 is advantageous for implementation, performance, and robustness reasons. The motivations and advantages of distributed database systems in this regard are well known.

According to the present invention, the notes database 308 is also distributed for security reasons. In some situations, it is necessary to maintain the confidentiality and secrecy of the notes database 308. Distributing the notes database 308 aids in this effort, and it ensures that the inadvertent or improper disclosure of one part of the notes database 308 maintained at one site does not result in the disclosure of the other parts of the notes database 308 at other sites.

In some cases, it is critical that the linkage information contained in the notes database 308 be kept secret. The present invention utilizes techniques in addition to the data distribution approached described above to secure the linkage information in the notes database 308. These additional techniques also relate to data distribution.

In particular, the present invention preferably partitions the notes database 308 into a note information database 3406 and a note/object linking information database 3408. The note/object linking information database 3408 contains the linkage information that specifies how sub-notes are linked to data object portions. The note information database 3406 includes all information about notes and sub-notes except for the linkage information.

The note information database 3406 is distributed among a first set of sites. The note/object linking information database 3408 is distributed among a second set of sites. The first and second sets of sites may be the same, may be completely different, or may be partially the same.

Figure 38:
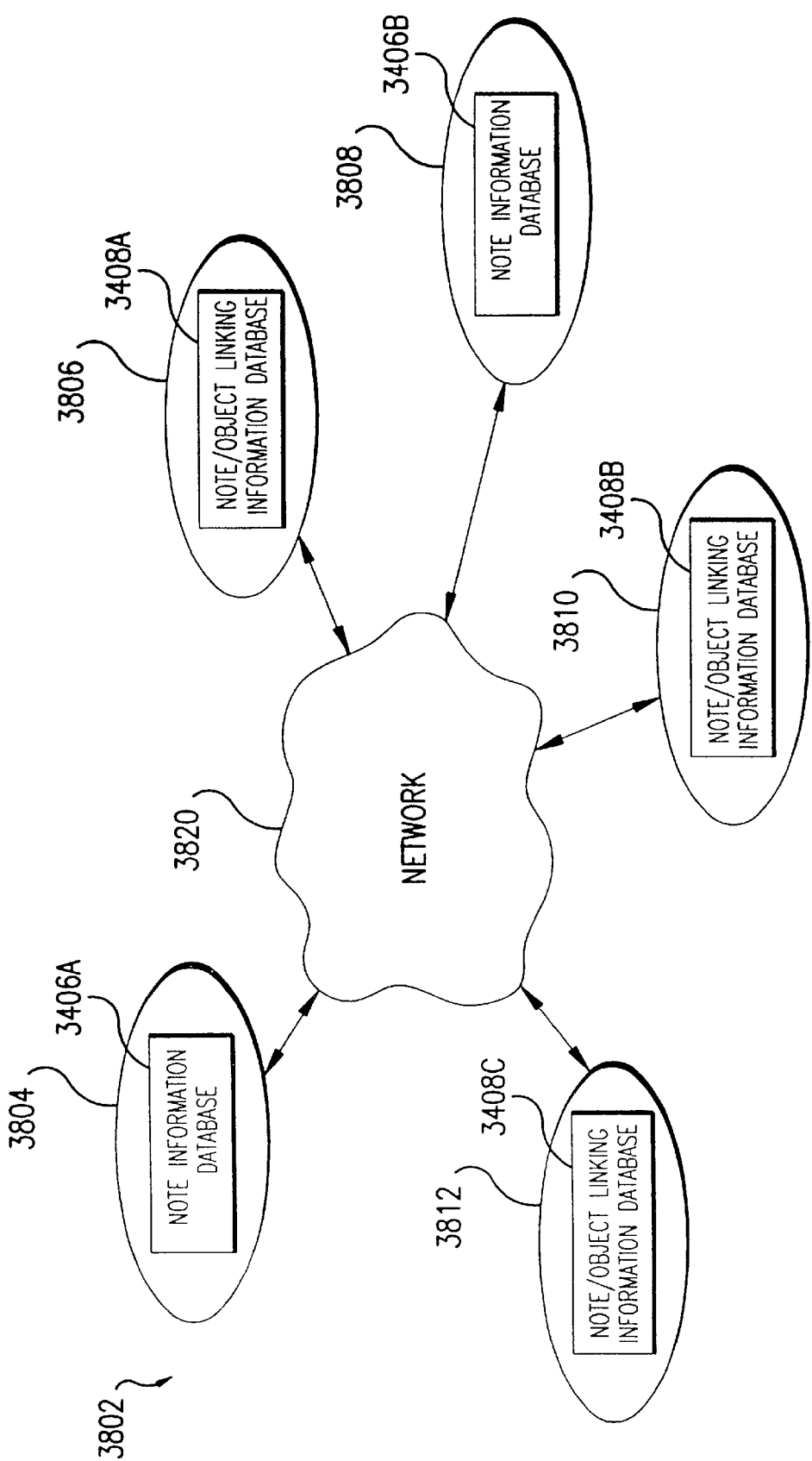

FIG. 38 illustrates an example implementation of the invention. In this example, the note information database 3406 is distributed among sites 3804 and 3406. The note/object linking information database 3408 is distributed among sites 3806, 3810, and 3812. These sites are connected via a network 3820, which may represent any type of communication medium in any form or configuration, such as a public network (the Internet, for example), a private network (such as a virtual network), dial up telephone lines, etc. The communication medium can include any type of communication links, such as fiber optics, coaxial cable, wireless, satellite links, etc., or any combination of these.

The invention uses other techniques for securing the notes database 308. In some embodiments, for example, all or part of the notes database 308 is encrypted. For example, references contained in the note information database 3406 to the note/object linking information database 3408 are encrypted using any well known encryption mechanism or algorithm, such as key encryption. Encryption of the notes database 308 is further described below.

3.8 Search Capabilities

The invention supports powerful search features for identifying note groupings, notes, sub-notes, links, and/or data objects that satisfy user supplied search criteria. Users can perform key word searches, searches based on date/time of creation or modification, searches based on icon tagging (icons can be predefined or user defined), searches based on creator or owner, searches based on security/privacy levels, etc. Preferably, sub-notes are indexed and searchable. Also, fields (predefined or user defined) within note groupings, notes, and sub-notes are indexed and searchable.

The user can limit the search to a user-defined path through the note/sub-note hierarchy (for example, the user can limit the search to a path that starts with a user specified note grouping, note, sub-note, link, etc.).

The operation of the search capabilities of the present invention are described further below.

4. Notes Database

Figure 14:
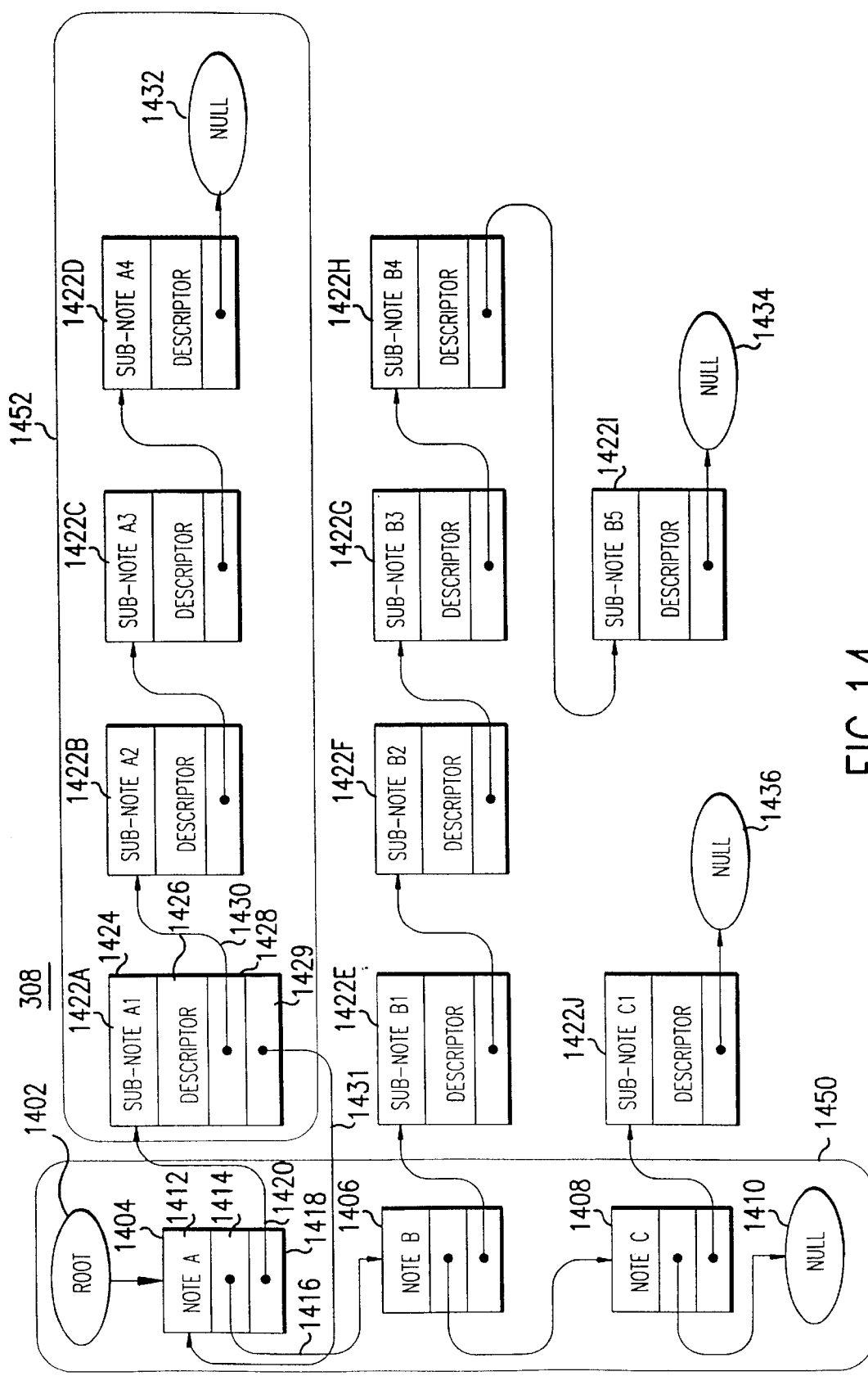
FIGS. 14 and 15 is a block diagram of a notes database according to an embodiment of the present invention.

Implementation of the notes database 308 according to an embodiment of the present invention shall now be described with reference to FIG. 14. FIG. 14 illustrates an example notes database 308 that stores Notes A, B, and C. Notes A, B, and C correspond to the example shown in FIGS. 8, 12, and 13, respectively.

The notes database 308 includes a node or record for each note. These nodes are called note nodes. Accordingly, the notes database 308 includes note nodes 1404, 1406, and 1408 for Notes A, B, and C. The note nodes 1404, 1406, and 1408 are arranged in a linked list 1450 that begins with a root node 1402 and ends with a null node 1410 (or a null pointer). Procedures for establishing, traversing, modifying, and maintaining linked lists are well known to persons skilled in the relevant art(s).

Each note node, such as note node 1404, includes a note identifier field 1412, a next note field 1414, and a next sub-note field 1418. The note identifier field 1412 stores information that identifies the note, such as "Note A" for note node 1404. The next note field 1414 stores either (1) a pointer to the next note node in the note linked list 1450, or (2) a null pointer if the note node is the last note node in the note linked list 1450 (see the note node 1408 for Note C). The next sub-note field 1418 stores either (1) a pointer to a sub-note linked list corresponding to sub-notes in the note, if the note has one or more sub-notes, or (2) a null pointer if the note does not have any sub-notes.

Each note node may include additional information, such as information that identifies the privacy/security criteria associated with the note.

The notes database 308 includes a node or record 1422 for each sub-note. These nodes 1422 are called sub-note nodes. The sub-note nodes 1422 for a note's sub-notes are arranged in a linked list, called a sub-note linked list. Consider sub-note linked list 1452, corresponding to Node A's sub-notes. The sub-note linked list 1452 begins with Node A's note node 1404 and ends with a null node 1432 (or a null pointer).

Each sub-note node, such as sub-note node 1422A, includes a sub-note name field 1424, a descriptor field 1426, a next sub-note field 1428, and a parent field 1429 (for readibility purposes, the parent field 1429 is only shown in sub-note node 1422A, but it exists and operates in the same manner for all sub-note nodes 1422). The sub-note name field 1424 stores the name of the sub-note, such as "Sub-note A." The next sub-note field 1428 stores either (1) a pointer to the next sub-note node in the sub-note linked list 1452, or (2) a null pointer if the sub-note node is the last sub-note node in the sub-note linked list 1452 (see the sub-note node 1422D for Sub-note A4). The parent field 1429 stores an address or pointer that points back to the note in which the sub-note is contained. Thus, for the sub-note node 1422A, the parent field 1429 includes a pointer to note node 1404.

Figure 15:
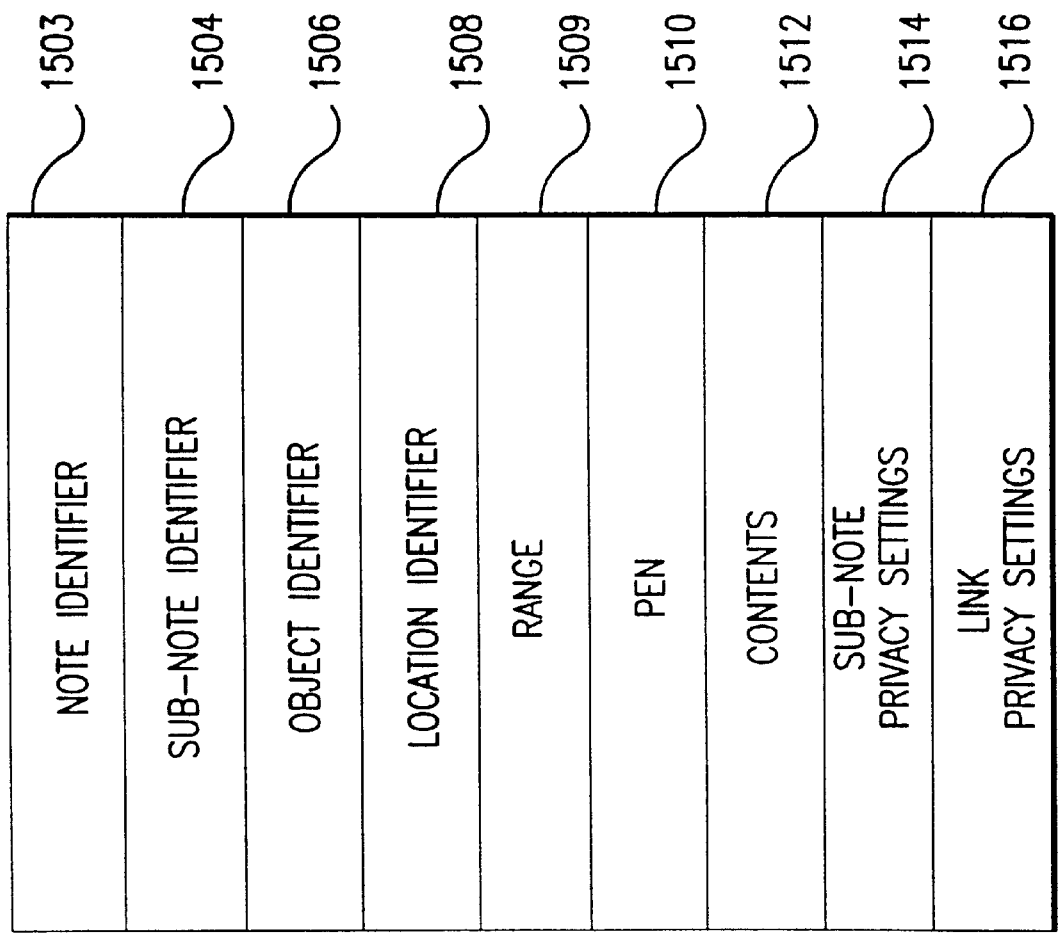

The descriptor field 1426 stores information pertaining to the sub-note. FIG. 15 is a block diagram of an exemplary descriptor field 1426. The descriptor field 1426 includes a note identifier field 1503, a sub-note identifier field 1504, an object identifier field 1506, a location identifier field 1508, a range field 1509, a pen field 1510, a contents field 1512, a sub-note privacy settings field 1514, and a link privacy settings field 1516. In some implementations, some of these fields are unused.

The note identifier field 1503 includes information that identifies the note in which the sub-note is contained.

The sub-note identifier field 1504 includes information that uniquely identifies the sub-note. For example, this identifier could be composed of the name of the note concatenated with the date/time stamp of when the sub-note was created. Other procedures for generating the sub-note identifier could alternatively be used, such as a hashing procedure.

The sub-note object identifier field 1506 stores information that identifies the data object containing the selected portion to which the sub-note is linked. This field 1506 may also store information that identifies the application associated with the data object.

The location identifier field 1508 stores information that identifies the location of the selected portion in the data object. If the data object is a patent, for example, the location identifier field 1508 may store "Column 5, line 15" or the like.

The range field 1509 stores information that identifies or indicates the range of the selected portion in the data object. If the data object is a patent, for example, the range field 1509 may store "Column 7, line 23." The location identifier field 1508 in combination with the range field 1509 identifies the selected portion in the data object. In the above example of a patent document, the selected portion goes from Column 5, line 15 to Column 7, line 23.

The pen field 1510 stores information that identifies the pen that was used to select the selected portion to which the sub-note is linked.

The contents field 1512 stores the information that the user entered into the sub-note window, such as sub-note window 610 shown in FIG. 8. The contents field 1512 may include information of any form. For example, the contents field 1512 may store text data, image data, digitized audio and/or video, an executable computer program, tactile data (for controlling a braille device, for example), and/or links or references to any of the above.

The sub-note privacy settings field 1514 stores the privacy/security criteria associated with the sub-note.

The link privacy settings field 1516 stores the privacy/security criteria associated with the link of the sub-note.

Each note node and/or sub-note node may store additional information, such as the security/privacy criteria associated with the connector lines that connect notes to sub-notes.

Figure 45:
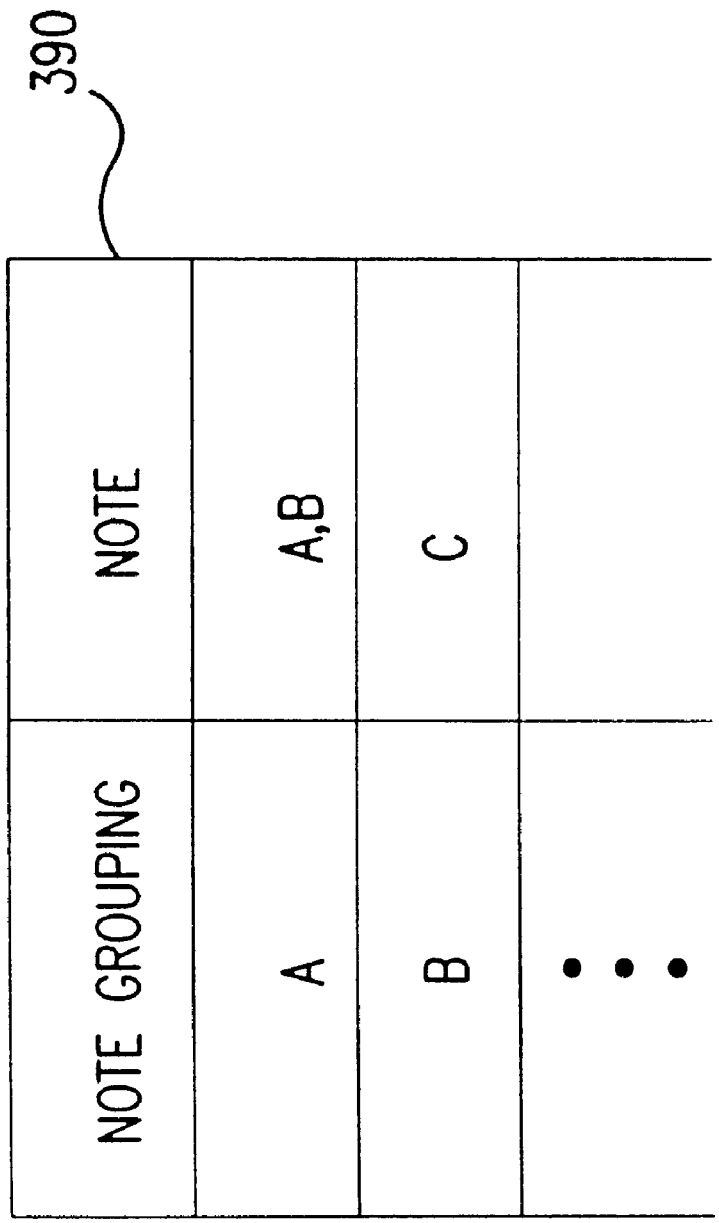
FIG. 45 is a block diagram of a note grouping table.

The notes database 308 also includes a note grouping table 390 (FIG. 45) or some other functionally equivalent data structure. The note grouping table 390 indicates the notes contained in each note grouping.

The notes database 308 could be implemented in ways other than that shown in FIG. 14, and described above. In particular, the notes database 308 could be implemented using any well known data structure or organization. Various data structures are described in many publicly available documents, such as Niklaus Wirth, *Algorithns+Data Structures=Programs,* Prentice Hall, 1976, which is herein incorporated by reference in its entirety.

As discussed above, in some embodiments the notes database 308 is partitioned into a note information database 3406 and a note/object linking information database 3408. The note information database 3406 and the note/object linking information database 3408 may be distributed among a plurality of sites, as shown in FIG. 38.

Figure 37:
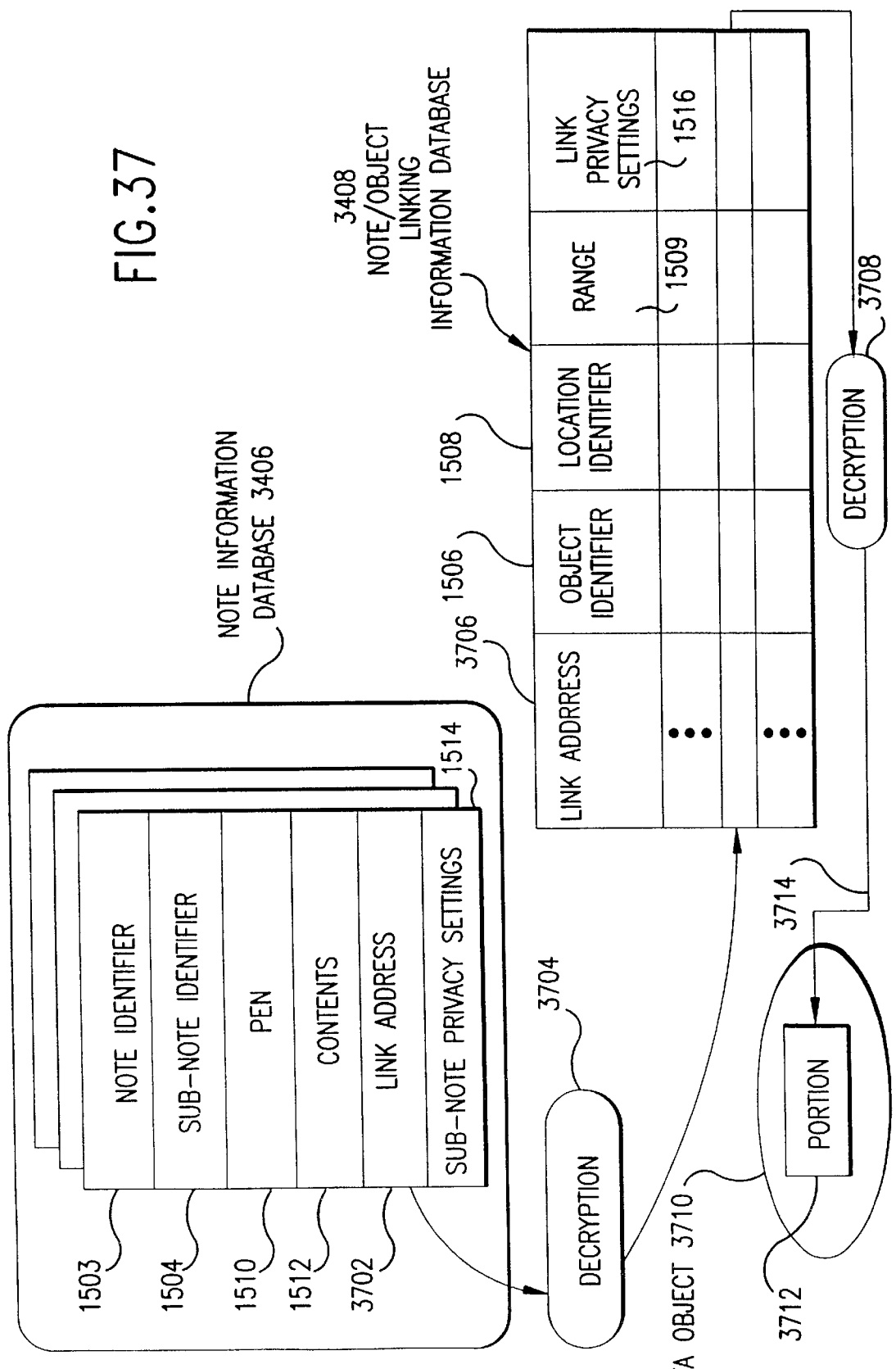
FIGS. 37 and 38 illustrate distribution of the notes database.

FIG. 37 illustrates the note information database 3406 and the note/object linking information database 3408 in greater detail. In essence, the descriptor field 1426 from each sub-note node 1422 is divided among the note information database 3406 and the note/object linking information database 3408. The note information database 3406 stores the note identifier 1503, the sub-note identifier 1504, the pen 1510, the contents 1512, and the sub-note privacy settings 1514. The note/object linking information database 3408 stores the object identifier 1506, the location identifier 1508, the range 1509, and the link privacy settings 1516. Other information stored in the note nodes and the sub-note nodes are preferably stored in the note information database 3406.

The note information database 3406 also stores for each sub-note node a link address field 3702. Similarly, the note/object linking information database 3408 stores for each sub-note node a link address field 3706. An entry in the note information database 3406 corresponds to an entry in the note/object linking information database 3408 if the contents of the link address fields 3702, 3706 are the same.

The use of the note information database 3406 and the note/object linking information database 3408 shall now be described. Suppose that the notes application 302 is processing a sub-note and the data object portion that it is linked to. The notes application 302 retrieves the entry in the note information database 3406 corresponding to this sub-note. The notes application 302 processes the information contained in the note identifier field 1503, the sub-note identifier field 1504, the pen field 1510, the contents field 1512, and the sub-note privacy settings field 1514 in whatever way appropriate for the type of processing that the notes application 302 is performing.

In order to identify and access the linked data object portion, the notes application 302 retrieves the link address from the link address field 3702. This link address is used as an index into the note/object linking information database 3408 to identify the entry corresponding to the entry being processed in the note information database 3406. The linked data object is identified by the information in the object identifier field 1506, location identifier field 1508, and range field 1509 of this corresponding entry.

In some embodiments, the invention further secures the information in the notes database 308 by encrypting the link address in the link address field 3702 of the note information database 3406, and by encrypting the object identifier field 1506, location identifier field 1508, and range field 1509 in the note/object linking information database 3408. In these embodiments, the notes application 302 retrieves the link address from the link address field 3702. The notes application 302 then decrypts this link address (indicated by 3704). This decrypted link address is used as an index into the note/object linking information database 3408 to identify the entry corresponding to the entry being processed in the note information database 3406. The linked data object is identified by the information in the object identifier field 1506, location identifier field 1508, and range field 1509 of this corresponding entry. Before it can use this information, however, the notes application 302 must decrypt the object identifier field 1506, location identifier field 1508, and range field 1509 (indicated by 3708). This decrypted information can then be used to identify linked portion 3712 in data object 3710.

In the description contained herein, it is often said that information is stored or retrieved from the notes database 302. More generally, it is said that the notes database 302 is accessed. The technology, procedure, algorithms, etc., for accessing the notes database 302 (whether the notes database 302 is centralized or distributed) will be apparent to persons skilled in the relevant art(s).

5. Operation of the Invention

Figure 17:
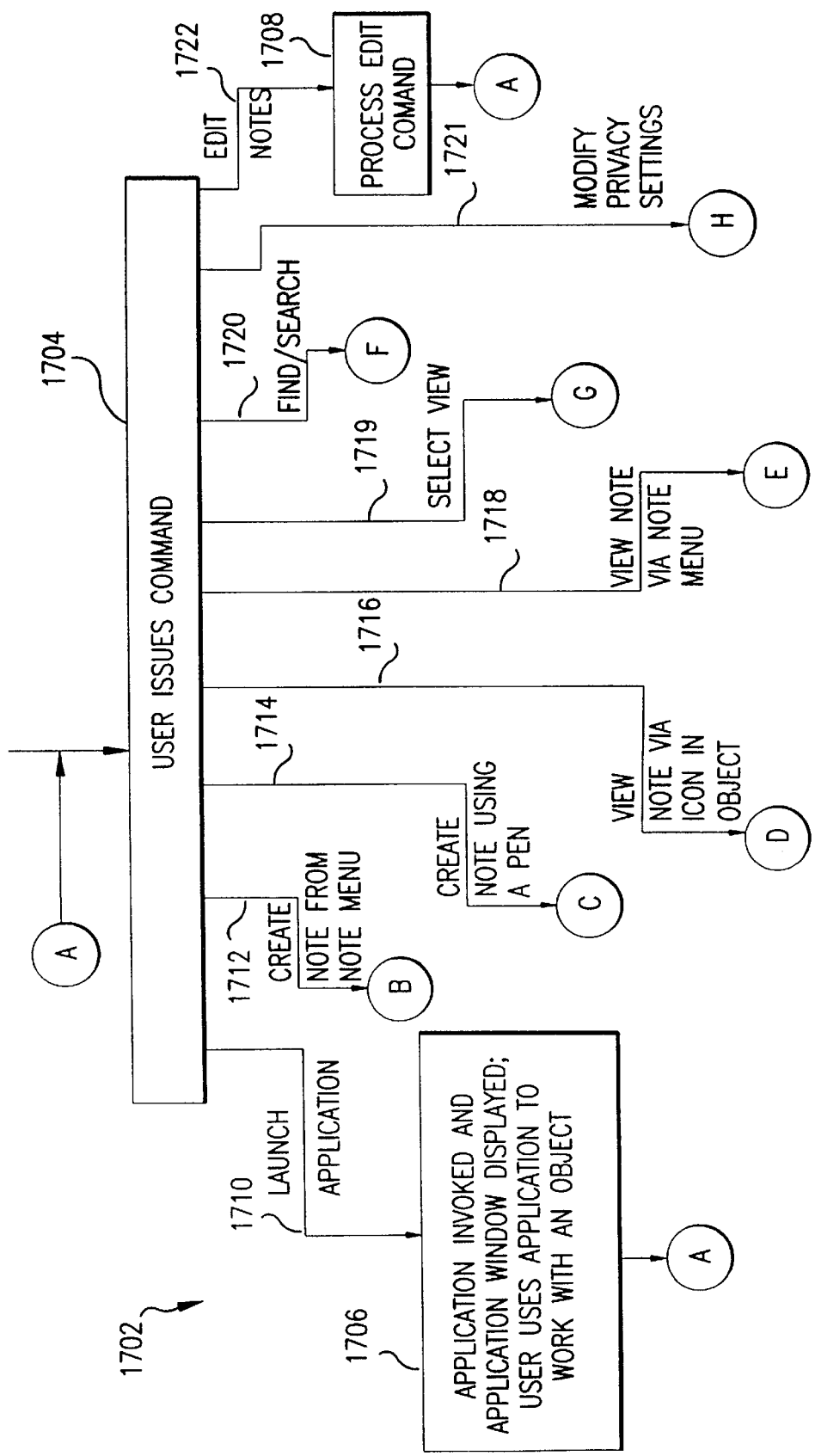
FIGS. 17, 18, 19, 20, 21, 22, 23, 24, 25, 26, 27, 39, and 40 are flowcharts depicting the preferred operation of the present invention.

The operation of the present invention shall now be described with reference to a flowchart 1702 shown in FIG. 17. Flowchart 1702 illustrates the manner in which a user interacts with the notes application 302 to organize data objects, and to manipulate notes attached to portions of data objects.

Such user interaction with the notes application 302 is preferably achieved through interaction with a user interface 304 that forms part of the notes application 302. As apparent from the discussion below, the user interface 304 of the present invention is very powerful and flexible. In particular, the user interface 304 allows users to access the functionality of the notes application 302 in any number of ways. Accordingly, the operational steps shown in flowchart 1702 and in other flowcharts discussed below represent one way (i.e., one operational sequence) of accessing the functions provided by the notes application 302. Users may access and traverse the functions provided by the notes application 302 in any number of other ways via interaction with the menus provided by the user interface 304. Such other ways (i.e., such other operational sequences) will be apparent to persons skilled in the relevant art(s).

In step 1704, the user issues a command to an operating system executing in the computer system 2802. The user may issue this command via a keyboard or a well known point-and-click approach, or via a body gesture, thought, or voice command when using a VR user interface, or via any other well known means for entering a command.

If the user issued a command to launch an application, then control line 1710 is taken. If the user issued a command to create a new note/sub-note, and this command was issued using the note menu 1602, then control line 1712 is taken. If the user issued a command to create a new note/sub-note, and this command was issued using a pen (such as pen 1350 in FIG. 13) or VR hand 3504 or the like, then control line 1714 is taken. If the user issued a command to view a note, and this command was issued by selecting a linking button in a data object, then control line 1716 is taken. If the user issued a command to view a note, and this command was issued from the note menu, then control line 1718 is taken. If the user issued a command to select a view, then control line 1719 is taken. If the user issued a command to find a note, then control line 1720 is taken. If the user issued a command to modify the privacy/security settings associated with a note grouping, note, sub-note, or link, then control line 1721 is taken. If the user issued a command to edit one or more notes, then control line 1722 is taken. These control flows and commands are discussed below.

5.1 Launch an Application

If the user in step 1704 issued a command to launch an application, then step 1706 is performed.

In step 1706, the operating system in the computer system 2802 invokes the user-specified application in a well known manner. The application may be a word processing application, a spread sheet application, a database application, a communication application, a video/audio processing application, a financial application, etc. The invoked application displays an application window, such as application windows 408, 802, 1004, 1104, and 1202 shown in FIGS. 4 and 6–12. Typically, the user commands the application to load a data object, and uses the application to process the data object.

In the user interface environment of the present invention, control from step 1706 may then flow to any number of directions. In some cases, control flows back to step 1704, as shown in FIG. 17.

5.2 Create a Note/Sub-note (From the Note Menu)

Figure 18:
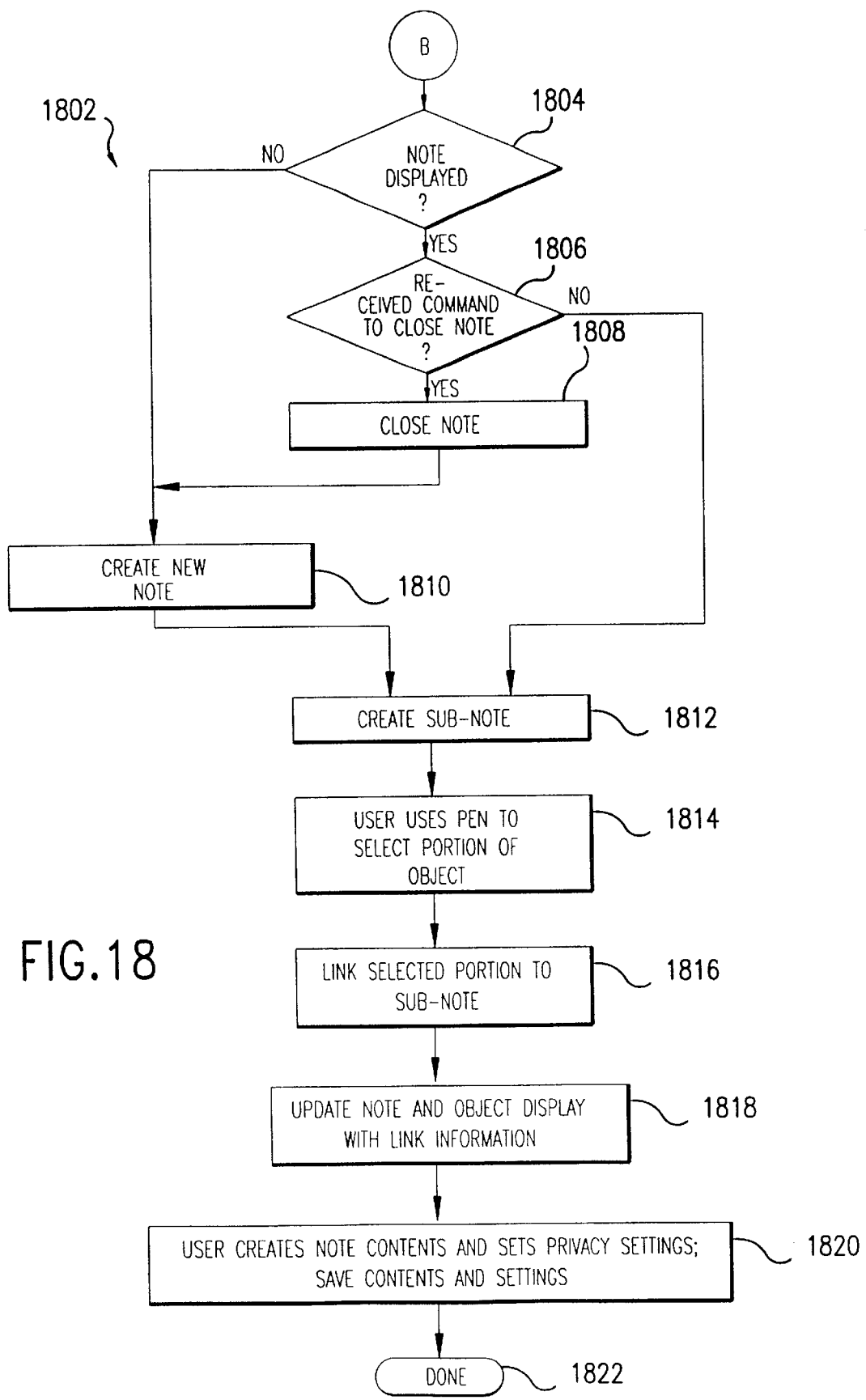

One way for the user to issue a command to create a new note or sub-note is to open the note menu 1602 (by pressing the note menu button 409), and then select the "New Note/Sub-note" option. In response to this command, the notes application 302 performs the steps of flowchart 1802 in FIG. 18.

In step 1804, the notes engine 306 of the notes application 302 determines whether a note is currently being displayed in the computer display (i.e., the display unit 2826). That is, the notes engine 306 determines whether a notes window (such as notes window 606 in FIG. 6) is currently open in the computer display (which may be a conventional computer monitor or display produced in a VR environment). If a note is not currently being displayed, then step 1810 is performed. Otherwise, step 1806 is performed.

In step 1806, the notes engine 306 determines whether the user has issued a command to close the note that is currently being displayed. The user issues such a command if he wishes to insert the new sub-note in a new note, as opposed to the currently opened note. If the notes engine 306 determines that the user has not issued a command to close the note that is currently being displayed, then step 1812 is performed (described below). In step 1812, the note currently being displayed is called the active note for reference purposes. Otherwise, step 1808 is performed.

In step 1808, the notes engine 306 closes the note.

Figure 19:
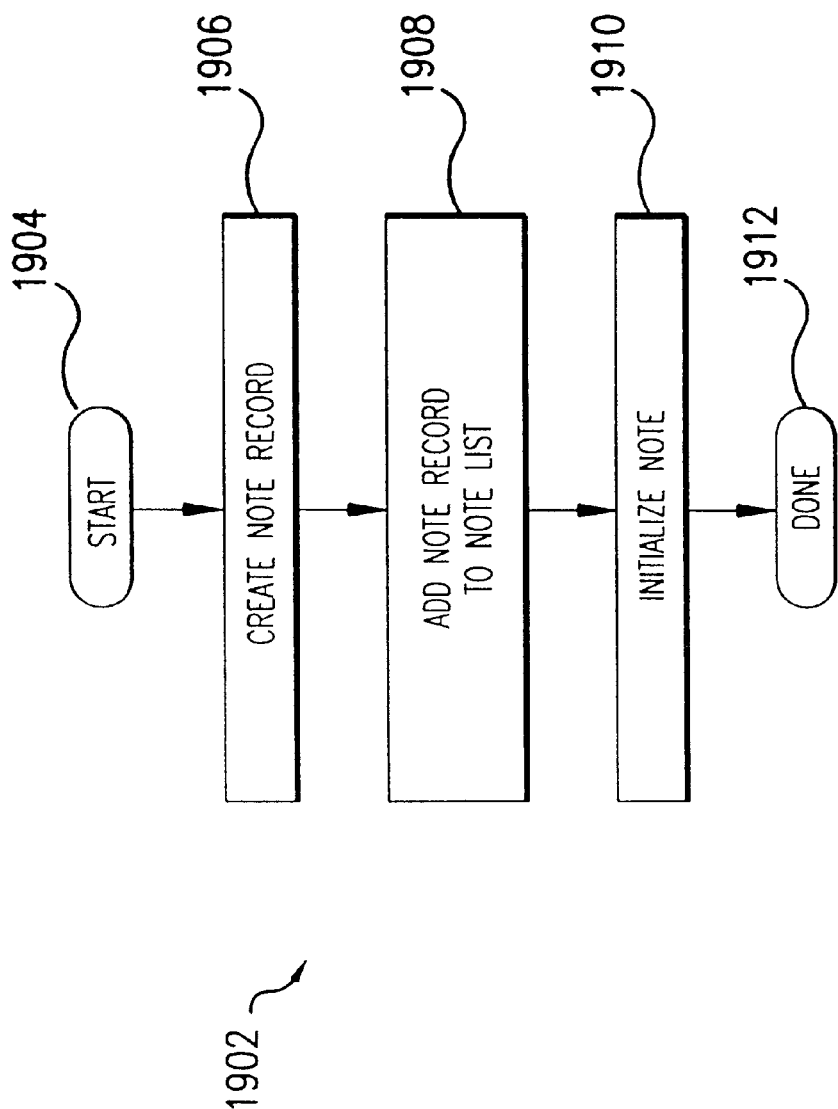

In step 1810, the notes engine 306 creates a new note. As represented by a flowchart 1902 in FIG. 19, the notes engine 306 creates a new note by creating a new notes node (such as notes node 1408 in FIG. 14) in the notes database 308 (step 1906). The notes engine 306 adds the new notes node to the node linked list 1450 (step 1908). Procedures for adding a node to a linked list are well known. The notes engine 306 in step 1910 initializes the new notes node by storing the name of the new note in the note identifier field 1412 (this name is preferably entered by the user). Also, the notes engine 306 in a well known manner stores pointers in next note field 1414 of the active note's notes node and of other notes nodes (as necessary) so as to add the new notes node in the node linked list 1450. At this point, the notes application 302 may also prompt the user for security/privacy settings for the new note. Any security/privacy settings input by the user are also stored in the new note.

Also at this point, the notes application 302 may receive from the user a command identifying a notes group (either existing or new) to which the notes application 302 should add the new note. If the user provides this information, then the notes application 302 modifies the note grouping table 390 accordingly.

Referring again to FIG. 18, also in step 1810, the user interface 304 opens a notes window (such as notes window 606 in FIG. 6), and displays the new note in the notes window. The new note is called the active note for reference purposes.

Figure 20:
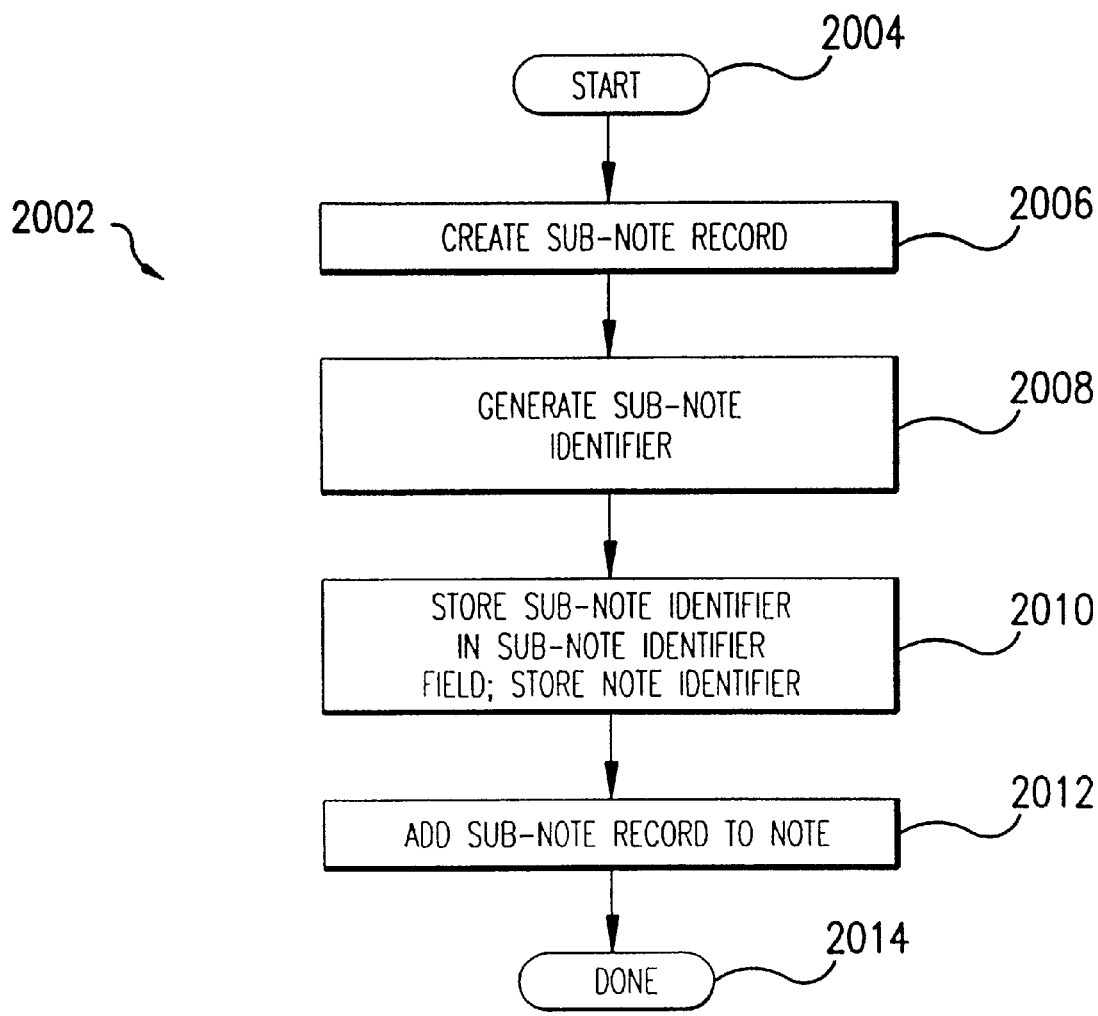

In step 1812, the notes engine 306 creates a new sub-note. As indicated in a flowchart 2002 in FIG. 20, the notes engine 306 creates a new sub-note by creating a new sub-note node (such as sub-note node 1422A in FIG. 14) in step 2006. In step 2008, the notes engine 306 generates a sub-note identifier for the new sub-note. The sub-note identifier is unique among all sub-notes. The sub-note identifier may be composed of the name of the note (i.e., the active note) concatenated with the current date/time stamp. Other procedures for deriving the sub-note identifier could alternatively be used. In step 2010, the notes engine 306 stores the sub-note identifier in the sub-note identifier field 1504 of the new sub-note node. The notes engine 306 also stores information identifying the new note in the note identifier field 1503. In step 2012, the notes engine 306 adds the new sub-note node to the active note's sub-note linked list (such as sub-note linked list 1452). At this point, the notes engine 306 may also receive a command from the user indicating the privacy/security setting of the new sub-note. If the user enters this information, then the notes engine 306 stores the privacy/setting of the new sub-note in the sub-note privacy settings field 1514.

Referring again to FIG. 18, the user interface 304 in step 1814 enables the user to link the new sub-note to a portion of a data object. It may be necessary for the user to open the data object in a well known manner prior to the performance of step 1814. Alternatively, the data object may already have been opened by the user. In any case, in step 1814, the user selects one of the pen buttons 410 in order to obtain a pen. The user then uses this pen (in the manner discussed above) to select a portion of the data object. Procedures for selecting portions of data objects are well known. The procedure for selecting a portion of a data object is dependent on the application associated with the data object. The notes engine 306 commands the application associated with the data object to color code the selected portion using the color associated with the pen.

Figure 21:
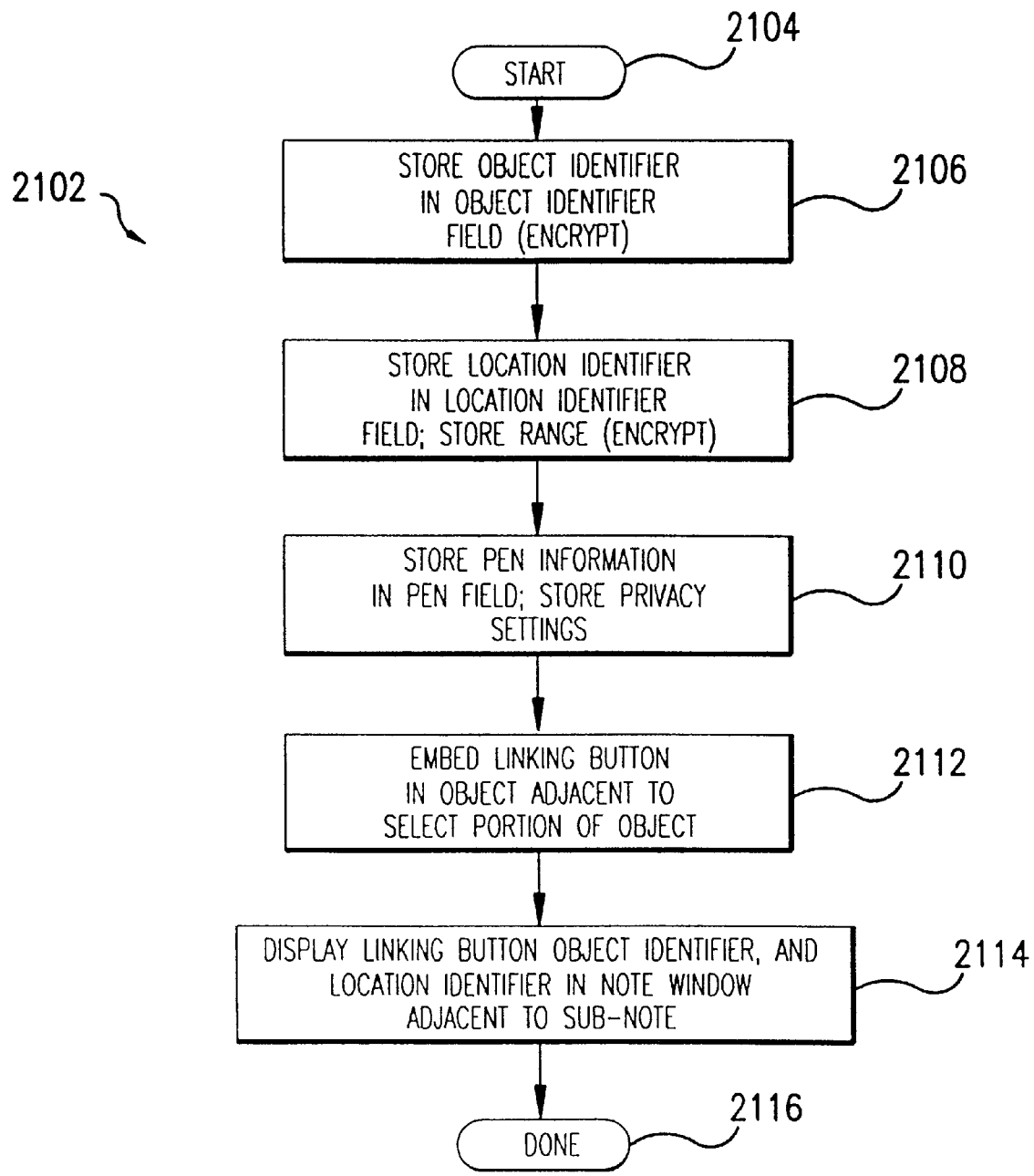

In step 1816, the notes engine 306 links the selected portion of the data object to the new sub-note. In step 1818, the notes engine 306 updates the displays of the data object and the active note so as to graphically reflect this linkage. The notes engine 306 performs steps 1816 and 1818 in the manner shown in a flowchart 2102 of FIG. 21.

In step 2106, the notes engine 306 stores information identifying the data object in the object identifier field 1506 of the new sub-note node. This information may be the file name of the data object, for example. The notes engine 306 may also store in the object identifier field 1506 information identifying the application associated with the data object. The notes engine 306 may obtain the information to be stored in the object identifier field 1506 by querying the application associated with the data object.

In step 2108, the notes engine 306 stores in the location identifier field 1508 of the new sub-note node information that identifies the location of the selected portion in the data object. If the data object is a text document, for example, then this information may comprise page and line information. If the data object is a spreadsheet document, then this information may comprise cell identification information. If the data object is a database document, then this information may comprise record and field identification information. The notes engine 306 preferably obtains this location identification information by querying the application associated with the data object. Also in step 2108, the notes engine 306 stores in the range field 1509 information that indicates the range of the selected portion in the data object.

As discussed above, in some embodiments the object identifier field 1506, the location identifier field 1508, and the range field 1509 are partitioned into the note/object linking information database 3408 (along with the link privacy settings 1516). All other information is stored in the note information database 3406. In these embodiments, the notes engine 306 also generates a link address, and stores the link address in both the link address field 3702 of the entry in the note information database 3406 and the link address field 3706 of the corresponding entry in the note/object linking information database 3408. In some embodiments, the object identifier field 1506, the location identifier field 1508, and the range field 1509 are encrypted. Thus, in steps 2106 and 2108 the notes engine 306 encrypts the pertinent data before storing it in these fields. Also in some embodiments, the link address contained in the link address field 3702 of the entry in the note information database 3406 is encrypted. Thus, the notes engine 306 encrypts the link address before storing it in the link address field 3702 of the entry in the note information database 3406.

In step 2110, the notes engine 306 stores in the pen field 1510 information that identifies the pen that the user used in step 1814 to select a portion of the data object. Preferably, the notes engine 306 stores in the pen field 1510 information identifying the color of the pen, and the symbol associated with the pen. The notes engine 306 may store privacy/security settings information for the sub-note and/or the link in the appropriate fields 1514, 1516, if the user enters this information.

In step 2112, the notes engine 306 commands the application associated with the data object to display a linking button proximate or adjacent to the selected portion. The linking button is displayed using the color of the pen used to select this selected portion, and using the symbol associated with this color (see FIG. 5). The notes engine 306 associates the sub-note identifier for the new sub-note with this linking button. In this manner, the notes engine 306 can locate the new sub-note if the user presses the linking button (such operation is described below).

In step 2114, the notes engine 306 displays a linking button (identical to that described in step 2112) in the notes window for the active note. The linking button is displayed proximate or adjacent to the sub-note window for the new sub-note (see FIG. 6, for example). The notes engine 306 also displays information identifying the data object in the object field proximate or adjacent to the sub-note window for the new sub-note (such as object field 614 in FIG. 6). The notes engine 306 further displays information identifying the location of the selected portion in the location field proximate or adjacent to the sub-note window for the new sub-note (such as location field 616 in FIG. 6).

Referring again to FIG. 18, the user interface 304 in step 1820 enables the user to enter information in the sub-note window of the new sub-note. Such information can be of any format, such as text, sound, video, tactile, computer program, etc. The notes engine 306 stores this information in the contents field 1512 of the new sub-note's node. The user may also enter privacy settings at this time for the note, sub-note, or link. The notes engine 306 stores any such information entered by the user in the appropriate fields.

5.3 Create a Note/Sub-note (Using a Pen)

Figure 22:
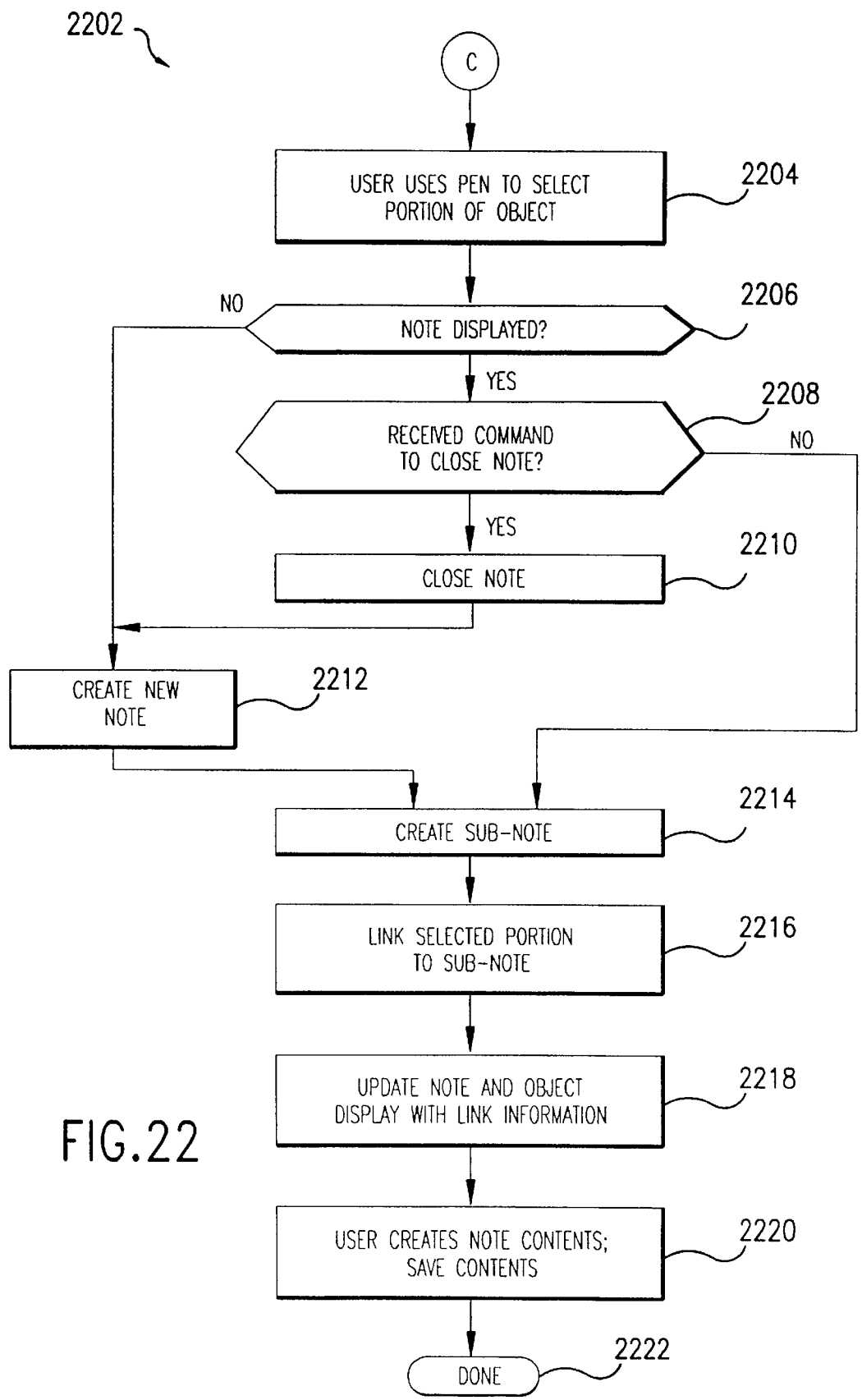

Another way for the user to issue a command to create a new note or sub-note is to press one of the pen buttons 410, and then use the resulting pen to select a portion of the data object currently being displayed. A new sub-note is then created and linked to this selected portion. This approach does not require the user to use the note menu 1602. The operation of the notes application 302 in accordance with this approach is represented by a flowchart 2202 shown in FIG. 22.

In step 2204, the user selects one of the pen buttons 410 in order to obtain a pen. The user then uses this pen (in the manner discussed above) to select a portion of the data object. The notes engine 306 commands the application associated with the data object to color code the selected portion using the color associated with the pen.

In step 2206, the notes engine 306 of the notes application 302 determines whether a note is currently being displayed in the computer display (in a manner discussed above). If a note is not currently being displayed, then step 2212 is performed (discussed below). Otherwise, step 2208 is performed.

In step 2208, the notes engine 306 determines whether the user has issued a command to close the note that is currently being displayed. The user issues such a command if he wishes to insert the new sub-note in a new note, as opposed to the currently opened note. If the notes engine 306 determines that the user has not issued a command to close the note that is currently being displayed, then step 2214 is performed (described below). (In step 2214, the note currently being displayed is called the active note for reference purposes.) Otherwise, step 2210 is performed.

In step 2210, the notes engine 306 closes the note.

In step 2212, the notes engine 306 creates a new note (in the manner discussed above). Also in step 2212, the user interface 304 opens a notes window (such as notes window 606 in FIG. 6), and displays the new note in the notes window. The new note is called the active note for reference purposes.

In step 2214, the notes engine 306 creates a new sub-note (in the manner discussed above). The user interface 304 opens a sub-note window in the window for the active note, and displays the new sub-note in this sub-note window.

In step 2216, the notes engine 306 links the selected portion of the data object to the new sub-note (in the manner discussed above).

In step 2218, the notes engine 306 updates the displays of the data object and the active note so as to graphically reflect this linkage (in the manner discussed above).

In step 2220, the user interface 304 1820 enables the user to enter information in the sub-note window of the new sub-note. Such information can be of any format, such as text, sound, video, tactile, computer program, etc. The notes engine 306 stores this information in the contents field 1512 of the new sub-note's node. Any security/privacy settings entered by the user are also stored.

5.4 View Note (By Selecting a Linking Button in a Data Object)

Figure 23:
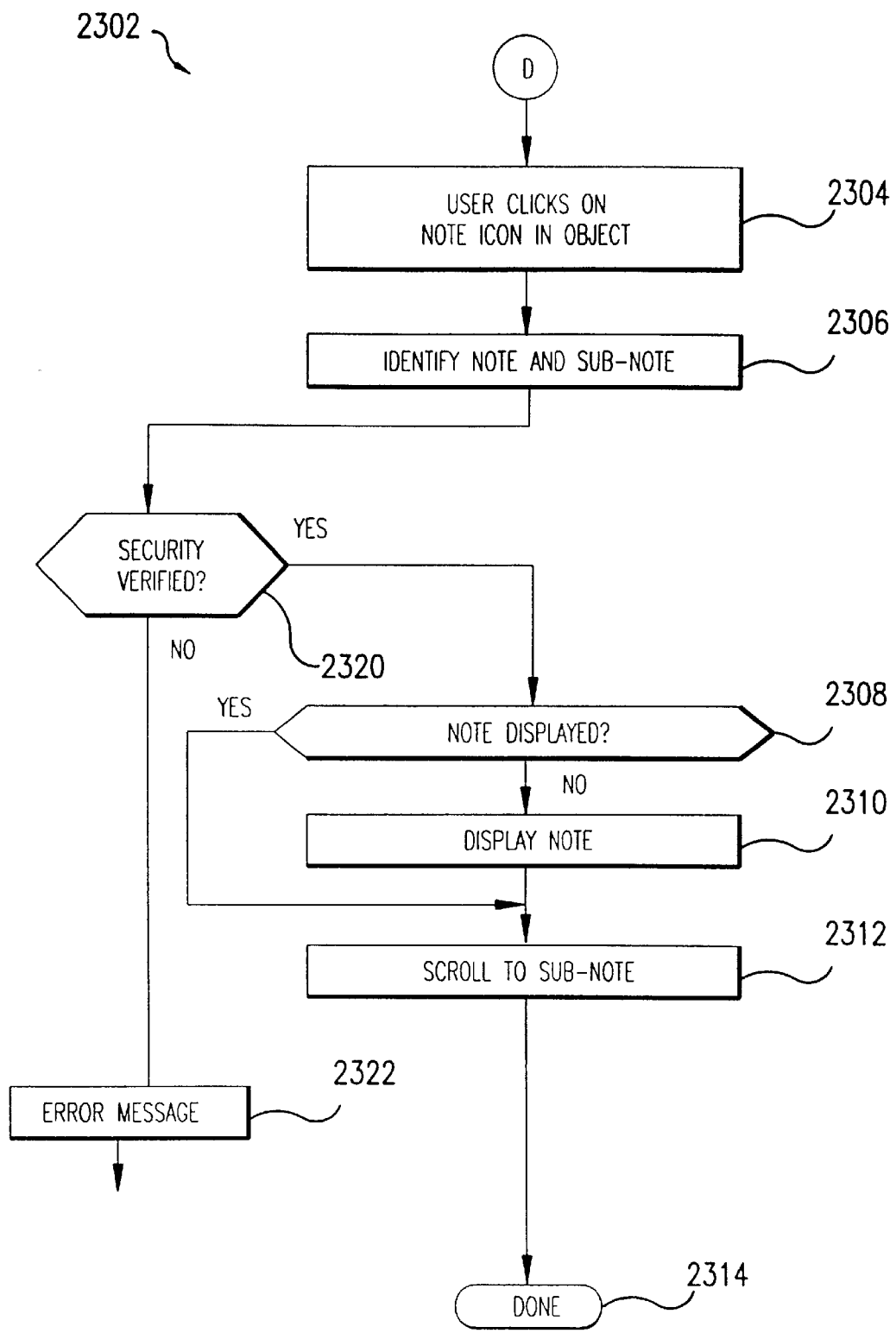

One way for the user to issue a command to view an existing sub-note is to select (using the well known point-and-click approach) the linking button displayed proximate to the portion of the data object that is linked to the sub-note. For example, in FIG. 6, the user can issue a command to view Sub-note A1 by selecting the linking button 604 next to the portion 602 of the patent data object that is linked to Sub-note A1. The operation of the notes application 302 in this regard is represented by a flowchart 2302 in FIG. 23.

In step 2304, the user selects the linking button displayed proximate to the portion of the data object of interest. For illustrative purposes, suppose that the user clicked on the linking button 1218 corresponding to portion 1216 of the audio data object titled "XYZ" (FIG. 12).

Figure 24:
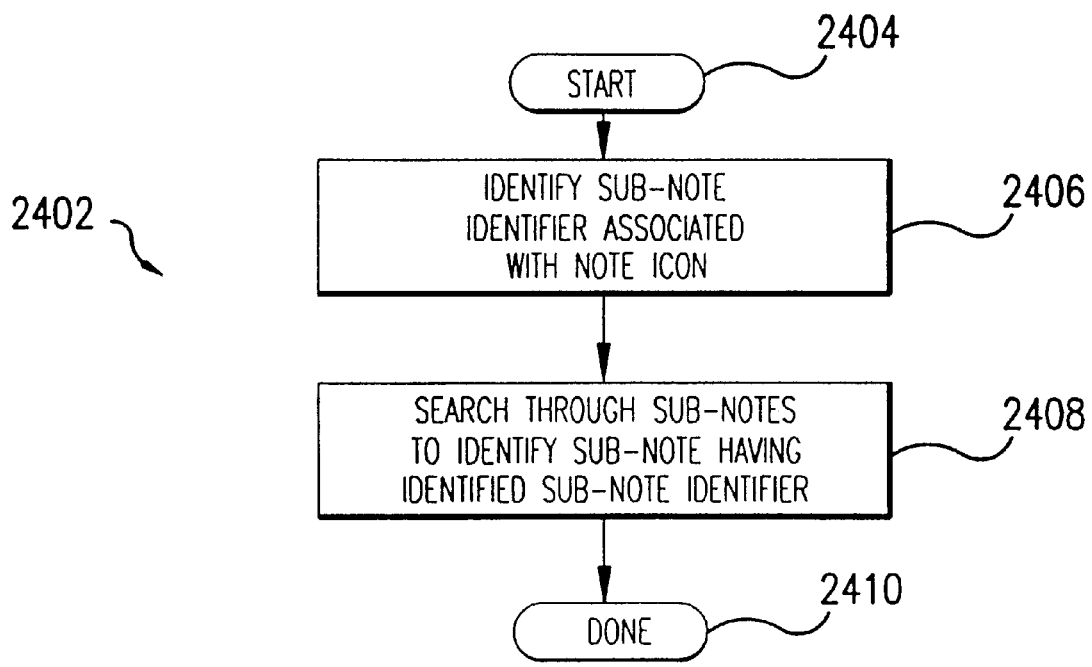

In step 2306, the notes engine 306 in response to this user action identifies the note and sub-note corresponding to linking button 1218. The manner in which the notes engine 306 performs step 2306 is represented by a flowchart 2402 in FIG. 24. In step 2406, the notes engine 306 identifies the sub-note identifier that is associated with the linking button 1218. The linking button 1218 preferably has stored with it the sub-note identifier (or some other type of pointer or address to a sub-note). In step 2408, the notes engine 306 searches in a well known manner through the notes database 308 until it locates the sub-note having the sub-note identifier determined in step 2406. For illustrative purposes, assume that the notes engine 306 in step 2408 determines that Sub-note B5 (see FIGS. 12 and 14) has the sub-note identifier determined in step 2406.

In step 2320, the notes engine 306 determines whether security/privacy criteria associated with the link (corresponding to the linking button), the sub-note (identified in step 2306), and the note (identified in step 2306) are satisfied. The notes engine 306 retrieves this security/privacy criteria information from the associated note node and sub-note node, and then compares the retrieved security/privacy criteria information to the situation at hand. For example, if the security/privacy criteria is keyed to the current user's password, then the notes engine 306 compares the password of the current user (which the current user previously entered, or is now asked to enter)

with that retrieved from the note and/or sub-note. If the security/privacy criteria is not satisfied, then the user cannot view the note and/or sub-note. If this is the case, then an error message is displayed in step 2322. If the security/privacy criteria is satisfied, then control flows to step 2308.

In step 2308, the notes engine 306 determines whether the note that includes the sub-note identified in step 2306 is currently being displayed in the computer display. In the example discussed above, the notes engine 306 in step 2308 determines whether Note B is currently being displayed in the computer display. If Note B is currently being displayed in the computer display, then control flows to step 2312 (described below). Otherwise, step 2310 is performed.

In step 2310, the notes engine 306 displays in a notes window the note that includes the sub-note identified in step 2306.

In step 2312, the notes engine 306 scrolls through the note in the notes window until the sub-note identified in step 2306 is displayed in the notes window.

5.5 View Note (From the Note Menu)

Figure 25:
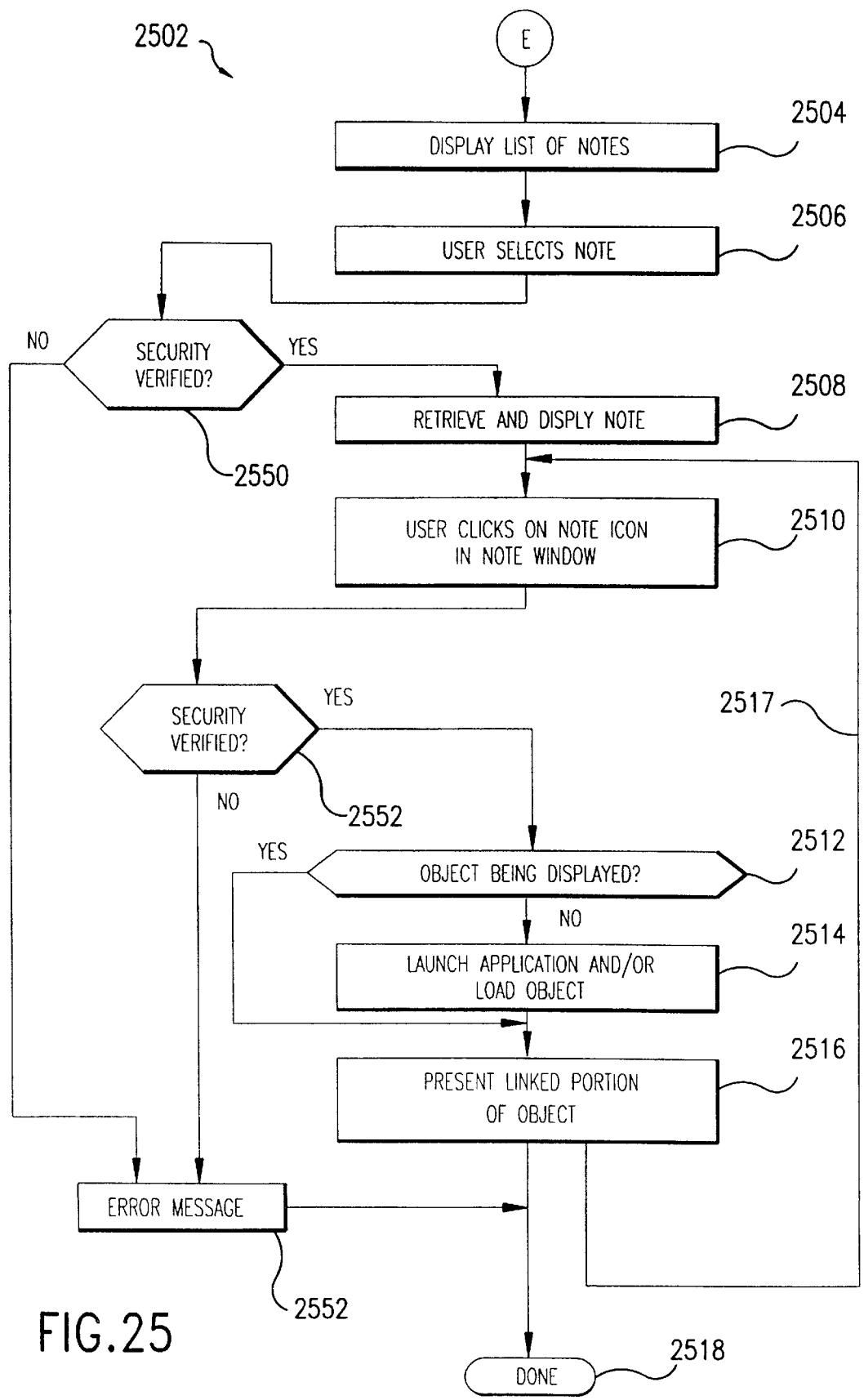

Another way for the user to issue a command to view an existing sub-note is to select the "View Note" command from the note menu 1602. The operation of the notes application 302 upon receipt of such a command is represented by a flowchart 2502 in FIG. 25.

In step 2504, the user interface 304 displays a list of all existing notes (this list includes the names of all such existing notes).

In step 2506, the user selects one of these notes in a well known manner. For illustrative purposes, assume that the user selected Note B (FIG. 12).

In step 2550, the notes engine 306 determines whether security/privacy criteria associated with the note and the sub-notes in the note are satisfied. The notes engine 306 retrieves this security/privacy criteria information from the associated note node and sub-note nodes, and then compares the retrieved security/privacy criteria information to the situation at hand. For example, if the security/privacy criteria is keyed to the current user's password, then the notes engine 306 compares the password of the current user (which the current user previously entered, or is now asked to enter) with that retrieved from the note and/or sub-notes. If the security/privacy criteria is not satisfied, then the user cannot view the note and/or sub-note. If this is the case, then an error message is displayed in step 2552. If the security/privacy criteria is satisfied for at least the note, then control flows to step 2508.

In step 2508, the notes engine 306 retrieves the selected Note B and its Sub-notes B1–B5 from the notes database 308. The user interface 304 then displays Note B and its Sub-notes B1–B5 in a notes window 904, as shown in FIG. 12.

As discussed above, the user can display the portions of the data objects linked to the Sub-notes B1–B5 by pressing the linking buttons 910, 1010, 1110, 1222, 1230 located proximate to the sub-note windows 908, 1008, 1108, 1220, 1228 in the notes window 904. Such functionality is represented by steps 2510–2516 in FIG. 25.

Specifically, in step 2510 the user clicks on one of the linking buttons 910, 1010, 1110, 1222, 1230 in the notes window 904. The sub-note associated with the linking button selected by the user is called the selected sub-note for reference purposes. For illustrative purposes, assume that the user clicks on linking button 910 corresponding to Sub-note B1. As discussed above, Sub-note B1 is linked to portion 902 of spreadsheet 804 (FIG. 9).

In step 2552, the notes engine 306 determines whether security/privacy criteria associated with the link (corresponding to the linking button) is satisfied. The notes engine 306 retrieves this security/privacy criteria information from the associated sub-note node, and then compares the retrieved security/privacy criteria information to the situation at hand. If the security/privacy criteria is not satisfied, then the user cannot traverse the link to view the data object portion. If this is the case, then an error message is displayed in step 2552. If the security/privacy criteria is satisfied, then control flows to step 2512.

In step 2512, the notes engine 306 determines whether the data object containing the portion that is linked to the selected linking button is open. In the current example, the notes engine 306 in step 2512 determines whether the spreadsheet 804 is open. If the data object is open, then step 2516 is performed (described below). Otherwise, step 2514 is performed.

In step 2514, the notes engine 306 invokes the application associated with the data object In step 2516, the notes engine 306 commands the application to present the portion 902 that is linked to the selected linking button 910. Thus, with reference to FIG. 9, the notes engine 306 in step 2516 commands the spread sheet 804 to scroll (if necessary) such that portion 902 is displayed in the window 802. It should be noted that the manner for presenting the linked portion is implementation dependent, and is defined by the application associated with the data object. In some cases, for example, the application displays text (where the linked portion is text). In other cases, the application plays a video clip or a sound clip (where the linked portion is video or audio). In other cases, the application executes a computer program (where the linked portion is a computer program). Thus, the manner in which the application presents (or displays) the linked portion in step 2516 is application specific, and depends in large part on the nature, content, and/or format of the linked portion.

Figure 26:
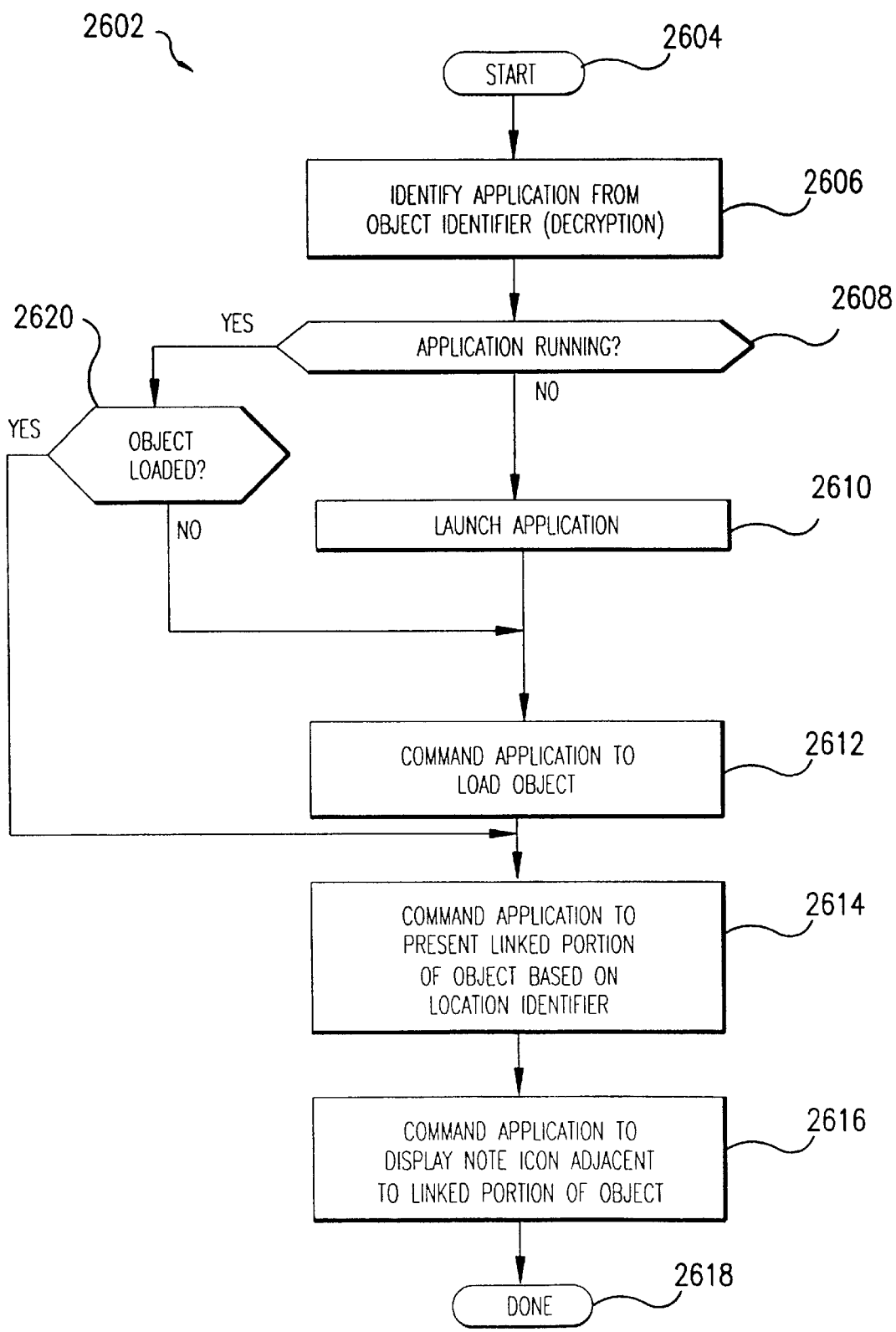

The manner in which the notes engine 306 performs steps 2512, 2514, and 2516 is represented by a flowchart 2602 in FIG. 26.

In step 2606, the notes engine 306 identifies the application that is associated with a data object. The notes engine 306 identifies this application by reference to the information in the object identifier field 1506 of the selected sub-note's sub-note node. The notes engine 306 may need to decrypt this information.

In step 2608, the notes engine 306 determines in a well known manner whether this application is currently executing. If the application is not executing, then in step 2610 the notes engine 306 invokes the application in a well known manner. Then, step 2612 is performed (described below). If the application is already running, then step 2620 is performed.

In step 2620, the notes engine 306 determines whether the data object is loaded in the application by querying the application. If the data object is loaded, then step 2614 is performed. Otherwise, step 2612 is performed.

In step 2612, the notes engine 306 commands the application to load the data object.

In step 2614, the notes engine 306 commands the application to present the portion 902 of the data object that is linked to the selected sub-note. The notes engine 306 does this by retrieving the location and range information contained in the location identifier field 1508 and the range field 1509 of the selected sub-note's sub-note node. The notes engine 306 may need to decrypt this information. The notes engine 306 then commands the application to present the portion of the data object identified by the retrieved location information.

In step 2616, the notes engine 306 commands the application to display the linking button (in the manner described above) proximate to the portion of the data object as displayed in step 2614.

The user can use the linking buttons 910, 1010, 1110, 1222, 1230 in Note B as described above to traverse to any of the portions of data objects linked to the sub-notes associated with the linking buttons 910, 1010, 1110, 1222, 1230. Such flow of control is represented by control arrow 2517 in FIG. 25.

5.6 Select View

Figure 39:
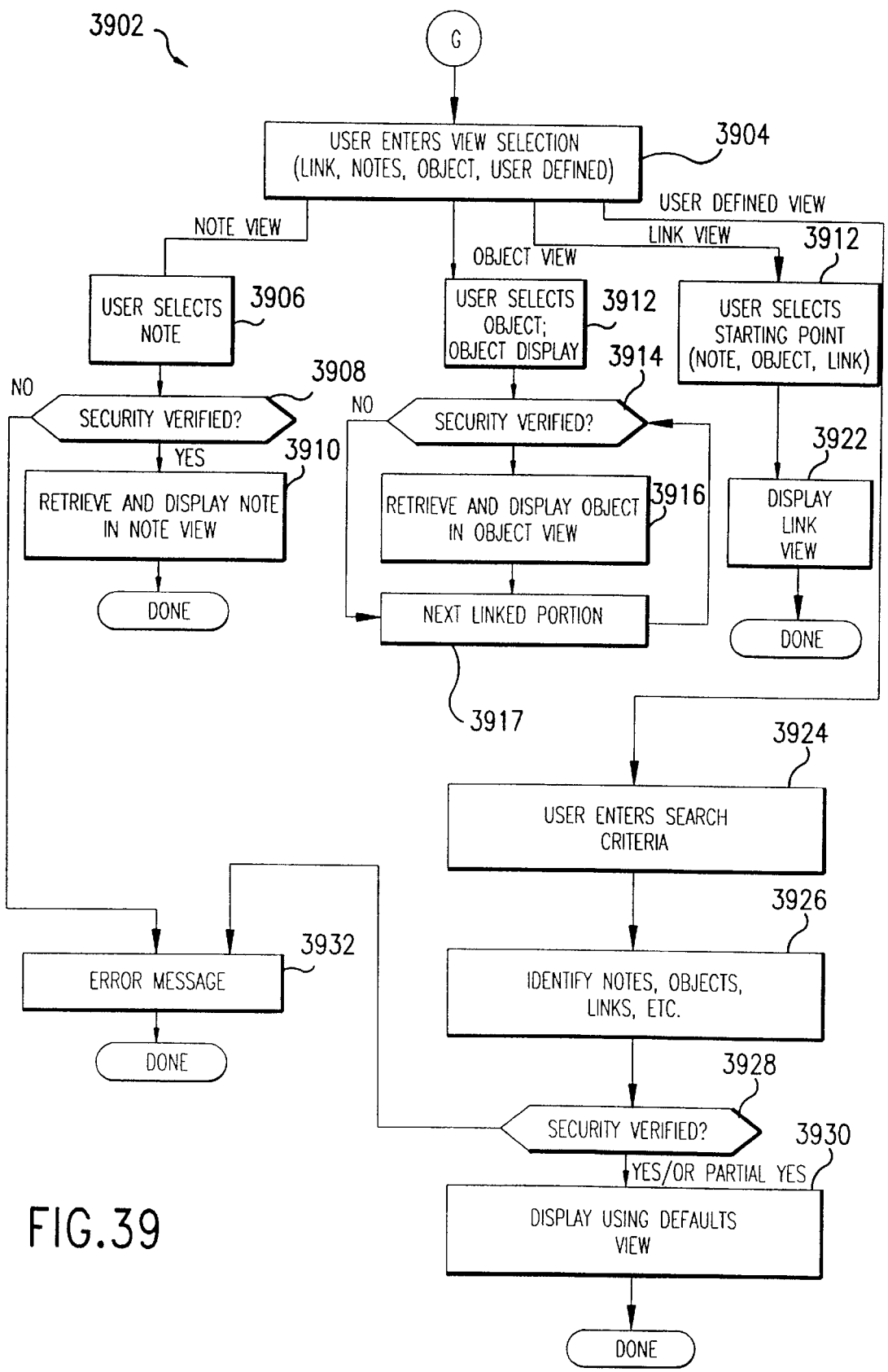

Flowchart 3902 in FIG. 39 represents the operation of the notes application 302 when processing a command by the user to select a view.

In step 3904, the user enters a command indicating the desired view. As described above, the invention supports a note view, an object view, a link view, and a user defined view.

If the user's command indicates the note view, then step 3906 is performed. In step 3906, the user selects a note to view utilizing any of the note selection procedures discussed herein.

In step 3908, the notes application 302 verifies that the security/privacy criteria associated with the selected note is satisfied. Such verification is described above. If the security/privacy criteria is not satisfied for the note, then the user is not allowed to view the note. Accordingly, an error message is displayed in step 3932. Otherwise, step 3910 is performed.

In step 3910, the notes application 302 retrieves the note and its sub-notes from the notes database 308. The notes application 302 displays the note and its sub-notes in the note view. An example note view is shown in FIG. 30. Step 3910 is performed as follows. The notes application 302 displays the note in a note window, such as note window 3004. The notes application 302 retrieves the note's sub-notes. If the security/privacy criteria associated with a sub-note is satisfied, then the sub-note is displayed in the note window 3004. Otherwise, the sub-note is not displayed in the note window 3004. The notes application 302 then determines whether to display the data object portions linked to those sub-notes that are displayed. If the security/privacy criteria associated with the link for each of these sub-notes is satisfied, then the notes application 302 retrieves and displays the linked data object portion in an application window, and displays a bidirectional arrow indicating the link between the data object portion and the sub-note.

If, in step 3904, the user's command indicates the object view, then step 3912 is performed. In step 3912, the user selects a data object to view using any selection mechanism discussed herein. The notes application 302 then causes the data object to be retrieved and displayed in an application window. Note that portions of the data object may be linked to sub-notes in the notes database 308. Such sub-notes are called linked sub-notes.

The notes application 302 next determines whether to display the linked sub-notes. Such linked sub-notes would be displayed using the object view (shown in FIG. 31, for example). In step 3914, the notes application 302 verifies that the security/privacy criteria associated with a linked sub-note, and the linked sub-note's associated note and link are satisfied. Such verification is described above. If the security/privacy criteria associated with the linked sub-note, its link, and/or its note are not satisfied, then the linked sub-note is not displayed. Control moves to step 3917 (described below). Otherwise, the linked sub-note is displayed in step 3916 as shown in FIG. 30.

In step 3917, the notes application 302 selects the next linked sub-note to process. Control then returns to step 3914.

It is noted that steps 3914, 3916, and 3917 are performed as other linked data object portions come into view in the application window (due to scrolling by the user, for example).

Referring again to step 3904, if the user's command indicates the link view, then step 3918 is performed. In step 3918, the user selects a starting point for the link view. The starting point may be a note grouping, a note, a sub-note, a link, or a data object portion. Assume, for example purposes, that the user selects Note B in FIG. 29 as the starting point.

In step 3922, the notes application 302 searches through the notes database 308 to identify note groupings, notes, sub-notes, and data object portions that are directly or indirectly connected/linked to the starting point. This may be a multiple iteration or recursive search. Such searches are well known. The notes application 302 then displays representations of the identified note groupings, notes, sub-notes, and data object portions using the link view (see the example in FIG. 29). Such representations do not include the contents of these items. Instead, they preferably include the name of the item (such as "Sub-note D") displayed within a graphical construct (such as an oval).

Note that in the embodiment described above, the display of the link view does not involve a security check. Security is verified if the user attempts to view the contents of or traverse a note grouping, note, sub-note, link, or data object. In other embodiments, security is verified before even the link view is displayed.

Referring again to step 3904, if the user's command indicates the user-defined view, then step 3924 is performed. In step 3924, the user enters search criteria.

In step 3926, the notes application 302 searches through the notes database 308 and identifies note groupings, notes, sub-notes, links, and data objects that satisfy the search criteria.

In step 3928, the notes application 302 verifies that security is satisfied with these identified items. If security is not satisfied with any of these items, then an error message is displayed in step 3932. If security is satisfied with at least some of these items, then step 3930 is performed.

In step 3930, the notes application 302 displays any of the items for which security was verified. Preferably, a default view is used, such as the standard note view. The user can elect to view the search results using any other view.

5.7 Modify Privacy/Security Settings

Figure 40:
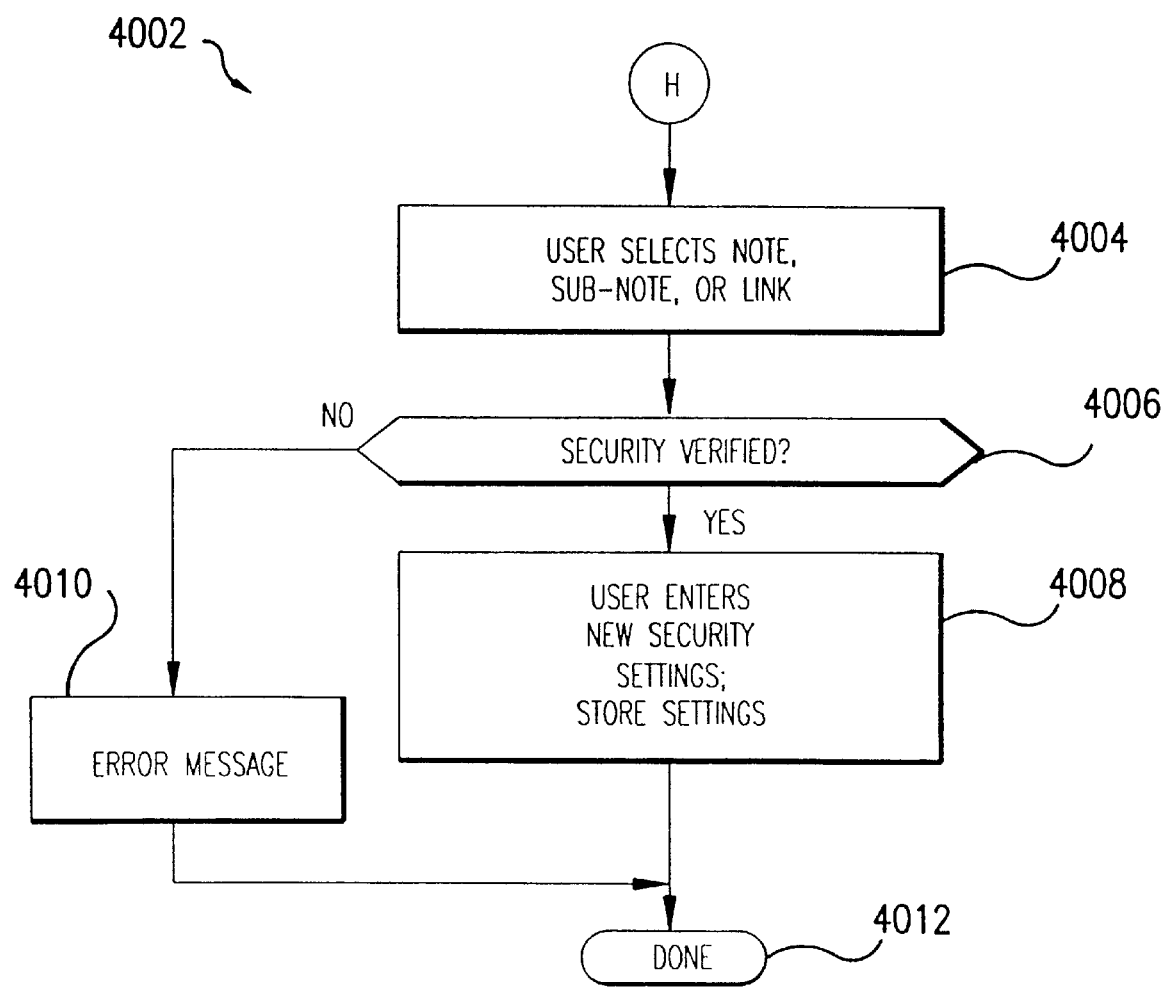

Flowchart 4002 in FIG. 40 represents the operation of the invention when enabling the user to modify the privacy/security settings associated with a note grouping, note, sub-note, or link.

In step 4004, the user selects a note grouping, note, sub-note, or link using any of the selection procedures discussed herein.

In step 4006, the notes application 302 verifies that the privacy/security criteria associated with the selected item is satisfied. Such verification is described above. If the privacy/security criteria is not satisfied, then the user is not allowed to modify the privacy/security settings. In this case, an error message is displayed in step 4010. If the privacy/security criteria is satisfied, then in step 4008 the user is allowed to enter new privacy/security settings for the selected item. This new privacy/security setting is then stored.

5.8 Find Note/Sub-note

Figure 27:
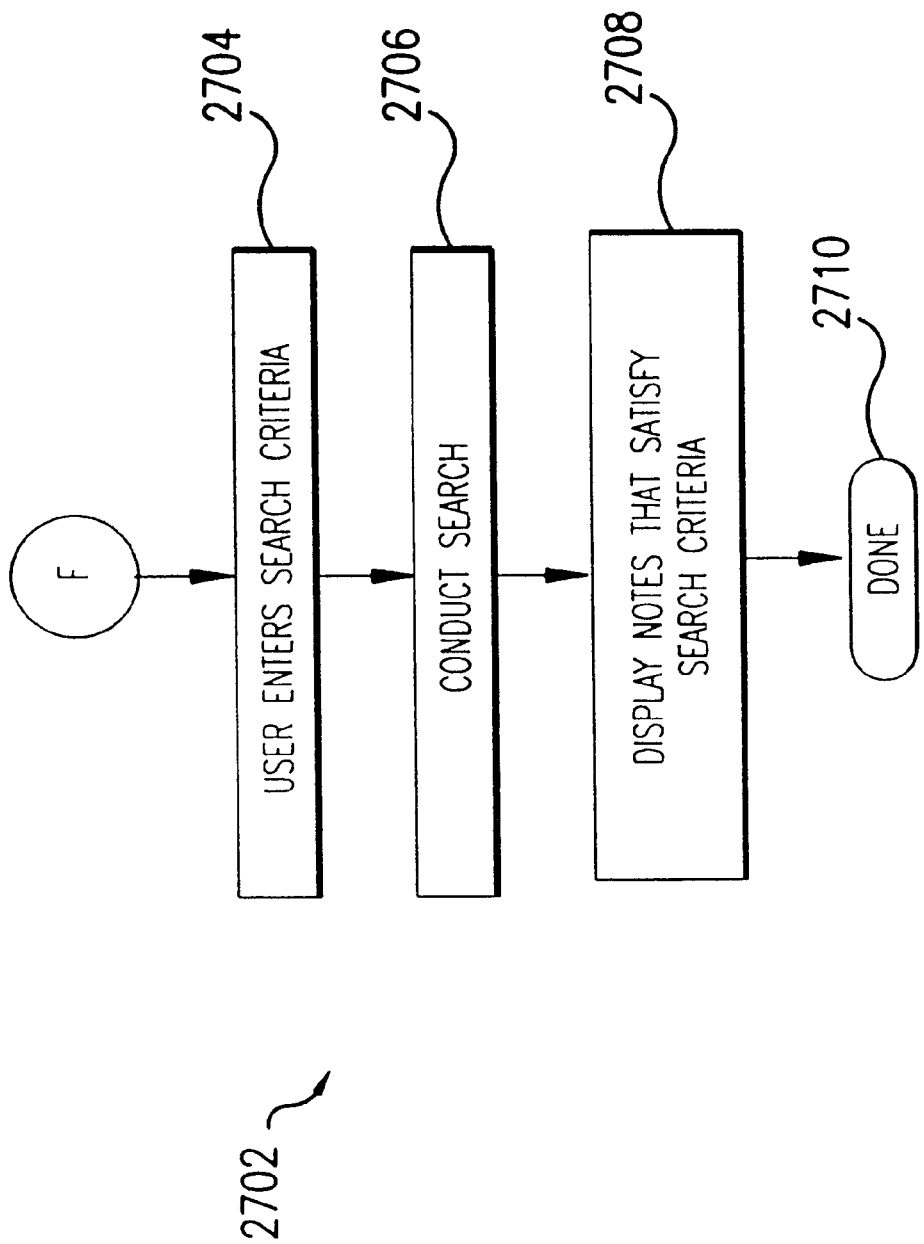

The user initiates a note/sub-note search by selecting the "Find" command in the note menu 1602. The operation of the notes application while performing searching is represented by a flowchart 2702 in FIG. 27. In step 2704, the user interface 304 enables the user to enter search criteria. The search criteria includes key words, icons, user names, creator names, owner names, date/time stamp, etc. The user can also limit the search to one or more branches of the note grouping/note/sub-note hierarchy. In step 2706, the notes engine 306 searches through the sub-notes in the notes database 308 (as limited by the user) to locate any and all notes and/or sub-notes which match the search criteria. In step 2708, the user interface 304 displays the notes containing these sub-notes. Each note is displayed in a separate notes window.

5.9 Edit One or More Notes

The present invention allows users to modify the sub-notes that are in notes. For example, a user may rearrange the ordering of sub-notes within a note. The user can delete sub-notes from a note. The user can also copy (replicate) or move sub-notes from one note to other notes. The user can also move, delete, or otherwise modify the notes that are in the note groups. The user can also modify the linkage between sub-notes and data object portions. In other words, the invention allows the user to easily modify the note grouping/note/sub-note hierarchy. Such operation of the present invention is represented by step 1708 in FIG. 17. Step 1708 is discussed in detail below.

A user rearranges sub-notes in a note, or moves/copies sub-notes between notes by selecting the desired sub-notes, and then dragging and dropping the selected sub-notes to the desired locations. In FIG. 13, for example, assume that the user wishes to move Sub-note B1 so that it is displayed between Sub-notes B3 and B4. In this case, the user selects Sub-note B1 in a well known manner, and then drags selected Sub-note B1 until it is located between Sub-notes B3 and B4. The user then drops Sub-note B1 between Sub-notes B3 and B4 in a well known manner.

Suppose that the user wishes to move Sub-note B1 to Note C. In this case, the user selects Sub-note B1 in a well known manner, and then drags selected Sub-note B1 until it is positioned over Note C. The user then drops Sub-note B1 into Note C.

The user modifies the notes within a note group and the linkage between sub-notes and data object portions in a similar manner.

In response to such user commands, the notes engine 306 moves/copies sub-notes between the sub-note linked lists, modifies the note grouping table 390, and/or modifies the linkage information in the sub-note nodes. Procedures for deleting nodes from linked lists, inserting nodes into linked lists, and moving nodes between linked lists are well known.

6. Applications of the Invention

The invention is applicable to any application that would benefit from the enhanced organization of information. Such applications include, but are not limited to: (1) law related projects, such as licensing studies, litigation efforts, opinions of counsel (such as patentability, patent validity, and patent infringement studies); (2) scientific and/or engineering related projects, such as research and development projects; (3) electronic text books, handbooks, user manuals, encyclopedias, and other electronic reference works, including multimedia reference works; (4) auditory and visual documents; (5) virtual library; (6) review course, such as legal bar review course, business review courses, CPA courses, medical review courses, etc.; and (7) virtual classrooms.

Other applications of the invention will be apparent based on the discussion contained herein. Two such applications are discussed in some detail below.

6.1 Movie Production

Figure 46:
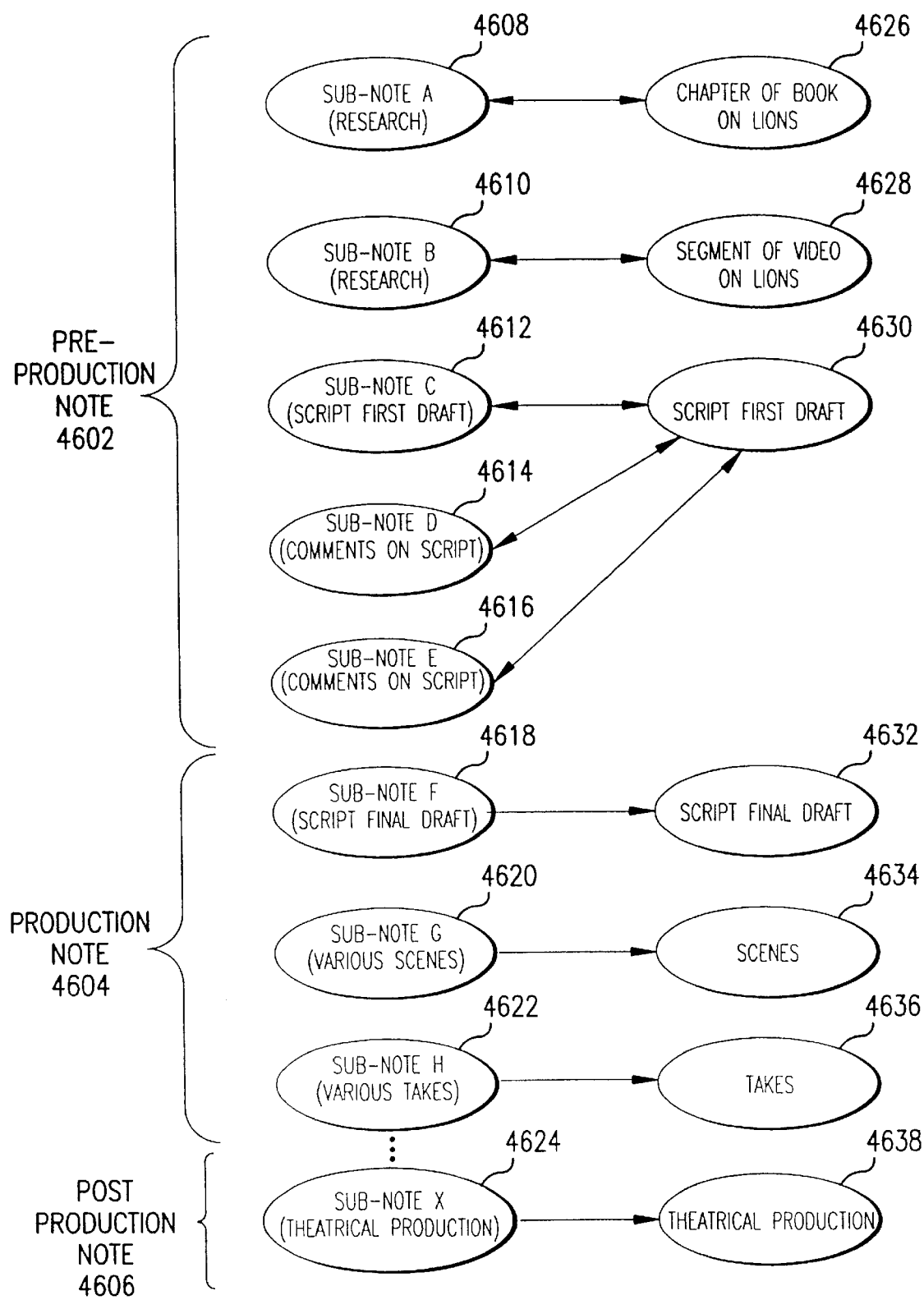
FIG. 46 illustrates a movie making example.

The invention is applicable to the entertainment industry, such as the motion picture industry. The invention could be used to organize the great amounts of information that is collected and generated during the development of a movie. This scenario is represented in simplified form in FIG. 46.

Generally, a movie is developed in three phases: a pre-production phase, a production phase, and a post production phase. The present invention could be used to organize, memorialize, and institutionalize the information collected and generated during these phases. Specifically, a note 4602 could be created for the pre-production phase. Also, a note 4604 could be created for the production phase, and another note 4606 could be created for the post production phase.

The pre-production note 4602 could include sub-notes that link to data objects used to research the movie's topic. For example, suppose the movie involved lions. One sub-note, called Sub-note A, could be linked to a chapter in a book 4626 dealing with lions. Another sub-note, Sub-note B, could be linked to a segment of a video 4628 pertaining to lions. Other sub-notes, such as Sub-notes C–E, could be linked to drafts 4630 of the script. These sub-notes could include comments/edits on the drafts 4630. Other sub-notes (not shown) could be linked to other pre-production related objects, such as contracts with actors, travel itineraries, budget reports, purchase orders for costumes and props, etc.

The production note 4604 could include sub-notes that are linked to production data objects, such as the final draft of the script 4634, various scenes 4634, various takes 4634, clips, shots, frames, etc. Such scenes 4634, takes 4634, clips, shots, and frames would be in a form useable by a computer.

The post production note 4606 could include sub-notes that are linked to post-production data objects, such as the theatrical production 4624 of the movie, the video production 4624 of the movie, the movie soundtrack, etc.

There are many advantageous for using the present invention to create movies. First and perhaps foremost, the present invention will lend order to the creation of a movie and to the memorialization and documentation of the movie production. Accordingly, movie production will be more efficient and effective.

Second, the use of the invention to create movies will create great marketing opportunities. Currently, there is limited distribution of movies and their related materials. For most movies, only the theatrical version and perhaps the home video version are sold and distributed. Limited source materials (such as the "Making of" type publications) are available to the public.

The present invention allows any and all versions of any given movie to be easily packaged, distributed and sold. One need only copy the pertinent notes, sub-notes, and data objects to a computer readable medium (such as one or more compact disks), and distribute and sell copies of the computer readable medium to the public.

Also, for movie historians and other interested parties, the materials that were used to create the movie (such as the pre-production information and the production information) can be easily packaged, distributed, and sold. Again, one need only copy the pertinent notes, sub-notes, and data objects to a computer readable medium, and distribute and sell copies of the computer readable medium to the public.

Further, the use of the invention will enable movie aficionados to create their own versions of a movie. This is the case, since the soundtrack, scenes, takes, clips, shots, and/or frames are stored as data objects, and are linked to sub-notes. Such personalized movie making packages can be easily packaged, distributed, and sold. Again, one need only copy the pertinent notes, sub-notes, and data objects to a computer readable medium, and distribute and sell copies of the computer readable medium to the public.

6.2 Bar Review Program

The invention could be used to create attorney bar review course materials. These materials could be used as a supplement to a traditional bar review course, or as an alternative to a bar review course.

Figure 47:
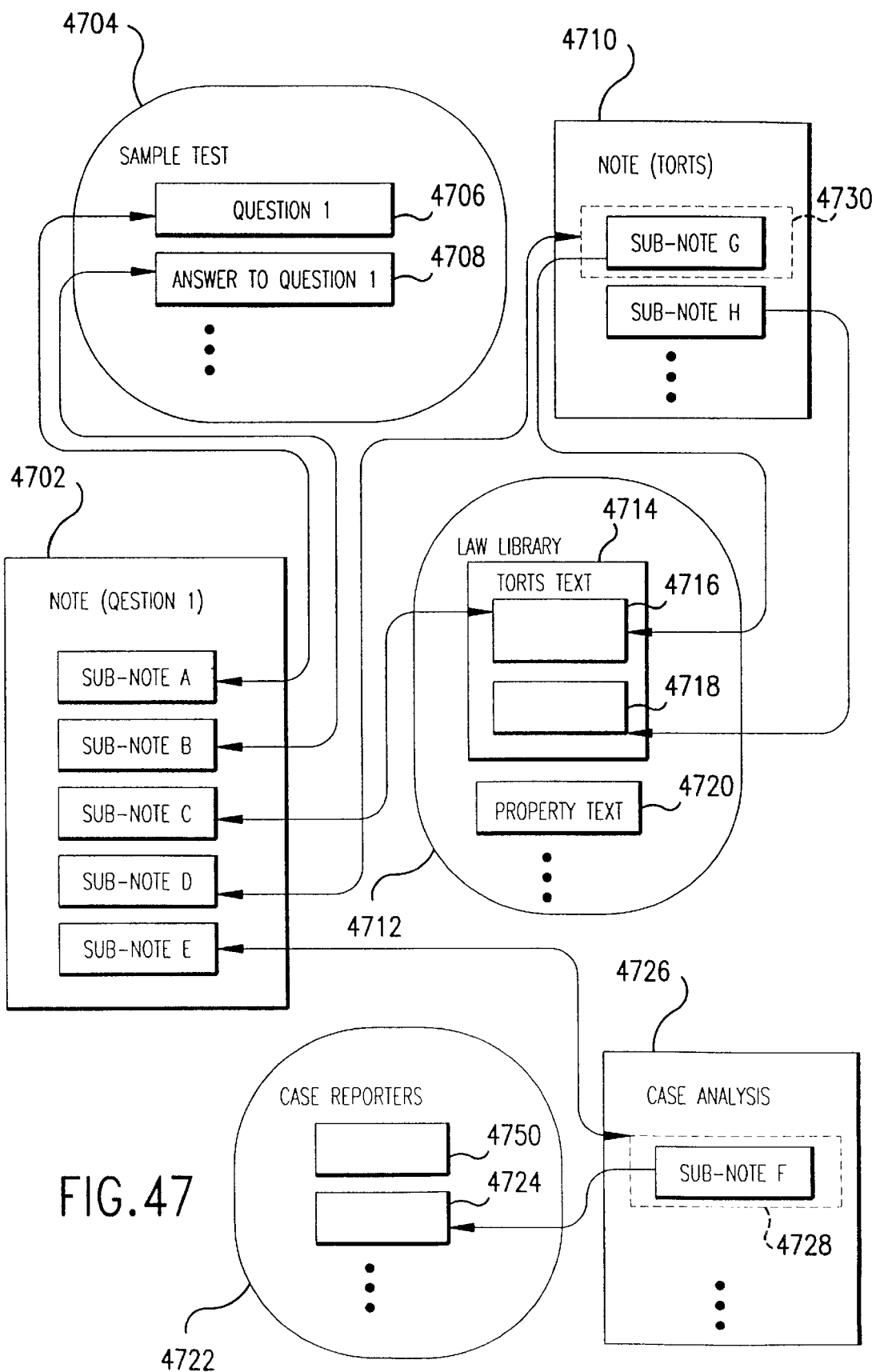
FIG. 47 illustrates a bar review course materials example.

A portion of an example notes database 308 for a bar review course is shown in FIG. 47. Bar review course materials typically include a number of sample tests. According to the present invention, a note is associated with each question of each sample test. For example, note 4702 is associated with Question 1. Sub-note A is linked to the portion 4706 of a sample test data object 4704 that corresponds to Question 1. Sub-note B is linked to the portion 4708 of the sample test data object 4704 that corresponds to the answer to Question 1.

Suppose that Question 1 pertains to an area of Torts law. Question 1 note 4702 may also include a Sub-note C that is linked to a portion 4716 of a torts text 4714 in an electronic legal library 4712. This portion 4716 deals with the substantive torts law of Question 1. A student may find it very useful to study this portion 4716 when working with Question 1.

The notes database 308 could also include a torts note 4710 that the deals specifically with torts. This torts note 4710 could have sub-notes, such as Sub-notes G and H, that are linked to portions of the torts text 4714. Sub-notes G and H could have commentary on these portions of the torts text 4714. The Question 1 note 4702 could then have a Sub-note D that points to Sub-note G in the torts note 4710. Sub-note G points to the same portion 4716 in the torts text 4714 pointed to by Sub-note C (typically, the Question 1 note 4702 would include Sub-note C or Sub-note D, but not both). Notes dealing with questions other than Question 1 could then point to the sub-notes in the torts note 4710, as necessary, thereby enhancing reusability.

The notes database 308 could also include a case analysis note 4726 that includes sub-notes that point to cases in electronic case reporters 4722. These sub-notes could include commentary and analysis of such cases. The Question 1 note 4702 could include a Sub-note E that is linked to a Sub-note F in the case analysis note 4728. This Sub-note F is linked to a case 4724 that deals with the issues of Question 1. Students may find it useful to review this case 4724 when working with Question 1.

7. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method of electronically annotating data objects, comprising the steps of:
    (1) placing an application in an annotation mode;
    (2) automatically creating, responsive to at least step (1), an electronic annotation;
    (3) automatically and permanently linking, responsive to at least step (2), said annotation to at least a portion of a data object, wherein said at least a portion is less than the entire said data object, wherein said data object itself remains unchanged by said annotation, and wherein said permanent link exists until deleted by a user; and
    (4) creating a second annotation linked to said annotation, wherein said second annotation is linked to either at least a portion of said data object or at least a portion of a second data object.

2. The method of claim 1, further comprising the step of: viewing annotations using any combination of note views, link views, object views, and user defined views.

3. The method of claim 1, wherein said user selected said at least a portion of said data object before step (1).

4. The method of claim 1, wherein step (1) comprises the step of enabling said user to select an annotation mode icon.

5. The method of claim 4, wherein at least one display attribute is associated with said selected annotation mode icon, wherein said at least a portion of said data object and said annotation are at least partially displayed using said at least one display attribute.

6. The method of claim 4, wherein step (1) comprises the step of enabling said user to select a pen icon.

7. The method of claim 1, wherein step (1) comprises the step of enabling said user to select an appropriate menu option.

8. The method of claim 1, wherein said at least a portion of said data object is one or more of at least a portion of a text object, at least a portion of a spreadsheet object, at least a portion of a database object, at least a portion of a financial object, at least a portion of a communication object, at least a portion of a multimedia object, at least a portion of a video object, at least a portion of a graphics object, at least a portion of a presentation object, at least a portion of a computer program object, at least a portion of an audio object, and at least a portion of a digital image object.

9. The method of claim 1, further comprising the step of:
    (4) displaying location information proximate to said annotation, said location information indicating a location of said at least a portion in said data object.

10. The method of claim 1, further comprising:
    displaying an object proximate to said at least a portion of said immutable data object representative of a link to said annotation.

11. The method of claim 9, wherein said location information comprises at least one of column information and line information of a start of said at least a portion of said data object.

12. The method of claim 9, wherein said location information comprises at least one of column information and line information of a first text line of said at least a portion of said data object.

13. The method of claim 1, further comprising the steps of:
    (4) displaying a first graphical icon proximate to said annotation; and
    (5) displaying a second graphical icon proximate to said at least a portion of said data object.

14. The method of claim 13, wherein said first and second graphical icons are at least one of the same shape and the same color.

15. The method of claim 1, further comprising the step of:
    (4) preventing said data object from being modified while performing steps (1)–(3).

16. The method of claim 1, wherein said data object is immutable.

17. A system for electronically annotating data objects, comprising:
    annotation mode enabling means for placing an application in an annotation mode;
    annotation creating means, responsive to at least said annotation mode enabling means, for automatically creating an electronic annotation;

linking means, responsive to at least said annotation creating means, for automatically and permanently linking said annotation to at least a portion of a data object, wherein said at least a portion is less than the entire said data object, wherein said data object itself remains unchanged by said annotation, and wherein said permanent link exists until deleted by a user; and second annotation creating means, responsive to at least said annotation creating means, for creating a second annotation linked to said annotation, wherein said second annotation is linked to either at least a portion of said data object or at least a portion of a second data object.

18. The system of claim 17, further comprising:

means for viewing annotations using any combination of note views, link views, object views, and user defined views.

19. The system of claim 17, wherein said user selected said at least a portion of said data object before operation of said annotation mode enabling means.

20. The system of claim 17, wherein said annotation mode enabling means comprises:

means for enabling said user to select an annotation mode icon.

21. The system of claim 20, wherein at least one display attribute is associated with said selected annotation mode icon, wherein said at least a portion of said data object and said annotation are at least partially displayed using said at least one display attribute.

22. The system of claim 20, wherein said annotation mode enabling means comprises:

means for enabling said user to select a pen icon.

23. The system of claim 17, wherein said annotation mode enabling means comprises:

means for enabling said user to select an appropriate menu option.

24. The system of claim 17, wherein said at least a portion of said data object is one or more of at least a portion of a text object, at least a portion of a spreadsheet object, at least a portion of a database object, at least a portion of a financial object, at least a portion of a communication object, at least a portion of a multimedia object, at least a portion of a video object, at least a portion of a graphics object, at least a portion of a presentation object, at least a portion of a computer program object, at least a portion of an audio object, and at least a portion of a digital image object.

25. The system of claim 17, further comprising:

means for displaying location information proximate to said annotation, said location information indicating a location of said at least a portion in said data object.

26. The system of claim 17, further comprising:

means for displaying an object proximate to said at least a portion of said immutable data object representative of a link to said annotation.

27. The system of claim 25, wherein said location information comprises at least one of column information and line information of a start of said at least a portion of said data object.

28. The system of claim 25, wherein said location information comprises at least one of column information and line information of a first text line of said at least a portion of said data object.

29. The system of claim 17, further comprising:

first graphical icon displaying means for displaying a first graphical icon proximate to said annotation; and second graphical icon displaying means for displaying a second graphical icon proximate to said at least a portion of said data object.

30. The system of claim 29, wherein said first and second graphical icons are at least one of the same shape and the same color.

31. The system of claim 17, further comprising:

preventing means for preventing said data object from being modified by said annotation mode enabling means, said annotation creating means and said linking means.

32. The system of claim 17, wherein said data object is immutable.

33. A computer program product having control logic stored therein, said control logic, when executed, enabling a computer to electronically annotate data objects, said control logic comprising:

annotation mode enabling means for enabling the computer to place an application in an annotation mode;

annotation creating means, responsive to at least said annotation mode enabling means, for enabling the computer to automatically create an electronic annotation;

linking means, responsive to at least said annotation creating means, for enabling the computer to automatically and permanently link said annotation to at least a portion of a data object, wherein said at least a portion is less than the entire said data object, wherein said data object itself remains unchanged by said annotation, and wherein said permanent link exists until deleted by a user; and second annotation creating means, responsive to at least said annotation creating means, for creating a second annotation linked to said annotation, wherein said second annotation is linked to either at least a portion of said data object or at least a portion of a second data object.

34. The computer program product of claim 35, wherein said control logic further comprises:

means for enabling the computer to display annotations using any combination of note views, link views, object views, and user defined views.

35. The computer program product of claim 33, wherein said user selected said at least a portion of said data object before operation of said annotation mode enabling means.

36. The computer program product of claim 33, wherein said annotation mode enabling means comprises:

means for enabling the computer to enable said user to select an annotation mode icon.

37. The computer program product of claim 36, wherein at least one display attribute is associated with said selected annotation mode icon, wherein said at least a portion of said data object and said annotation are at least partially displayed using said at least one display attribute.

38. The computer program product of claim 36, wherein said annotation mode enabling means comprises:

means for enabling the computer to enable said user to select a pen icon.

39. The computer program product of claim 33, wherein said annotation mode enabling means comprises:

means for enabling the computer to enable said user to select an appropriate menu option.

40. The computer program product of claim 33, wherein said at least a portion of said data object is one or more of at least a portion of a text object, at least a portion of a spreadsheet object, at least a portion of a database object, at least a portion of a financial object, at least a portion of a communication object, at least a portion of a multimedia object, at least a portion of a video object, at least a portion of a graphics object, at least a portion of a presentation object, at least a portion of a computer program object, at least a portion of an audio object, and at least a portion of a digital image object.

41. The computer program product of claim 35, wherein said control logic further comprises:
   means for enabling the computer to display location information proximate to said annotation, said location information indicating a location of said at least a portion in said data object.

42. The computer program product of claim 33, said control logic further comprising:
   means for enabling the computer to display an object proximate to said at least a portion of said immutable data object representative to said annotation.

43. The computer program product of claim 41, wherein said location information comprises at least one of column information and line information of a start of said at least a portion of said data object.

44. The computer program product of claim 41, wherein said location information comprises at least one of column information and line information of a first text line of said at least a portion of said data object.

45. The computer program product of claim 33, wherein said control logic further comprises:
   means for enabling the computer to display a first graphical icon proximate to said annotation; and
   means for enabling the computer to display a second graphical icon proximate to said at least a portion of said data object.

46. The computer program product of claim 45, wherein said first and second graphical icons are at least one of the same shape and the same color.

47. The computer program product of claim 33, wherein said control logic further comprises:
   means for enabling the computer to prevent said data object from being modified by said annotation mode enabling means, said annotation creating means and said linking means.

48. The computer program product of claim 33, wherein said data object is immutable.

49. A method of electronically annotating data objects comprising the steps of:
   (1) creating, responsive to user command, an electronic annotation;
   (2) automatically and permanently linking said annotation to at least a portion of a data object, wherein said at least a portion is less than the entire said data object, wherein said data object itself remains unchanged by said annotation, and wherein said permanent link exists until deleted by a user;
   (3) displaying location information proximate to said annotation, said location information indicating a location of said at least a portion in said data object; and
   (4) creating a second annotation linked to said annotation, wherein said second annotation is linked to either at least a portion of said data object or at least a portion of a second data object.

50. The method of claim 49, wherein said location information indicates a page of said data object containing at least a part of said at least a portion.

51. The method of claim 49, wherein said location information indicates a page and line of said data object containing at least a part of said at least a portion.

52. The method of claim 49, wherein said location information indicates a column and line of said data object containing at least a part of said at least a portion.

53. A method of electronically annotating data objects comprising the steps of:
   (1) creating, responsive to user command, an electronic annotation;
   (2) automatically and permanently linking said annotation to at least a portion of a data object, wherein said at least a portion is less than the entire said data object, wherein said data object itself remains unchanged by said annotation, and wherein said permanent link exists until deleted by a user;
   (3) displaying location information proximate to said annotation, said location information indicating a location of said at least a portion in said data object; and
   (4) creating a second annotation linked to said annotation, wherein said second annotation is linked to either at least a portion of said data object or at least a portion of a second data object.

* * * * *